(12) United States Patent
Kurasawa et al.

(10) Patent No.: US 11,385,489 B2
(45) Date of Patent: *Jul. 12, 2022

(54) DISPLAY DEVICE

(71) Applicant: Japan Display Inc., Tokyo (JP)

(72) Inventors: Hayato Kurasawa, Tokyo (JP);
Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,802

(22) Filed: Nov. 30, 2020

(65) Prior Publication Data

US 2021/0109391 A1 Apr. 15, 2021

Related U.S. Application Data

(63) Continuation of application No. 16/205,955, filed on Nov. 30, 2018, now Pat. No. 10,871,853, which is a continuation of application No. 15/400,498, filed on Jan. 6, 2017, now Pat. No. 10,175,816.

(30) Foreign Application Priority Data

Feb. 2, 2016 (JP) ................. 2016-018365

(51) Int. Cl.
*G02F 1/1333* (2006.01)
*G06F 3/041* (2006.01)
*G06F 3/044* (2006.01)
*G02F 1/133* (2006.01)
*G02F 1/1343* (2006.01)
(Continued)

(52) U.S. Cl.
CPC ........ *G02F 1/13338* (2013.01); *G02F 1/1368* (2013.01); *G02F 1/13306* (2013.01); *G02F 1/13624* (2013.01); *G02F 1/133345* (2013.01); *G02F 1/134336* (2013.01); *G02F 1/136286* (2013.01); *G06F 3/044* (2013.01); *G06F 3/0412* (2013.01); *G06F 3/0416* (2013.01); *G06F 3/0445* (2019.05); *G06F 3/0446* (2019.05); *G06F 3/0448* (2019.05); *G06F 3/04166* (2019.05); *G06F 2203/04108* (2013.01)

(58) Field of Classification Search
CPC ...... G06F 3/044; G06F 3/0412; G06F 3/0416; G06F 1/1368; G06F 1/13306; G06F 1/13338; G06F 1/13624; G06F 1/133345; G06F 1/133436; G06F 1/136286
USPC ............. 345/100, 156–184, 211; 349/43, 49; 363/46
See application file for complete search history.

(56) References Cited

U.S. PATENT DOCUMENTS

| 9,040,990 | B2 * | 5/2015 | Jo | ........................ | H01L 33/005 |
| | | | | | 257/59 |
| 2013/0161626 | A1 * | 6/2013 | Jo | ........................ | H01L 27/124 |
| | | | | | 257/59 |
| 2017/0213821 | A1 * | 7/2017 | Or-Bach | ............. | H01L 21/6835 |

* cited by examiner

*Primary Examiner* — Prabodh M Dharia
(74) *Attorney, Agent, or Firm* — Michael Best & Friedrich LLP

(57) ABSTRACT

A display device includes: a plurality of first electrodes arranged in a display region for displaying an image; a second electrode opposed to the first electrodes; a plurality of switching elements that are arranged in the display region and coupled to the first electrodes or the second electrode; a gate line for supplying a scanning signal for scanning the switching elements; a data line for supplying a signal to the switching elements that are coupled to the switching elements; and conductive wire that is opposed to the second electrode via an insulating layer and is coupled to the switching elements.

13 Claims, 36 Drawing Sheets

(51) Int. Cl.
*G02F 1/1362* (2006.01)
*G02F 1/1368* (2006.01)

DISPLAY DEVICE

CROSS-REFERENCE TO RELATED APPLICATIONS

This application is a continuation application of application Ser. No. 16/205,955, filed Nov. 30, 2018, which, in turn, is a continuation application of application Ser. No. 15/400,498, (now U.S. Pat. No. 10,175,816) filed Jan. 6, 2017, which in turn claims priority from Japanese Application No. 2016-018365, filed on Feb. 2, 2016, the contents of which are incorporated by reference herein in its entirety.

BACKGROUND

1. Technical Field

The present disclosure relates to a display device.

2. Description of the Related Art

Japanese Patent Application Laid-open Publication No. 2013-254219 (JP-A-2013-254219) discloses a liquid crystal display panel including a pixel electrode, a common electrode opposed to the pixel electrode, a switching element coupled to the pixel electrode, and a conductive layer arranged on a surface of the common electrode. In the liquid crystal display panel disclosed in JP-A-2013-254219, the conductive layer having favorable electrical conductivity is arranged on the common electrode, thereby reducing an apparent resistance value of the common electrode and suppressing a flicker and crosstalk.

To the switching element arranged in a display region, coupled are a gate line for supplying a scanning signal and a data line for supplying a pixel signal. To increase a screen size of the display device or achieve high definition thereof, a large number of wires such as the gate line and the data line are arranged in the display region, so that restriction on an arrangement of wire may be increased. When such electrodes are used for touch detection, restriction on the wire or the switching element may be further increased. JP-A-2013-254219 does not describe a case of using the conductive layer as the wire such as the gate line or the data line.

SUMMARY

According to an aspect, a display device includes a plurality of first electrodes arranged in a display region for displaying an image, a second electrode opposed to the first electrodes, a plurality of switching elements that are arranged in the display region and coupled to the first electrodes or the second electrode, a gate line coupled to the switching elements and for supplying a scanning signal for scanning the switching elements, a data line for supplying a signal to the switching elements, and a conductive wire that is opposed to the second electrode via an insulating layer and is coupled to the switching elements.

DETAILED DESCRIPTION

Figure 1:
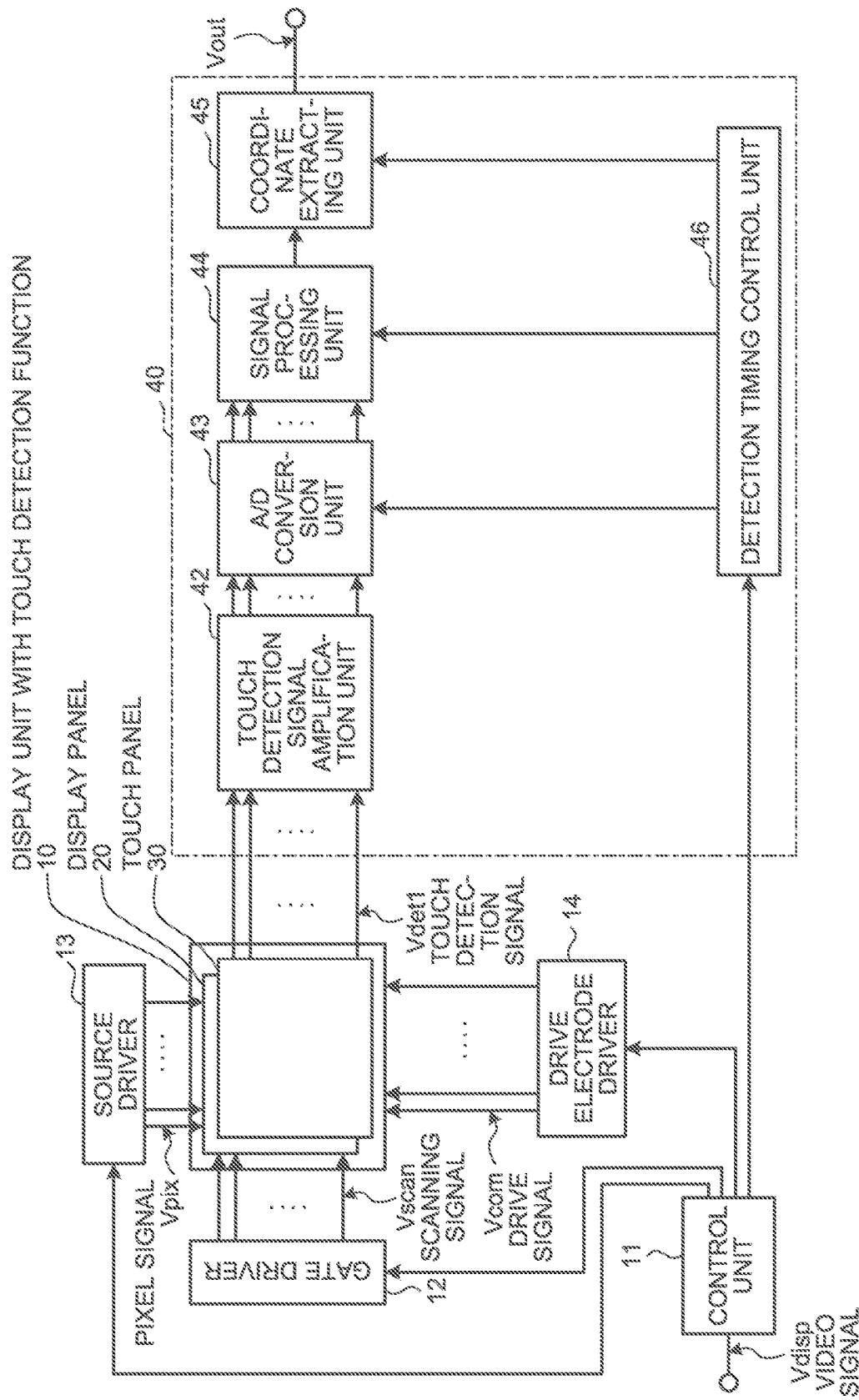
FIG. 1 is a block diagram illustrating a configuration example of a display device with a touch detection function according to a first embodiment.

The following describes embodiments in detail with reference to the drawings. The present invention is not limited to the embodiments described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, the width, the thickness, the shape, and the like of each component may be schematically illustrated in the drawings as compared with an actual aspect. However, the drawings merely provide examples, and are not intended to limit interpretation of the invention. The same element as that described in the drawing already discussed is denoted by the same reference numeral throughout the description and the drawings, and detailed description thereof will not be repeated in some cases.

First Embodiment

FIG. 1 is a block diagram illustrating a configuration example of a display device with a touch detection function according to a first embodiment. As illustrated in FIG. 1, a display device 1 with a touch detection function includes a display unit 10 with a touch detection function, a control unit 11, a gate driver 12, a source driver 13, a drive electrode driver 14, and a touch detection unit 40. In the display device 1 with a touch detection function, a touch detection function is incorporated in the display unit 10 with a touch detection function. The display unit 10 with a touch detection function is a device integrating a display panel 20 including a liquid crystal display element as a display element with a touch panel 30 serving as a touch detection device for detecting a touch input. The display unit 10 with a touch detection function may be what is called an on-cell device in which the touch panel 30 is mounted on the display panel 20. The display panel 20 may be, for example, an organic EL display panel.

As described later, the display panel 20 is an element that sequentially performs scanning for each horizontal line to perform display in accordance with a scanning signal Vscan supplied from the gate driver 12. The control unit 11 is a circuit that supplies a control signal to each of the gate driver 12, the source driver 13, the drive electrode driver 14, and the touch detection unit 40 based on a video signal Vdisp supplied from the outside to control these components to operate in synchronization with each other.

The gate driver 12 has a function of sequentially selecting one horizontal line to be a display driving target of the display unit 10 with a touch detection function based on the control signal supplied from the control unit 11.

The source driver 13 is a circuit that supplies a pixel signal Vpix to each sub-pixel SPix (described later) in the display unit 10 with a touch detection function based on the control signal supplied from the control unit 11.

The drive electrode driver 14 is a circuit that supplies a drive signal Vcom to a drive electrode COML (described later) in the display unit 10 with a touch detection function based on the control signal supplied from the control unit 11.

The touch panel 30 operates based on a basic principle of capacitance touch detection, and performs a touch detection operation using a mutual capacitance system to detect contact or proximity of an external conductor to a display region. The touch panel 30 may perform a touch detection operation using a self capacitance system.

The touch detection unit 40 is a circuit that detects whether there is a touch on the touch panel 30 based on the control signal supplied from the control unit 11 and a touch detection signal Vdet1 supplied from the touch panel 30. The touch detection unit 40 obtains coordinates at which a touch input is performed when there is a touch. The touch detection unit 40 includes a touch detection signal amplification unit 42, an A/D conversion unit 43, a signal processing unit 44, and a coordinate extracting unit 45. A detection timing control unit 46 controls the A/D conversion unit 43, the signal processing unit 44, and the coordinate extracting unit 45 to operate in synchronization with each other based on the control signal supplied from the control unit 11.

Figure 2:
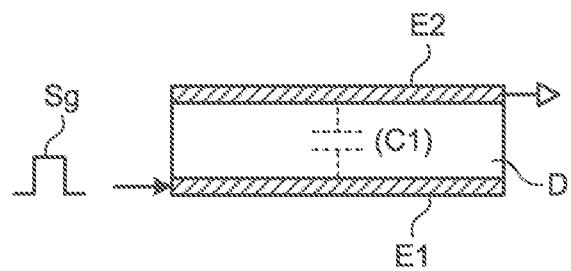
FIG. 2 is an explanatory diagram representing a state in which a finger is in a non-contact state or a non-proximate state for explaining a basic principle of mutual capacitance touch detection.
Figure 3:
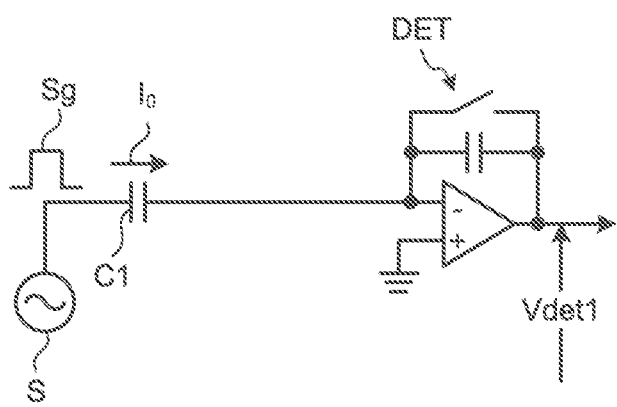
FIG. 3 is an explanatory diagram illustrating an example of an equivalent circuit of the state in which the finger is in a non-contact state or a non-proximate state as illustrated in FIG. 2.
Figure 4:
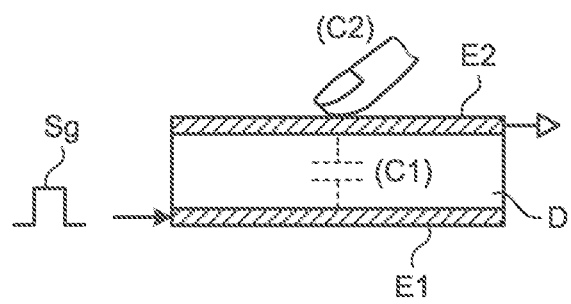
FIG. 4 is an explanatory diagram representing a state in which the finger is in a contact state or a proximate state for explaining the basic principle of mutual capacitance touch detection.
Figure 5:
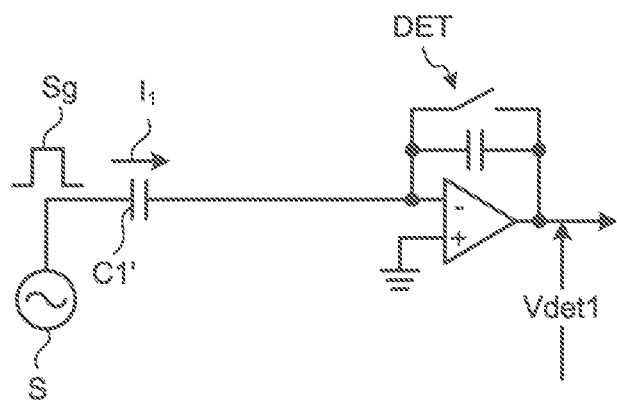
FIG. 5 is an explanatory diagram illustrating an example of an equivalent circuit of the state in which the finger is in a contact state or a proximate state as illustrated in FIG. 4.
Figure 6:
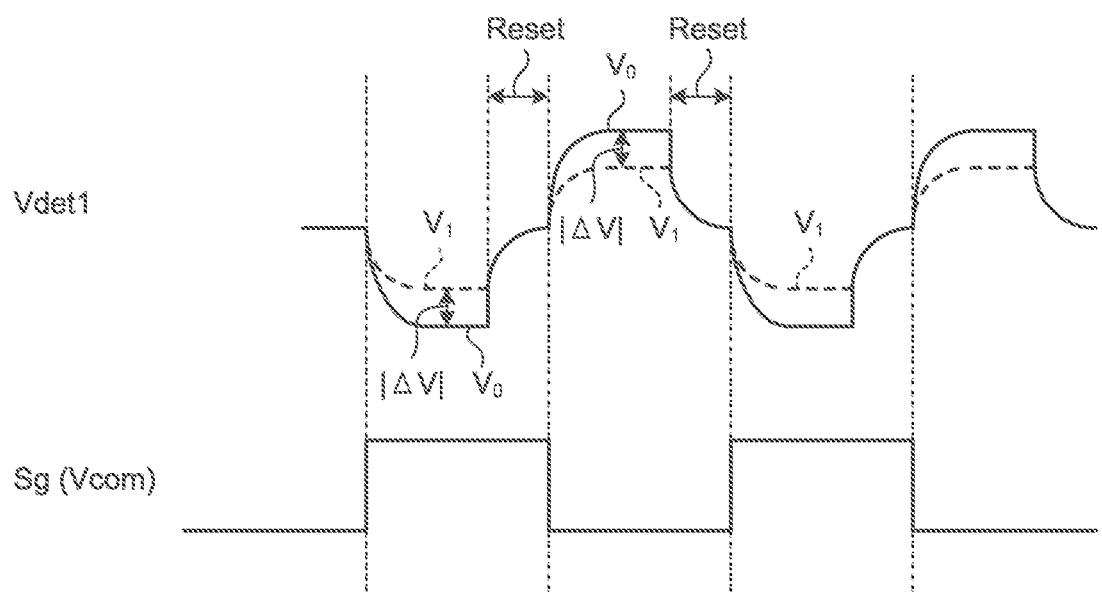
FIG. 6 is a diagram representing an example of waveforms of a drive signal and a touch detection signal in mutual capacitance touch detection.

As described above, the touch panel 30 operates based on the basic principle of capacitance touch detection. With reference to FIGS. 2 to 6, the following describes the basic principle of mutual capacitance touch detection performed by the display device 1 with a touch detection function according to the present embodiment. FIG. 2 is an explanatory diagram representing a state in which a finger is in a non-contact state or a non-proximate state for explaining the basic principle of mutual capacitance touch detection. FIG. 3 is an explanatory diagram illustrating an example of an equivalent circuit of the state in which the finger is in a non-contact state or a non-proximate state as illustrated in FIG. 2. FIG. 4 is an explanatory diagram representing a state in which the finger is in a contact state or a proximate state for explaining the basic principle of mutual capacitance touch detection. FIG. 5 is an explanatory diagram illustrating an example of an equivalent circuit of the state in which the finger is in a contact state or a proximate state as illustrated in FIG. 4. FIG. 6 is a diagram representing an example of waveforms of the drive signal and the touch detection signal. The following describes a case in which the finger is brought into contact with or proximate to the touch panel. Alternatively, for example, an object including a conductor such as a stylus pen may be replaced with the finger.

For example, as illustrated in FIG. 2, a capacitive element C1 includes a pair of electrodes arranged to be opposed to each other with a dielectric D interposed therebetween, that is, a drive electrode E1 and a touch detection electrode E2. As illustrated in FIG. 3, one end of the capacitive element C1 is coupled to an AC signal source (drive signal source) S, and the other end thereof is coupled to a voltage detector DET. The voltage detector DET is, for example, an integrating circuit included in the touch detection signal amplification unit 42 illustrated in FIG. 1.

When an AC rectangular wave Sg having a predetermined frequency (for example, about several kHz to several hundreds kHz) is applied to the drive electrode E1 (one end of the capacitive element C1) from the AC signal source S, an output waveform (touch detection signal Vdet1) as illustrated in FIG. 6 appears via the voltage detector DET coupled to the touch detection electrode E2 (the other end of the capacitive element C1). The AC rectangular wave Sg corresponds to the drive signal Vcom input from the drive electrode driver 14.

In a state in which the finger is not in contact with or proximate to the touch panel (non-contact state), as illustrated in FIGS. 2 and 3, a current $I_0$ corresponding to a capacitance value of the capacitive element C1 flows in accordance with charge and discharge of the capacitive element C1. The voltage detector DET illustrated in FIG. 3 converts variation in the current $I_0$ corresponding to the AC rectangular wave Sg into variation in a voltage (a waveform $V_0$ of a solid line (refer to FIG. 6)).

In a state in which the finger is in contact with or proximate to the touch panel (contact state), as illustrated in FIG. 4, capacitance C2 generated by the finger is in contact with or proximate to the touch detection electrode E2, so that capacitance corresponding to a fringe between the drive electrode E1 and the touch detection electrode E2 is shielded. Due to this, as illustrated in FIG. 5, the capacitive element C1 functions as a capacitive element C1' having a capacitance value smaller than the capacitance value in a non-contact state. With reference to the equivalent circuit illustrated in FIG. 5, a current $I_1$ flows through the capacitive element C1'. As illustrated in FIG. 6, the voltage detector DET converts variation in the current $I_1$ corresponding to the AC rectangular wave Sg into variation in the voltage (a waveform $V_1$ of a dotted line). In this case, amplitude of the waveform $V_1$ is smaller than that of the waveform $V_0$ described above. Accordingly, an absolute value $|\Delta V|$ of a voltage difference between the waveform $V_0$ and the waveform $V_1$ varies depending on influence of a conductor such as a finger that is brought into contact with or proximate to the touch panel from the outside. To accurately detect the absolute value $|\Delta V|$ of the voltage difference between the waveform $V_0$ and the waveform $V_1$ it is more preferable to provide, to an operation of the voltage detector DET, a period Reset for resetting charge and discharge of a capacitor in accordance with a frequency of the AC rectangular wave Sg through switching in the circuit.

The touch panel 30 illustrated in FIG. 1 sequentially performs scanning for each detection block in accordance with the drive signal Vcom supplied from the drive electrode driver 14 to perform mutual capacitance touch detection.

The touch panel 30 outputs the touch detection signal Vdet1 for each detection block via the voltage detector DET illustrated in FIG. 3 or FIG. 5 from a plurality of touch detection electrodes TDL described later. The touch detection signal Vdet1 is supplied to the touch detection signal amplification unit 42 of the touch detection unit 40.

The touch detection signal amplification unit 42 amplifies the touch detection signal Vdet1 supplied from the touch panel 30. The touch detection signal amplification unit 42 may include an analog low pass filter (LPF) serving as a low-pass analog filter that removes a high frequency component (noise component) included in the touch detection signal Vdet1 and outputs the result.

The A/D conversion unit 43 samples each analog signal output from the touch detection signal amplification unit 42 at a timing synchronized with the drive signal Vcom, and converts the analog signal into a digital signal.

The signal processing unit 44 includes a digital filter that reduces a frequency component (noise component) included in the output signal of the A/D conversion unit 43, other than a frequency at which the drive signal Vcom is sampled. The signal processing unit 44 is a logic circuit that detects whether there is a touch on the touch panel 30 based on the output signal of the A/D conversion unit 43. The signal processing unit 44 performs processing of extracting only a difference of the detection signal caused by the finger. The signal of the difference caused by the finger has the absolute value $|\Delta V|$ of the difference between the waveform $V_0$ and the waveform $V_1$ described above. The signal processing unit 44 may perform an arithmetic operation for averaging the absolute value $|\Delta V|$ for each detection block to obtain an average value of the absolute value $|\Delta V|$. Due to this, the signal processing unit 44 can suppress influence of the noise. The signal processing unit 44 compares the detected signal of the difference caused by the finger with a predetermined threshold voltage. If the signal of the difference is smaller than the threshold voltage, the signal processing unit 44 determines that an external proximity object is in a non-contact state. On the other hand, the signal processing unit 44 compares the detected signal of the difference caused by the finger with the predetermined threshold voltage. If the signal of the difference is equal to or larger than the threshold voltage, the signal processing unit 44 determines that the external proximity object is in a contact state. In this way, the touch detection unit 40 can perform touch detection.

The coordinate extracting unit 45 is a logic circuit that obtains, when a touch is detected by the signal processing unit 44, touch panel coordinates at which the touch is detected. The coordinate extracting unit 45 outputs the touch panel coordinates as a detection signal output Vout. As described above, the display device 1 with a touch detection function according to the present embodiment can perform the touch detection operation based on the basic principle of mutual capacitance touch detection.

Figure 7:
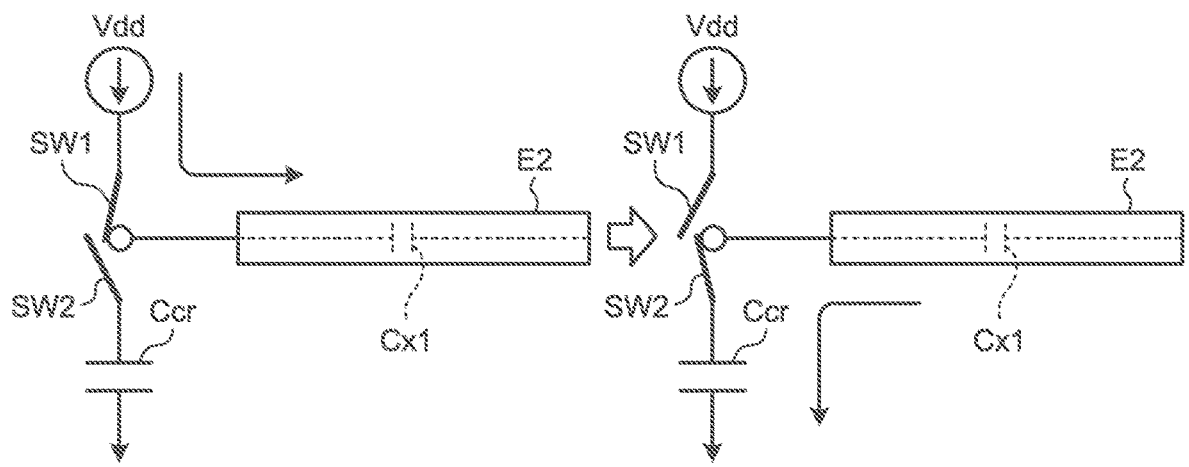
FIG. 7 is an explanatory diagram representing the state in which the finger is in a non-contact state or a non-proximate state for explaining a basic principle of self capacitance touch detection.
Figure 8:
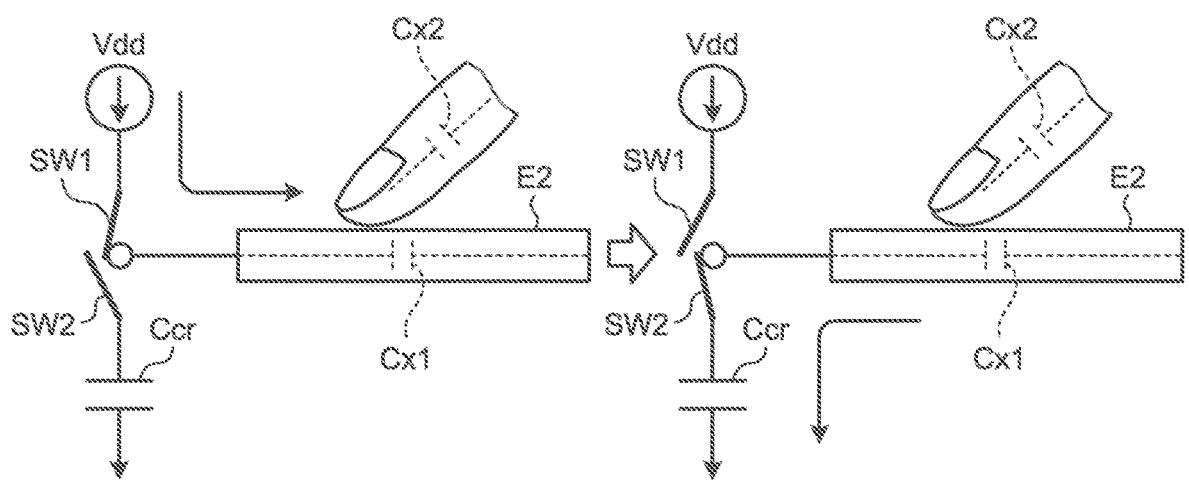
FIG. 8 is an explanatory diagram representing the state in which the finger is in a contact state or a proximate state for explaining the basic principle of self capacitance touch detection.
Figure 9:
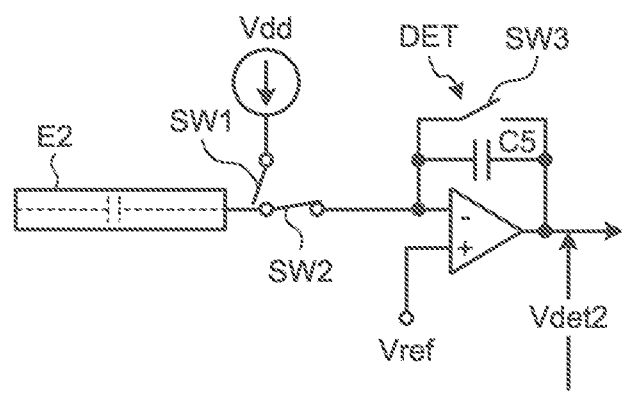
FIG. 9 is an explanatory diagram illustrating an example of an equivalent circuit of self capacitance touch detection.
Figure 10:
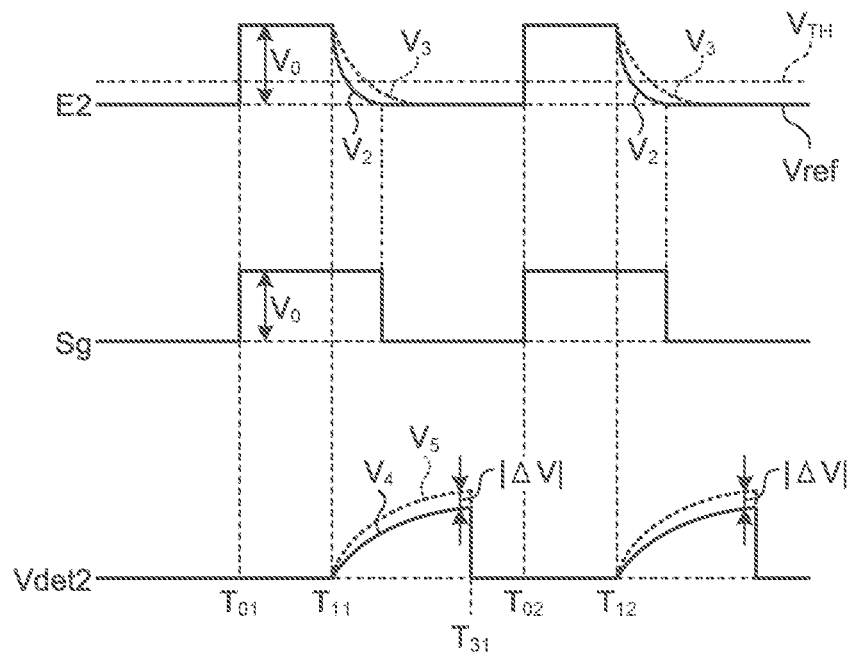
FIG. 10 is a diagram representing an example of waveforms of a drive signal and a touch detection signal in self capacitance touch detection.

Next, the following describes a basic principle of self capacitance touch detection with reference to FIGS. 7 to 10. FIG. 7 is an explanatory diagram representing the state in which the finger is in a non-contact state or a non-proximate state for explaining the basic principle of self capacitance touch detection. FIG. 8 is an explanatory diagram representing the state in which the finger is in a contact state or a proximate state for explaining the basic principle of self capacitance touch detection. FIG. 9 is an explanatory diagram illustrating an example of an equivalent circuit of self capacitance touch detection. FIG. 10 is a diagram representing an example of waveforms of a drive signal and a touch detection signal in self capacitance touch detection.

In the state in which the finger is in a non-contact state or a non-proximate state, the left figure of FIG. 7 illustrates a state in which a power source Vdd is coupled to the touch detection electrode E2 via a switch SW1 and the touch detection electrode E2 is not coupled to a capacitor Ccr via a switch SW2. In this state, capacitance Cx1 included in the touch detection electrode E2 is charged. The right figure of FIG. 7 illustrates a state in which the power source Vdd is disconnected from the touch detection electrode E2 via the switch SW1 and the touch detection electrode E2 is coupled to the capacitor Ccr via the switch SW2. In this state, an electric charge of the capacitance Cx1 is discharged via the capacitor Ccr.

In the state in which the finger is in a contact state or a proximate state, the left figure of FIG. 8 illustrates a state in which the power source Vdd is coupled to the touch detection electrode E2 via the switch SW1 and the touch detection electrode E2 is not coupled to the capacitor Ccr via the switch SW2. In this state, capacitance Cx2 caused by the finger that is proximate to the touch detection electrode E2 is charged in addition to the capacitance Cx1 included in the touch detection electrode E2. The right figure of FIG. 8 illustrates a state in which the power source Vdd is disconnected from the touch detection electrode E2 via the switch SW1 and the touch detection electrode E2 is coupled to the capacitor Ccr via the switch SW2. In this state, the electric charge of the capacitance Cx1 and an electric charge of the capacitance Cx2 are discharged via the capacitor Ccr.

A voltage change characteristic of the capacitor Ccr during discharge (in the state in which the finger is in a contact state or a proximate state) illustrated in the right figure of FIG. 8 is obviously different from the voltage change characteristic of the capacitor Ccr during discharge (in the state in which the finger is in a non-contact state or a non-proximate state) illustrated in the right figure of FIG. 7 due to presence of the capacitance Cx2. Thus, in a self capacitance system, whether there is an operation input by a finger and the like is determined by utilizing the fact that the voltage change characteristic of the capacitor Ccr varies depending on the presence or absence of the capacitance Cx2.

Specifically, AC rectangular wave Sg (refer to FIG. 10) having a predetermined frequency (for example, about several kHz to several hundreds kHz) is applied to the touch detection electrode E2. The voltage detector DET illustrated in FIG. 9 converts variation in a current corresponding to the AC rectangular wave Sg into variation in a voltage (waveforms $V_4$ and $V_5$).

As described above, the touch detection electrode E2 is configured to be disconnectable with the switch SW1 and the switch SW2. In FIG. 10, at a timing of time $T_{01}$, the AC rectangular wave Sg raises a voltage level corresponding to a voltage $V_0$. At this point, the switch SW1 is in an ON state and the switch SW2 is in an OFF state. Due to this, the voltage of the touch detection electrode E2 is raised to be the voltage $V_0$. Next, the switch SW1 is turned OFF before a timing of time $T_{11}$. Although the touch detection electrode E2 is in a floating state at this point, the electric potential of the touch detection electrode E2 is kept at $V_0$ with the capacitance Cx1 (refer to FIG. 7) of the touch detection electrode E2 or the capacitance (Cx1+Cx2, refer to FIG. 8) obtained by adding the capacitance Cx2 generated by contact or proximity of a finger and the like to the capacitance Cx1 of the touch detection electrode E2. The switch SW3 is turned ON before the timing of time $T_{11}$, and turned OFF after a predetermined time has elapsed to reset the voltage detector DET. Through this reset operation, the output voltage becomes substantially the same voltage as Vref.

Subsequently, when the switch SW2 is turned ON at the timing of time $T_{11}$, a reverse input unit of the voltage detector DET has the voltage $V_0$ of the touch detection electrode E2. Thereafter, the voltage of the reverse input unit of the voltage detector DET is lowered to a reference voltage Vref in accordance with a time constant of the capacitance Cx1 (or Cx1+Cx2) of the touch detection electrode E2 and capacitance C5 in the voltage detector DET. At this point, an electric charge accumulated in the capacitance Cx1 (or Cx1+Cx2) of the touch detection electrode E2 moves to the capacitance C5 in the voltage detector DET, so that the output of the voltage detector DET is increased (Vdet2). The output (Vdet2) of the voltage detector DET is represented as the waveform $V_4$ of a solid line when a finger and the like are not proximate to the touch detection electrode E2, and Vdet2=Cx1×$V_0$/C5 is satisfied. When capacitance caused by a finger and the like is added, the output (Vdet2) is represented as the waveform $V_5$ of a dotted line, and Vdet2=(Cx1+Cx2)×$V_0$/C5 is satisfied.

Thereafter, at a timing of time $T_{31}$ after the electric charge of the capacitance Cx1 (or Cx1+Cx2) of the touch detection electrode E2 sufficiently moves to the capacitance C5, the switch SW2 is turned OFF and the switch SW1 and the switch SW3 are turned ON, and thus the electric potential of the touch detection electrode E2 is caused to be at a low level that is the same as the electric potential of the AC rectangular wave Sg, and the voltage detector DET is reset. In this case, a timing for turning ON the switch SW1 may be any timing after the switch SW2 is turned OFF and before time $T_{02}$. A timing for resetting the voltage detector DET may be any timing after the switch SW2 is turned OFF and before time $T_{12}$. The above operation is repeated at a predetermined frequency (for example, about several kHz to several hundreds kHz). It can be measured whether there is an external proximity object (whether there is a touch) based on an absolute value |ΔV| of a difference between the waveform $V_4$ and the waveform $V_5$. As illustrated in FIG. 10, the electric potential of the touch detection electrode E2 is represented as the waveform $V_2$ when a finger and the like are in a non-proximate state, and represented as the waveform $V_3$ when the capacitance Cx2 caused by a finger and the like is added. As a detection method, for example, it can be measured whether there is an external proximity object (whether there is a touch) by measuring a time until each of the waveform $V_2$ and the waveform $V_3$ is lowered to a predetermined voltage $V_{TH}$.

Figure 11:
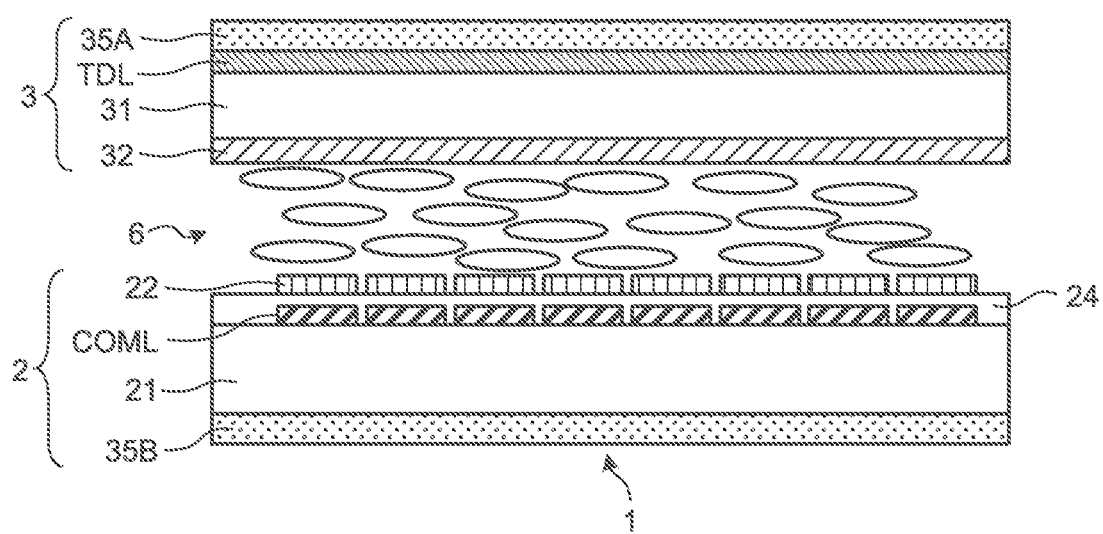
FIG. 11 is a cross-sectional view representing a schematic cross-sectional structure of the display device with a touch detection function.
Figure 12:
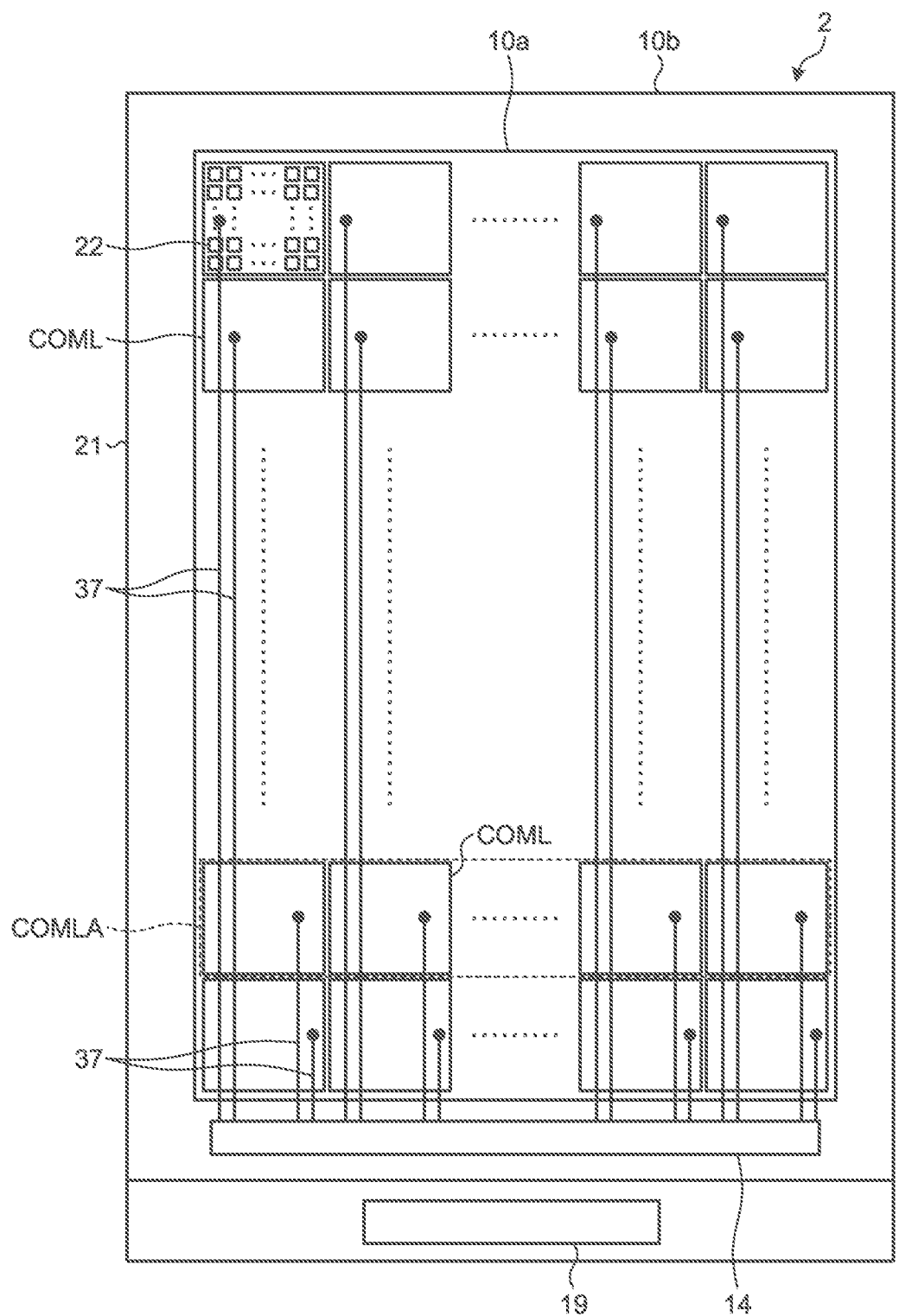
FIG. 12 is a plan view schematically illustrating a TFT substrate configuring the display device with a touch detection function.
Figure 13:
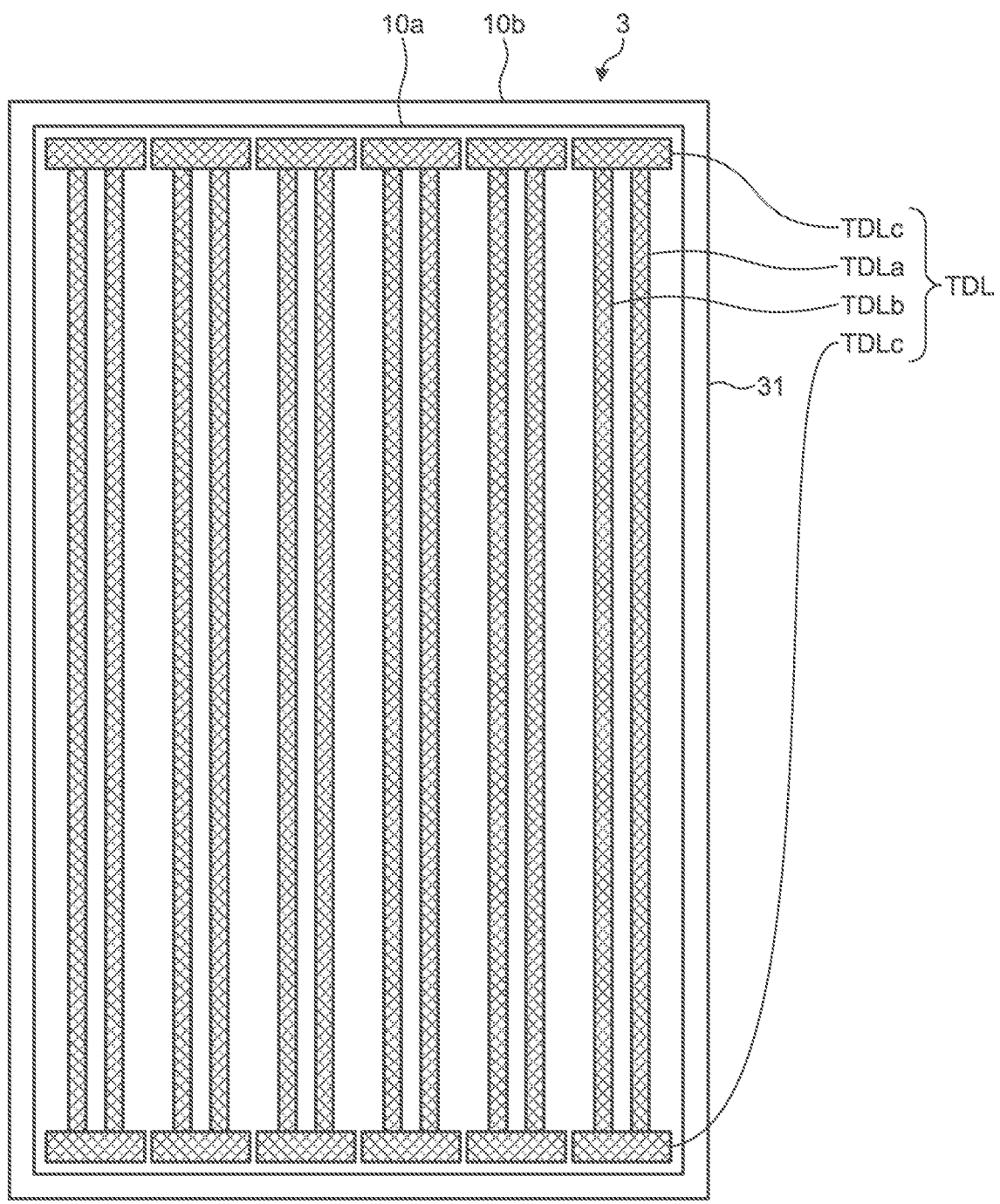
FIG. 13 is a plan view schematically illustrating a glass substrate configuring the display device with a touch detection function.

Next, the following describes a configuration example of the display device 1 with a touch detection function in detail. FIG. 11 is a cross-sectional view representing a schematic cross-sectional structure of the display device with a touch detection function. FIG. 12 is a plan view schematically illustrating a TFT substrate configuring the display device with a touch detection function. FIG. 13 is a plan view schematically illustrating a glass substrate configuring the display device with a touch detection function.

As illustrated in FIG. 11, the display device 1 with a touch detection function includes a pixel substrate 2, a counter substrate 3 arranged to be opposed to a surface of the pixel substrate 2 in a perpendicular direction, and a liquid crystal layer 6 interposed between the pixel substrate 2 and the counter substrate 3.

As illustrated in FIG. 11, the pixel substrate 2 includes a thin film transistor (TFT) substrate 21 serving as a circuit board, a plurality of pixel electrodes 22 arranged in a matrix above the TFT substrate 21, a plurality of drive electrodes COML arranged between the TFT substrate 21 and the pixel electrodes 22, and an insulating layer 24 that insulates the pixel electrode 22 from the drive electrode COML. A polarizing plate 35B may be arranged under the TFT substrate 21 with a bonding layer interposed therebetween (not illustrated).

As illustrated in FIG. 12, the TFT substrate 21 includes a display region 10a for displaying an image and a frame region 10b arranged around the display region 10a. The display region 10a has a rectangular shape having a pair of long sides and a pair of short sides. The frame region 10b has a frame shape surrounding four sides of the display region 10a.

The drive electrodes COML are arranged in the display region 10a of the TFT substrate 21, and arrayed in a matrix in a direction along the long side of the display region 10a and a direction along the short side thereof. Each of the drive electrodes COML has a rectangular shape or a square shape. The drive electrode COML is made of, for example, a translucent conductive material such as indium tin oxide (ITO). A plurality of pixel electrodes 22 are arranged in a matrix at a position corresponding to one drive electrode COML. An area of the pixel electrode 22 is smaller than that of the drive electrode COML. Although FIG. 12 illustrates part of the drive electrodes COML and the pixel electrodes 22, the drive electrodes COML and the pixel electrodes 22 are arranged over the entire display region 10a. In the present embodiment, a plurality of drive electrodes COML arranged in a row direction may be driven at the same time, serving as one drive electrode block COMLA.

The drive electrode driver 14 and a display control IC 19 are arranged on the short side of the frame region 10b of the TFT substrate 21. A flexible substrate (not illustrated) is coupled to the short side of the frame region 10b, and is coupled to the display control IC 19 and/or the drive electrode driver 14. Wires 37 are coupled to the respective drive electrodes COML, and are drawn out to the short side of the frame region 10b. The drive electrode driver 14 is coupled to each of the drive electrodes COML via the wires 37 arranged in the display region 10a. Due to this, the drive electrode driver 14 is not required to be arranged on the long side of the frame region 10b, so that the width of the frame region 10b on the long side can be reduced.

The display control IC 19 is a chip mounted on the TFT substrate 21 using a chip on glass (COG) system, and incorporates the control unit 11 described above. The display control IC 19 outputs a control signal to a gate line GCL for display, a data line SGL for display (described later), and the like based on the video signal Vdisp (refer to FIG. 1) supplied from an external host IC (not illustrated).

As illustrated in FIG. 11, the counter substrate 3 includes a glass substrate 31 and a color filter 32 formed on one face of the glass substrate 31. The touch detection electrode TDL serving as a detection electrode of the touch panel 30 is arranged on the other face of the glass substrate 31. A polarizing plate 35A is arranged above the touch detection electrode TDL with a bonding layer interposed therebetween (not illustrated). A flexible substrate (not illustrated) is coupled to the glass substrate 31. The flexible substrate is coupled to the touch detection electrode TDL via the frame wire.

As illustrated in FIG. 13, a plurality of touch detection electrodes TDL are arranged in the display region 10a of the glass substrate 31. The touch detection electrodes TDL each extend in a direction along the long side of the display region 10a, and are arrayed in a direction along the short side of the display region 10a. Each touch detection electrode TDL includes two detection electrodes TDLa and TDLb, and coupling parts TDLc and TDLc that couple the detection electrode TDLa to the detection electrode TDLb. The two detection electrodes TDLa and TDLb extend in the direction along the long side of the display region 10a and parallel with each other. The coupling parts TDLc are arranged on both ends of the detection electrodes TDLa and TDLb.

As illustrated in FIG. 11, the TFT substrate 21 and the glass substrate 31 are arranged to be opposed to each other with a predetermined gap therebetween. The liquid crystal layer 6 is arranged in a space between the TFT substrate 21 and the glass substrate 31. The liquid crystal layer 6 modulates light passing therethrough depending on a state of an electric field. For example, used are liquid crystals of lateral electric-field mode such as in-plane switching (IPS) including fringe field switching (FFS). An orientation film may be arranged between the liquid crystal layer 6 and the pixel substrate 2, and between the liquid crystal layer 6 and the counter substrate 3 illustrated in FIG. 11.

Figure 14:
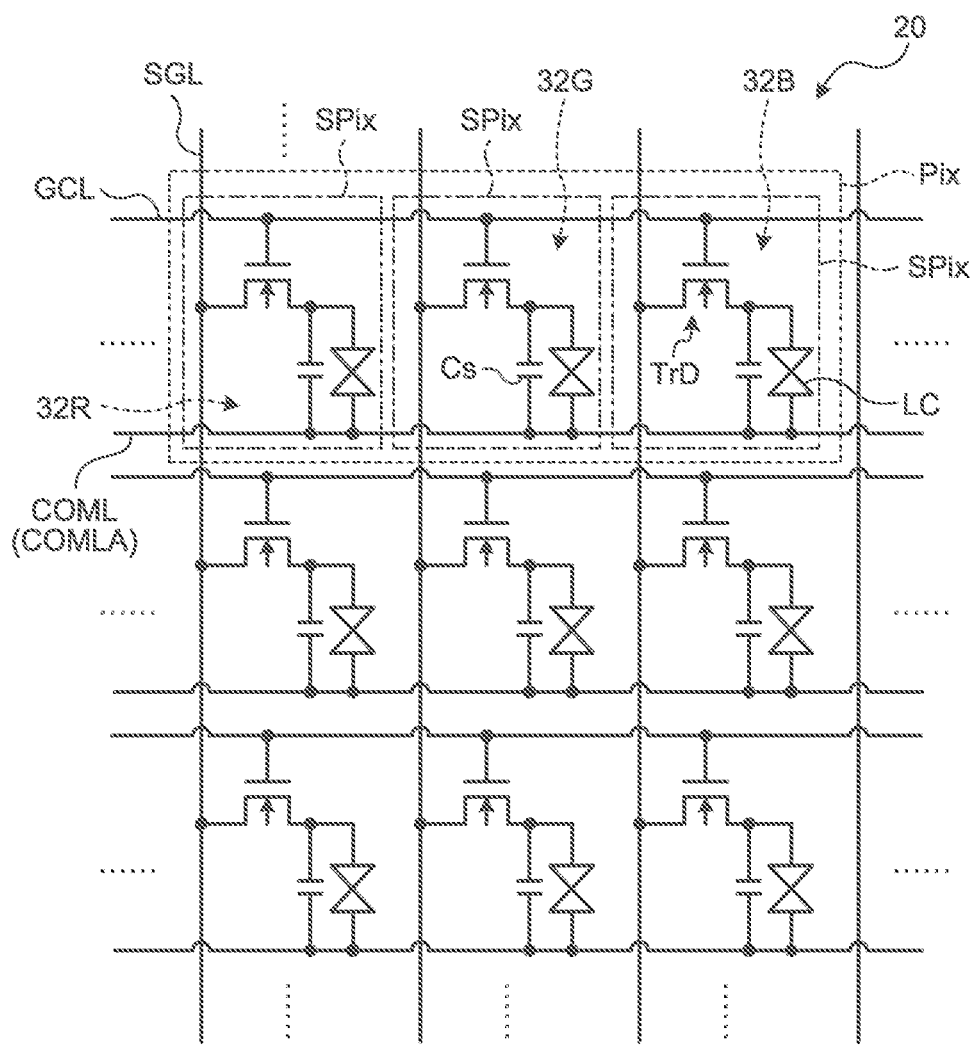
FIG. 14 is a circuit diagram representing a pixel array of a display unit with a touch detection function according to the first embodiment.

Next, the following describes a display operation of the display panel 20. FIG. 14 is a circuit diagram representing a pixel array of the display unit with a touch detection function according to the first embodiment. In the TFT substrate 21 illustrated in FIG. 11, formed are a switching element TrD for display of each sub-pixel SPix illustrated in FIG. 14, and wires such as the data line SGL for display for supplying the pixel signal Vpix to each pixel electrode 22 and the gate line GCL for display for supplying a drive signal for driving each switching element TrD for display. The data line SGL for display and the gate line GCL for display extend along a plane parallel with the surface of the TFT substrate 21.

The display panel 20 illustrated in FIG. 14 includes a plurality of sub-pixels SPix arranged in a matrix. Each sub-pixel SPix includes the switching element TrD for display and a liquid crystal element LC. The switching element TrD for display is constituted of a thin film transistor. In this example, the switching element TrD for display is constituted of an n-channel metal oxide semiconductor (MOS) TFT. A source of the switching element TrD for display is coupled to the data line SGL for display, a gate thereof is coupled to the gate line GCL for display, and a drain thereof is coupled to one end of the liquid crystal element LC. In the equivalent circuit, one end of the liquid crystal element LC including the liquid crystal layer 6 is coupled to the drain of the switching element TrD for display, and the other end thereof is coupled to each drive electrode COML included in the drive electrode block COMLA. The insulating layer 24 is arranged between the pixel electrode 22 and the common electrode (drive electrode COML), which forms holding capacitance Cs illustrated in FIG. 14.

The sub-pixel SPix is mutually coupled to the other sub-pixel SPix belonging to the same row in the display panel 20 via the gate line GCL for display. The gate line GCL for display is coupled to the gate driver 12 (refer to FIG. 1), and receives the scanning signal Vscan supplied from the gate driver 12. The sub-pixel SPix is mutually coupled to the other sub-pixel SPix belonging to the same column in the display panel 20 via the data line SGL for display. The data line SGL for display is coupled to the source driver 13 (refer to FIG. 1), and receives the pixel signal Vpix supplied from the source driver 13. Each drive electrode COML included in the drive electrode block COMLA is coupled to the drive electrode driver 14 (refer to FIG. 1), and receives the drive signal Vcom supplied from the drive electrode driver 14.

The gate driver 12 illustrated in FIG. 1 drives the gate line GCL for display to sequentially perform scanning. The gate driver 12 applies the scanning signal Vscan (refer to FIG. 1) to a gate of a TFT element Tr of the sub-pixel SPix via the gate line GCL for display. Accordingly, one line (one horizontal line) of the sub-pixels SPix is sequentially selected as a display driving target. The source driver 13 supplies the pixel signal Vpix to the sub-pixels SPix belonging to the selected one horizontal line via the data line SGL for display illustrated in FIG. 14. In performing the display operation for each horizontal line as described above, the drive electrode driver 14 applies the drive signal Vcom (display drive signal Vcomdc) to the drive electrode COML. Due to this, each drive electrode COML functions as a common electrode for the pixel electrode 22 at the time of display.

In the color filter 32 illustrated in FIG. 11, for example, color regions of the color filter colored in three colors of red (R), green (G), and blue (B) may be periodically arranged. Color regions 32R, 32G, and 32B of three colors R, G, and B are associated, as one set, with each of the sub-pixels SPix illustrated in FIG. 14, and a pixel Pix is constituted of a set of sub-pixels SPix corresponding to the color regions 32R, 32G, and 32B of three colors. As illustrated in FIG. 11, the color filter 32 is opposed to the liquid crystal layer 6 in a direction perpendicular to the TFT substrate 21. Another combination of colors may be used for the color filter 32 so long as the colors are different from each other. The combination of colors for the color filter 32 is not limited to three colors. Alternatively, four or more colors may be combined.

As illustrated in FIG. 14, in the present embodiment, the drive electrode block COMLA including a plurality of drive electrodes COML is arranged along the gate line GCL for display. Alternatively, the drive electrode block COMLA is arranged to intersect with the data line SGL for display. The arrangement of the drive electrode block COMLA is not limited thereto. The drive electrode block COMLA may be arranged along the data line SGL for display, for example.

Figure 15:
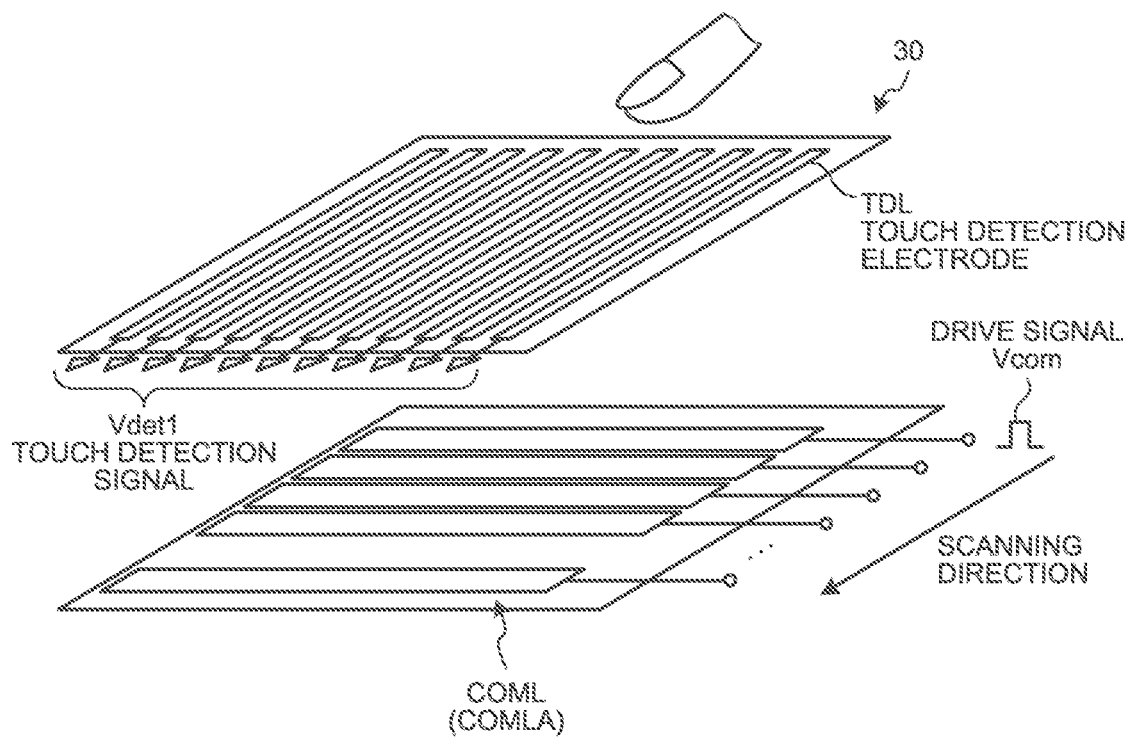
FIG. 15 is a perspective view representing a configuration example of a drive electrode and a touch detection electrode of the display unit with a touch detection function according to the first embodiment.

The drive electrode COML illustrated in FIGS. 11 and 12 functions as a common electrode that gives a common potential (reference potential) to the pixel electrodes 22 of the display panel 20. The drive electrode COML also functions as a drive electrode for performing mutual capacitance touch detection of the touch panel 30. The drive electrode COML may also function as a detection electrode for performing self capacitance touch detection of the touch panel 30. FIG. 15 is a perspective view representing a configuration example of the drive electrode and the touch detection electrode of the display unit with a touch detection function according to the first embodiment. The touch panel 30 is constituted of the drive electrode COML arranged in the pixel substrate 2 and the touch detection electrode TDL arranged in the counter substrate 3.

The drive electrode block COMLA including a plurality of drive electrodes COML functions as a plurality of stripe electrode patterns extending in a horizontal direction of FIG. 15. The touch detection electrode TDL includes a plurality of electrode patterns intersecting with a plurality of drive electrode blocks COMLA. The touch detection electrode TDL is opposed to the drive electrode block COMLA in a direction perpendicular to the surface of the TFT substrate 21 (refer to FIG. 11). Each electrode pattern of the touch detection electrode TDL is coupled to an input of the touch detection signal amplification unit 42 (refer to FIG. 1). Capacitance is generated at each intersecting portion between each drive electrode COML of the drive electrode block COMLA and each electrode pattern of the touch detection electrode TDL.

The shape of the touch detection electrode TDL and the drive electrode COML (drive electrode block COMLA) is not limited to a plurality of stripes. For example, the touch detection electrode TDL may have a comb-teeth shape and the like. Alternatively, it is sufficient that the touch detection electrode TDL is divided into a plurality of parts, and a slit that divides the drive electrode COML may have a linear shape or a curved shape.

When the touch panel 30 performs a mutual capacitance touch detection operation, the drive electrode block COMLA is sequentially scanned one by one in a time division manner by the drive electrode driver 14. Accordingly, the drive electrode COML of the drive electrode block COMLA is sequentially selected. The touch detection signal Vdet1 is output to the selected drive electrode block COMLA from the touch detection electrode TDL. The drive electrode block COMLA corresponds to the drive electrode E1 in the basic principle of mutual capacitance touch detection described above, and the touch detection electrode TDL corresponds to the touch detection electrode E2. The touch panel 30 detects a touch input in accordance with the basic principle. As illustrated in FIG. 15, in the touch panel 30, the touch detection electrode TDL and the drive electrode block COMLA intersecting with each other constitute a capacitance touch sensor in a matrix. Thus, by sequentially driving each drive electrode block COMLA, a position where an external conductor is brought into contact with or proximate to the touch panel 30 can be detected.

As an example of an operating method of the display device 1 with a touch detection function, the display device 1 with a touch detection function performs a touch detection operation (touch period) and a display operation (display period) in a time division manner. The touch detection operation and the display operation may be separately performed in any manner. The following describes a method of performing the touch detection operation and the display operation while dividing each operation into a plurality of parts within one frame period (1F period) of the display panel 20, that is, within time required for displaying video information corresponding to one screen.

Figure 16:
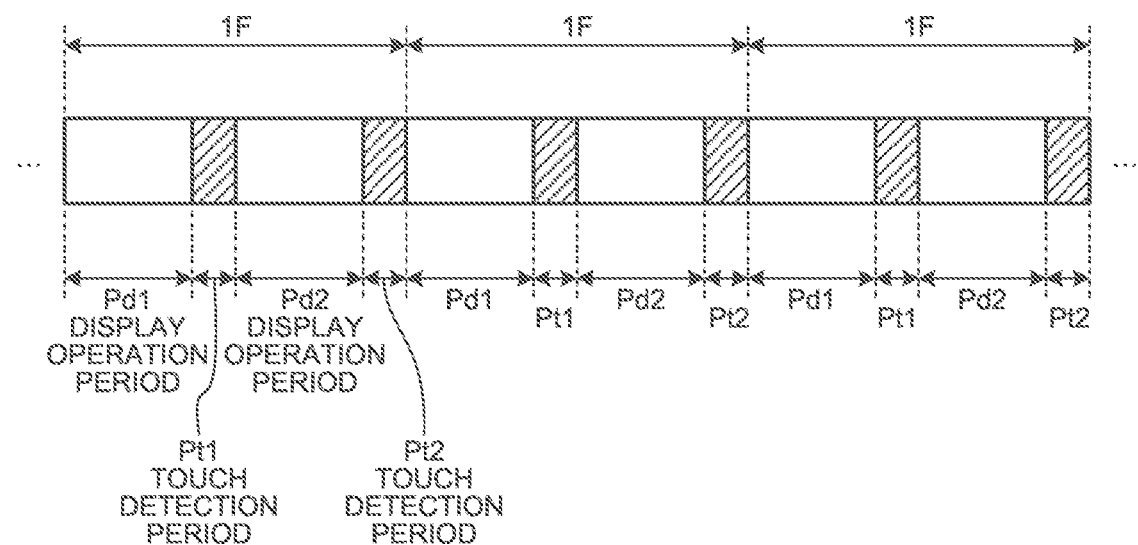
FIG. 16 is a schematic diagram representing an example of arrangement of a display period and a touch period within one frame period.

FIG. 16 is a schematic diagram representing an example of arrangement of the display period and the touch period within one frame period. One frame period (1F) includes two display periods Pd1 and Pd2, and two touch periods Pt1 and Pt2. These periods are arranged so that the display period and the touch period are alternately set on a time axis as follows: the display period Pd1, the touch period Pt1, the display period Pd2, and the touch period Pt2.

The control unit 11 (refer to FIG. 1) supplies pixel signals Vpix to a plurality of rows of pixels Pix (refer to FIG. 14)

selected in each of the display periods Pd1 and Pd2 via the gate driver 12 and the source driver 13.

The control unit 11 (refer to FIG. 1) supplies a drive signal Vcom for touch detection (touch drive signal Vcomac) to the drive electrode COML (drive electrode block COMLA) (refer to FIG. 15) selected in each of the touch periods Pt1 and Pt2 via the drive electrode driver 14. Based on the touch detection signal Vdet1 supplied from the touch detection electrode TDL, the touch detection unit 40 detects whether there is a touch input and performs an arithmetic operation of coordinates of an input position.

In the present embodiment, the drive electrode COML also functions as a common electrode of the display panel 20. Thus, the control unit 11 supplies the display drive signal Vcomdc having a common electrode potential for display to the drive electrode COML in the display periods Pd1 and Pd2.

When touch detection is performed based on a change in self capacitance of the drive electrode COML without using the touch detection electrode TDL for the touch detection operation, the drive electrode driver 14 supplies the touch drive signal Vcomac to each drive electrode COML, and based on the touch detection signal Vdet2 supplied from each drive electrode COML, the touch detection unit 40 detects whether there is a touch input and performs an arithmetic operation of coordinates of the input position.

In FIG. 16, video display for one screen is assumed to be performed while being divided into two parts within one frame period (1F). Alternatively, the display period within one frame period (1F) may be divided into a larger number of parts. The touch period may also be divided into a larger number of parts within one frame period (1F).

In each of the touch periods Pt1 and Pt2, touch detection for a half of one screen may be performed, or touch detection for one screen may be performed. Thinning-out detection and the like may be performed as needed. Each of the display operation and the touch detection operation may be performed once within one frame period (1F) without being divided into a plurality of parts.

In the touch periods Pt1 and Pt2, the gate line GCL for display and the data line SGL for display (refer to FIG. 14) may be in a floating state in which a voltage signal is not supplied and electric potential is not fixed. As described later, signals having the same waveform and being synchronized with the touch drive signal Vcomac may be supplied to the gate line GCL for display and the data line SGL for display.

Figure 17:
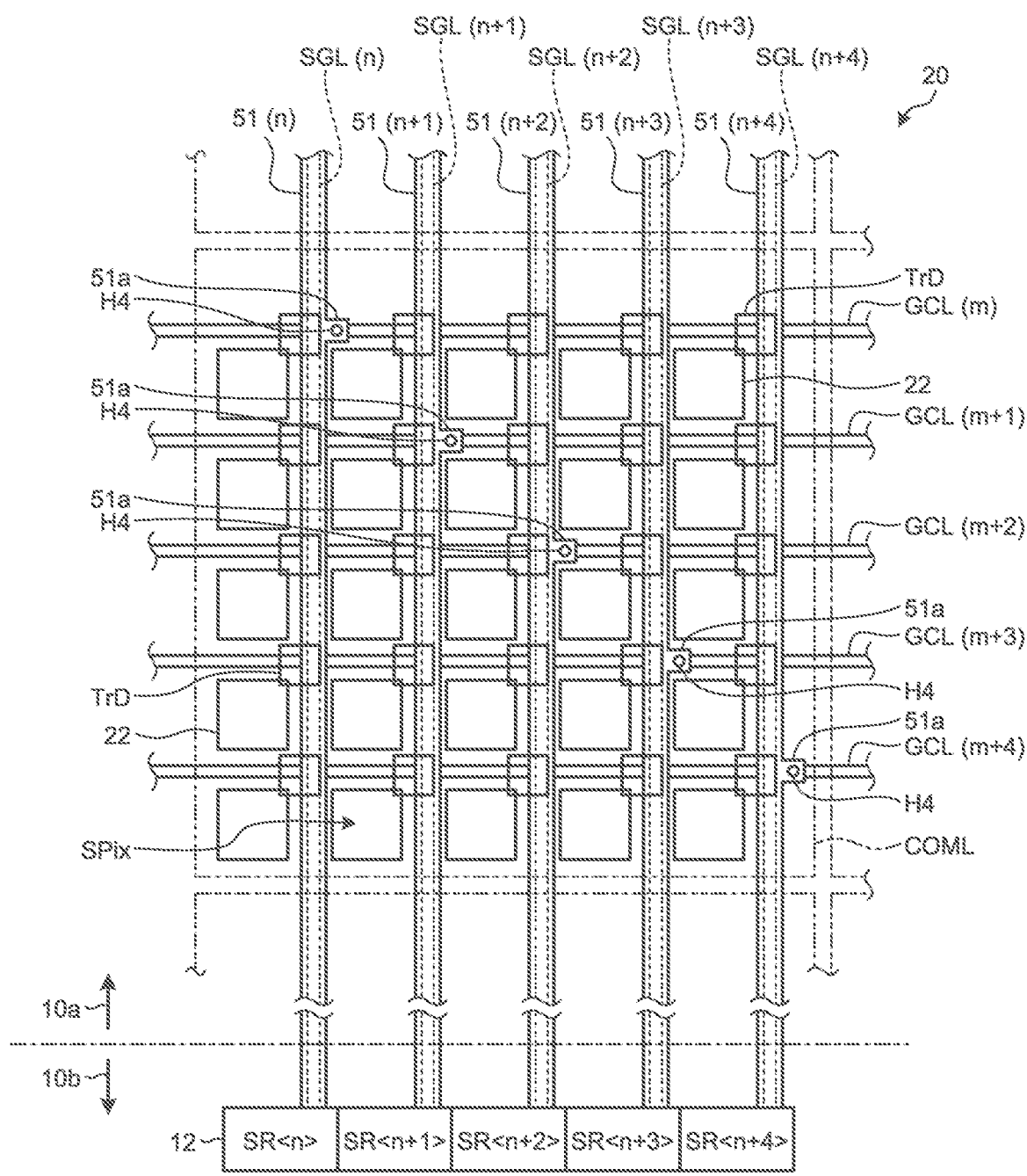
FIG. 17 is a plan view for explaining a configuration of a pixel electrode and a switching element for display of a display panel according to the first embodiment.

Next, the following describes a detailed configuration of the display panel 20 according to the present embodiment. FIG. 17 is a plan view for explaining a configuration of the pixel electrode and the switching element for the display panel according to the first embodiment.

As illustrated in FIG. 17, a plurality of pixel electrodes 22 are arranged in a matrix at a position overlapped with one drive electrode COML. The switching element TrD for display is arranged at a position corresponding to each of the pixel electrodes 22. A plurality of gate lines GCL for display each extend in a row direction, and are arranged in a column direction. A plurality of data lines SGL for display each extend in the column direction intersecting with an extending direction of the gate line GCL for display, and are arranged in the row direction. The switching element TrD for display is arranged at an intersecting part of the gate line GCL for display and the data line SGL for display. A region surrounded by the gate line GCL for display and the data line SGL for display is the sub-pixel SPix. The sub-pixel SPix is arranged to include a region where the pixel electrode 22 overlaps with the drive electrode COML.

In the present embodiment, a conductive wire 51 is arranged at a position overlapped with the data line SGL for display. A plurality of conductive wires 51 each extend in the column direction that is the same as the extending direction of the data line SGL for display, and are arranged in the row direction. The conductive wire 51 is formed at a position that is overlapped with the drive electrode COML and not overlapped with the pixel electrode 22. The conductive wire 51 includes a tab part 51a projecting toward a position overlapping with the gate line GCL for display. At a position overlapped with the tab part 51a, the gate line GCL for display is electrically coupled to the conductive wire 51 via a contact hole H4. A gate line for display in the m-th row is assumed to be a gate line GCL(m) for display, a data line for display in the n-th column is assumed to be a data line SGL(n) for display, and a conductive wire in the n-th column is represented as a conductive wire 51(n). The conductive wire 51(n) is coupled to the gate line GCL(m) for display, the conductive wire 51(n+1) is coupled to a gate line GCL(m+1) for display, and the conductive wire 51(n+2) is coupled to a gate line GCL(m+2) for display. In this way, the conductive wires 51 are coupled to different gate lines GCL for display, respectively.

The conductive wire 51 is coupled to the gate driver 12 arranged in the frame region 10b. The gate driver 12 includes shift registers SR<n>, SR<n+1>, SR<n+2>, SR<n+3>, and SR<n+4>. The conductive wires 51(n), 51(n+1), 51(n+2), 51(n+3), and 51(n+4) are coupled to the shift registers SR<n>, SR<n+1>, SR<n+2>, SR<n+3>, and SR<n+4>, respectively. The gate driver 12 sequentially scans the conductive wires 51, and supplies the scanning signal Vscan to a selected conductive wire 51. The scanning signal Vscan is transmitted to the gate line GCL for display via the conductive wire 51, and supplied to a plurality of switching elements TrD for display coupled to the gate line GCL for display. The switching element TrD for display is switched between ON and OFF with the scanning signal Vscan.

In the present embodiment, the conductive wire 51 is coupled to the gate line GCL for display, extends in a direction intersecting with the gate line GCL for display, and is drawn out to the short side of the frame region 10b. Thus, the gate driver 12 can be arranged on the short side of the frame region 10b. The present embodiment employs a configuration in which the gate driver 12 is arranged at a position on the same side as the display control IC 19 of one pair of short side portions of the frame region 10b. Alternatively, a configuration can be employed in which the gate driver 12 is arranged on a short side portion opposite to a side on which the display control IC 19 is arranged. This configuration can further reduce the width on the long side of the frame region 10b.

The conductive wire 51 is made of a metallic material that is at least one of aluminum (Al), copper (Cu), silver (Ag), molybdenum (Mo), and alloy thereof. The conductive wire 51 may be a laminate obtained by laminating a plurality of metallic materials using one or more of these metallic materials.

Figure 18:
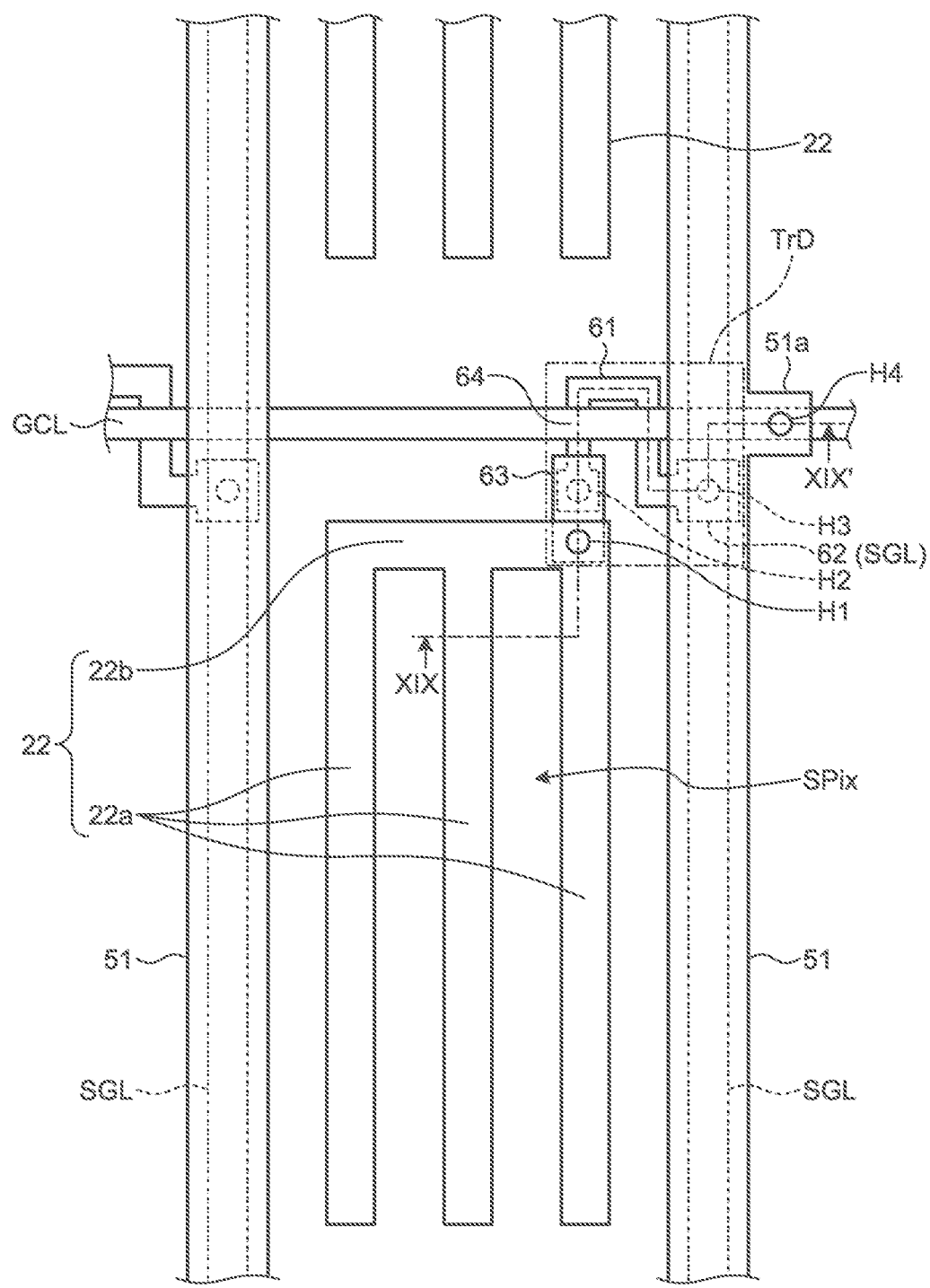
FIG. 18 is a plan view of the TFT substrate for explaining a configuration of a sub-pixel.
Figure 19:
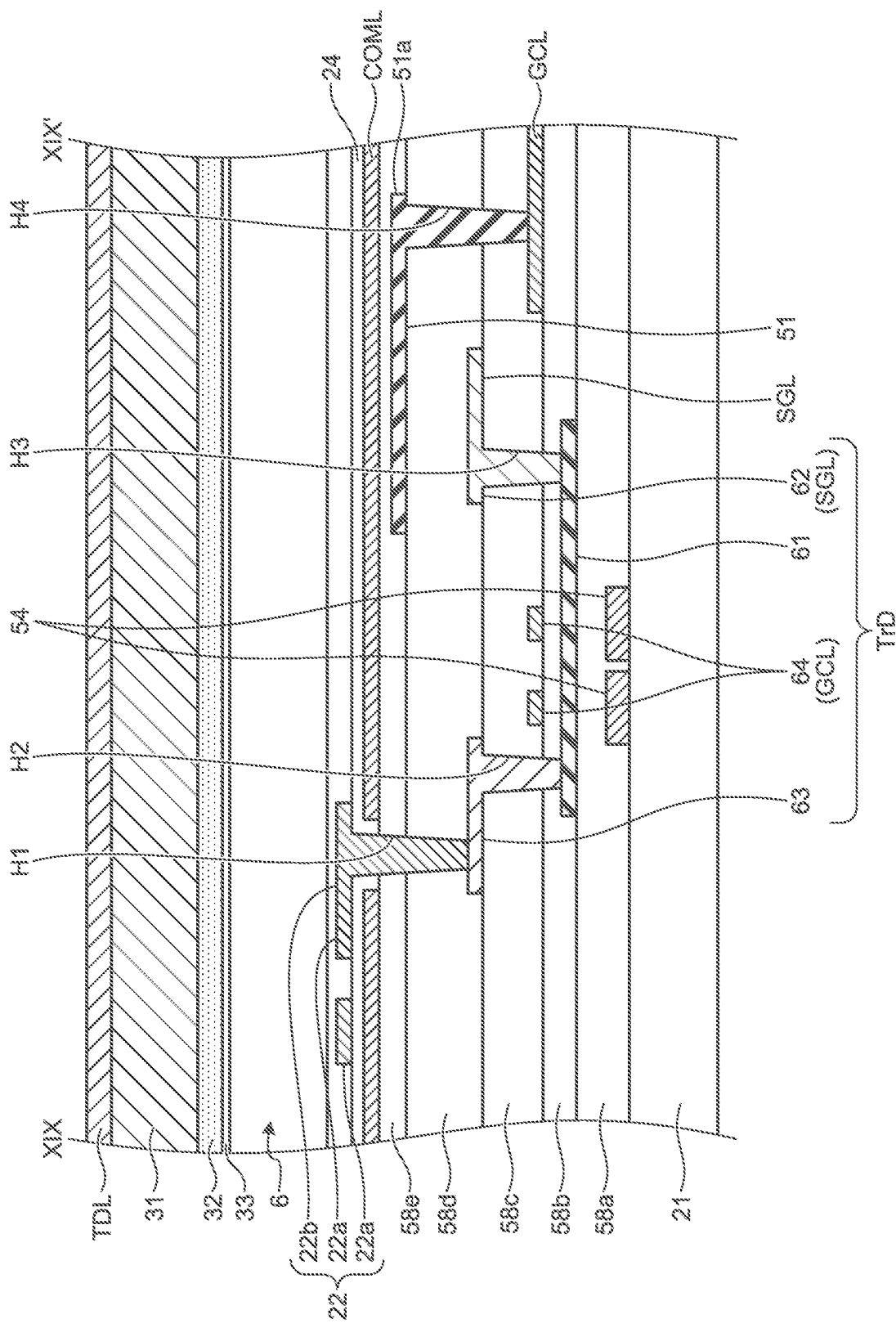
FIG. 19 is a cross-sectional view along the line XIX-XIX' in FIG. 18.

Next, with reference to FIGS. 18 and 19, the following describes a coupling structure between the conductive wire 51 and the switching element TrD for display. FIG. 18 is a plan view of the TFT substrate for explaining a configuration of the sub-pixel. FIG. 19 is a cross-sectional view along the line XIX-XIX' in FIG. 18.

As illustrated in FIG. 18, a longitudinal direction of the pixel electrode 22 corresponds to the extending direction of the data line SGL for display. The pixel electrode 22 includes a plurality of strip electrodes 22a and a connecting part 22b. The strip electrodes 22a each extend in the extending direction of the data line SGL for display, and are arranged in the extending direction of the gate line GCL for display. The connecting part 22b connects ends of the strip electrode 22a with each other. The pixel electrode 22 is coupled to a drain electrode 63 of the switching element TrD for display via a contact hole H1.

As illustrated in FIGS. 18 and 19, the switching element TrD for display includes a semiconductor layer 61, a source electrode 62, the drain electrode 63, and a gate electrode 64. A light shielding layer 54 is arranged below the semiconductor layer 61.

As illustrated in FIG. 19, an insulating layer 58a is arranged on the TFT substrate 21 while covering the light shielding layer 54. The semiconductor layer 61 is arranged on the insulating layer 58a. An insulating layer 58b is arranged on the semiconductor layer 61, and the gate line GCL for display is arranged on the insulating layer 58b. An insulating layer 58c is arranged on the gate line GCL for display, and the drain electrode 63 and the data line SGL for display are arranged on the insulating layer 58c. An insulating layer 58d is arranged on the drain electrode 63 and the data line SGL for display, and the conductive wire 51 is arranged on the insulating layer 58d. An insulating layer 58e is arranged on the conductive wire 51, and the drive electrode COML is arranged on the insulating layer 58e. As described above, the insulating layer 24 is arranged on the drive electrode COML, and the pixel electrode 22 is arranged on the insulating layer 24.

The semiconductor layer 61 is coupled to the drain electrode 63 via a contact hole H2. The semiconductor layer 61 is bent to intersect with the gate line GCL for display multiple times in a plan view. A portion of the gate line GCL for display overlapped with the semiconductor layer 61 functions as the gate electrode 64. The semiconductor layer 61 extends to a position overlapped with the data line SGL for display, and is electrically coupled to the data line SGL for display via a contact hole H3. A portion of the data line SGL for display overlapped with the semiconductor layer 61 functions as the source electrode 62.

As a material for the semiconductor layer 61, a known material such as polysilicon and an oxide semiconductor can be used. For example, a transparent amorphous oxide semiconductor (TAOS) is used to improve a capability for retaining a voltage for video display for a long time (retaining rate), thereby improving display quality.

A channel part is arranged at a portion of the semiconductor layer 61 overlapped with the gate electrode 64. It is preferred that the light shielding layer 54 is arranged at a position overlapping with the channel part, and has a larger area than that of the channel part. Due to the light shielding layer 54, for example, light incident on the semiconductor layer 61 from a backlight is shielded.

As illustrated in FIG. 18, the conductive wire 51 is arranged to be overlapped with the data line SGL for display. The tab part 51a is arranged at the intersecting part of the data line SGL for display and the gate line GCL for display, and projects in a direction intersecting with an extending direction of the conductive wire 51. The tab part 51a is arranged at a position that is overlapped with the gate line GCL for display and not overlapped with the data line SGL for display. The tab part 51a is electrically coupled to the gate line GCL for display via the contact hole H4. In this way, the conductive wire 51 is electrically coupled to the switching element TrD for display.

As described above, the conductive wire 51 is arranged in a layer different from that of the drive electrode COML via the insulating layer 58e, and is coupled to the switching element TrD for display via the gate line GCL for display. The conductive wire 51 is used as a gate line for supplying the scanning signal Vscan to the switching element TrD for display, so that a degree of freedom of wiring arranged within the display region 10a can be improved. Accordingly, a degree of freedom of design of a circuit and the like arranged in the frame region 10b is improved. For example, as illustrated in FIG. 17, the gate driver 12 on the short side of the frame region 10b is arranged so that the long side of the frame region 10b can be narrowed.

In the present embodiment, the width of the conductive wire 51 is larger than that of the data line SGL for display, so that the data line SGL for display can be prevented from being visually recognized. The embodiment is not limited thereto. The width of the conductive wire 51 may be the same as that of the data line SGL for display, or smaller than that of the data line SGL for display. The configuration is not limited to the conductive wire 51 being arranged to be overlapped with all the data lines SGL for display. A configuration may be employed in which the conductive wire 51 is not overlapped with some of the data lines SGL for display.

The pixel electrode 22 illustrated in FIG. 18 is patterned in a strip shape, but the embodiment is not limited thereto. The pixel electrode 22 may be formed in a flat plate shape. In this case, the drive electrode COML includes one or a plurality of strip electrodes, for example. Although the pixel electrode 22 is arranged on an upper layer side (a side closer to the liquid crystal layer) than the drive electrode COML, the drive electrode COML may be arranged on an upper layer side than the pixel electrode 22. The drive electrode COML and the pixel electrode 22 may be arranged adjacent to each other on the same layer. For example, each of the drive electrode COML and the pixel electrode 22 is formed as a strip electrode, and the drive electrode COML and the pixel electrode 22 may be arranged apart from each other without being overlapped with each other in a plan view.

Second Embodiment

Figure 20:
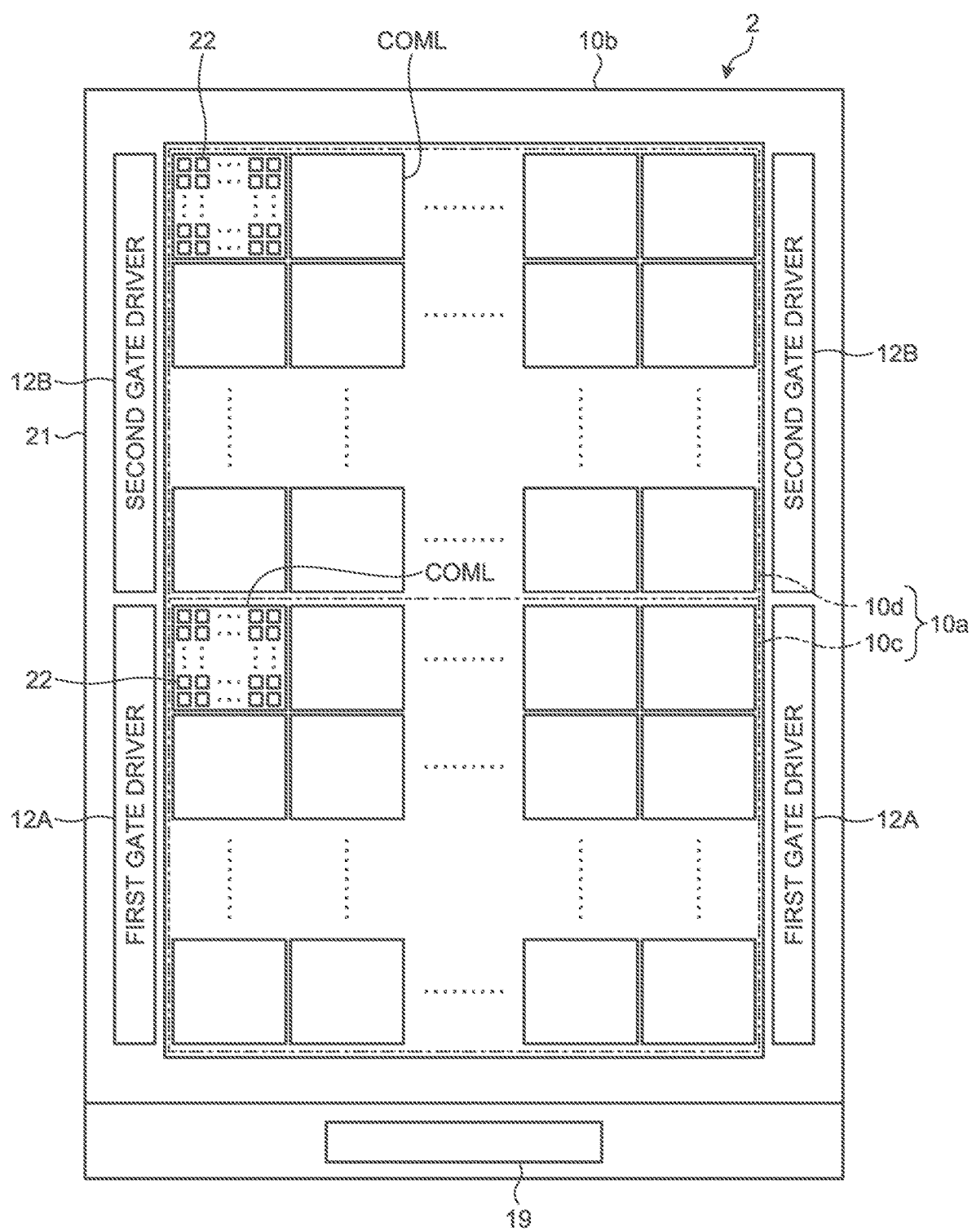
FIG. 20 is a plan view illustrating a pixel substrate according to a second embodiment.

FIG. 20 is a plan view illustrating a pixel substrate according to a second embodiment. As illustrated in FIG. 20, the drive electrodes COML are arranged in a matrix in the display region 10a of the TFT substrate 21, and the pixel electrodes 22 are arranged in a matrix overlapping with the drive electrodes COML. In the present embodiment, the display region 10a is divided into a first display region 10c and a second display region 10d for driving control. The first display region 10c is a region closer to the display control IC 19, and the second display region 10d is a region that is adjacent to the first display region 10c and is distant from the display control IC 19 as compared with the first display region 10c. A first gate driver 12A and a second gate driver 12B are arranged in the frame region 10b of the TFT substrate 21. The first gate driver 12A and the second gate driver 12B are arranged on the long side of the frame region 10b. Two first gate drivers 12A are arranged with the first display region 10c interposed therebetween, and two second gate drivers 12B are arranged with the second display region 10d interposed therebetween.

The first gate driver 12A sequentially selects one line (one horizontal line) of the sub-pixels SPix (refer to FIG. 14) in the first display region 10b as a display driving target. The second gate driver 12B sequentially selects one line (one horizontal line) of the sub-pixels SPix in the second display region 10d as a display driving target. The first gate driver 12A and the second gate driver 12B can be driven for scanning at the same time, so that the screen size of the display region 10a can be increased and definition of the sub-pixels SPix can be improved.

Figure 21:
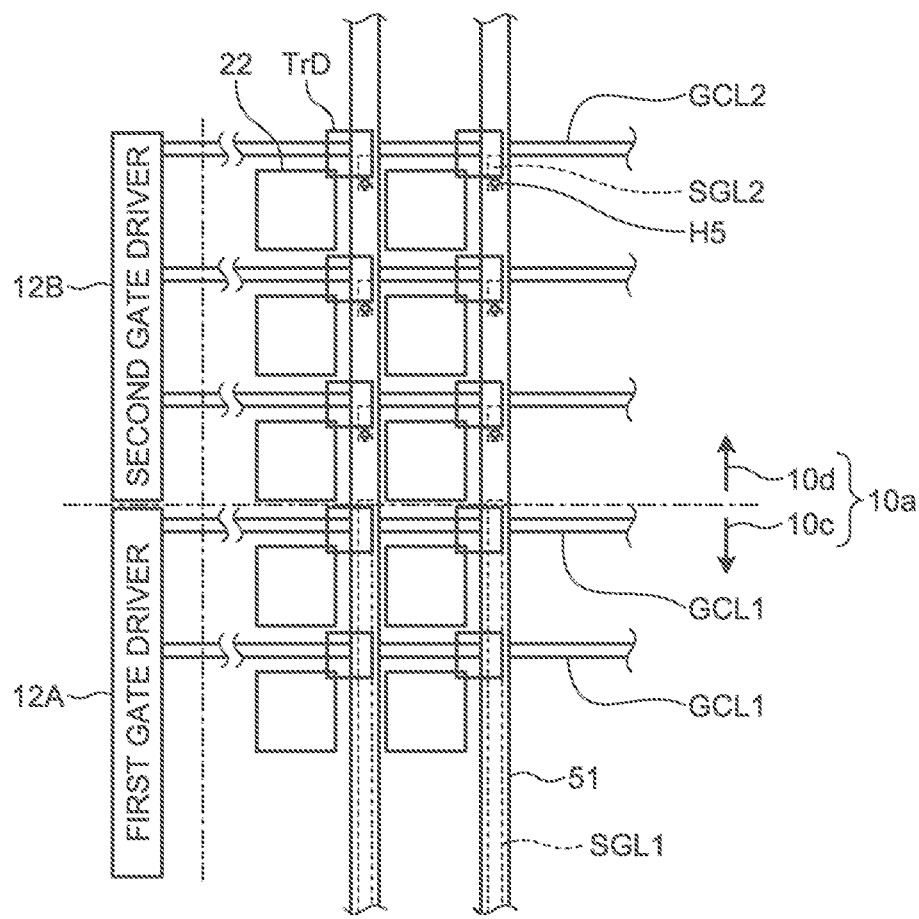
FIG. 21 is a plan view for explaining a configuration of a pixel electrode and a switching element for display according to the second embodiment.
Figure 22:
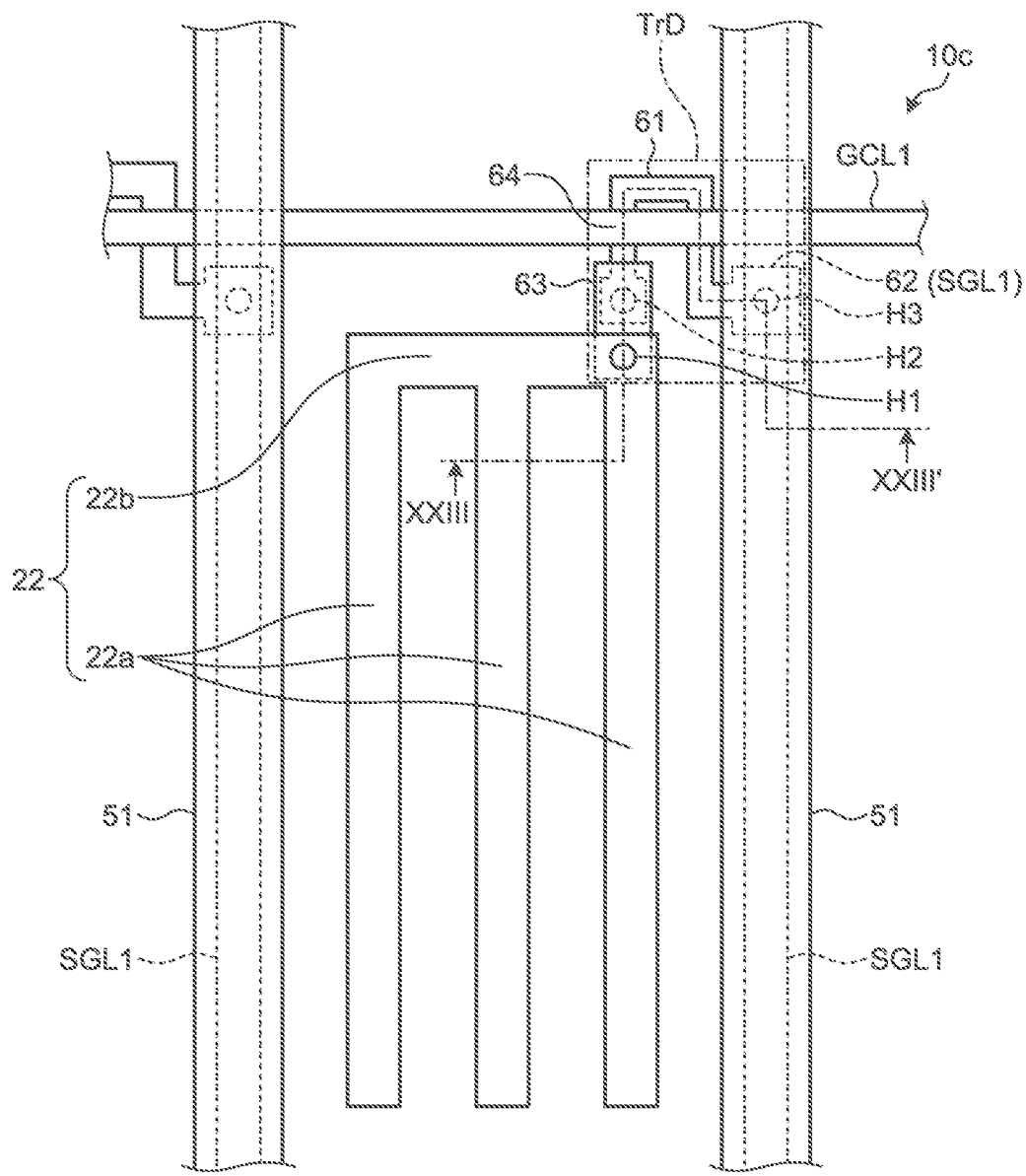
FIG. 22 is a plan view of the TFT substrate for explaining a configuration of the sub-pixel in a first display region according to the second embodiment.
Figure 23:
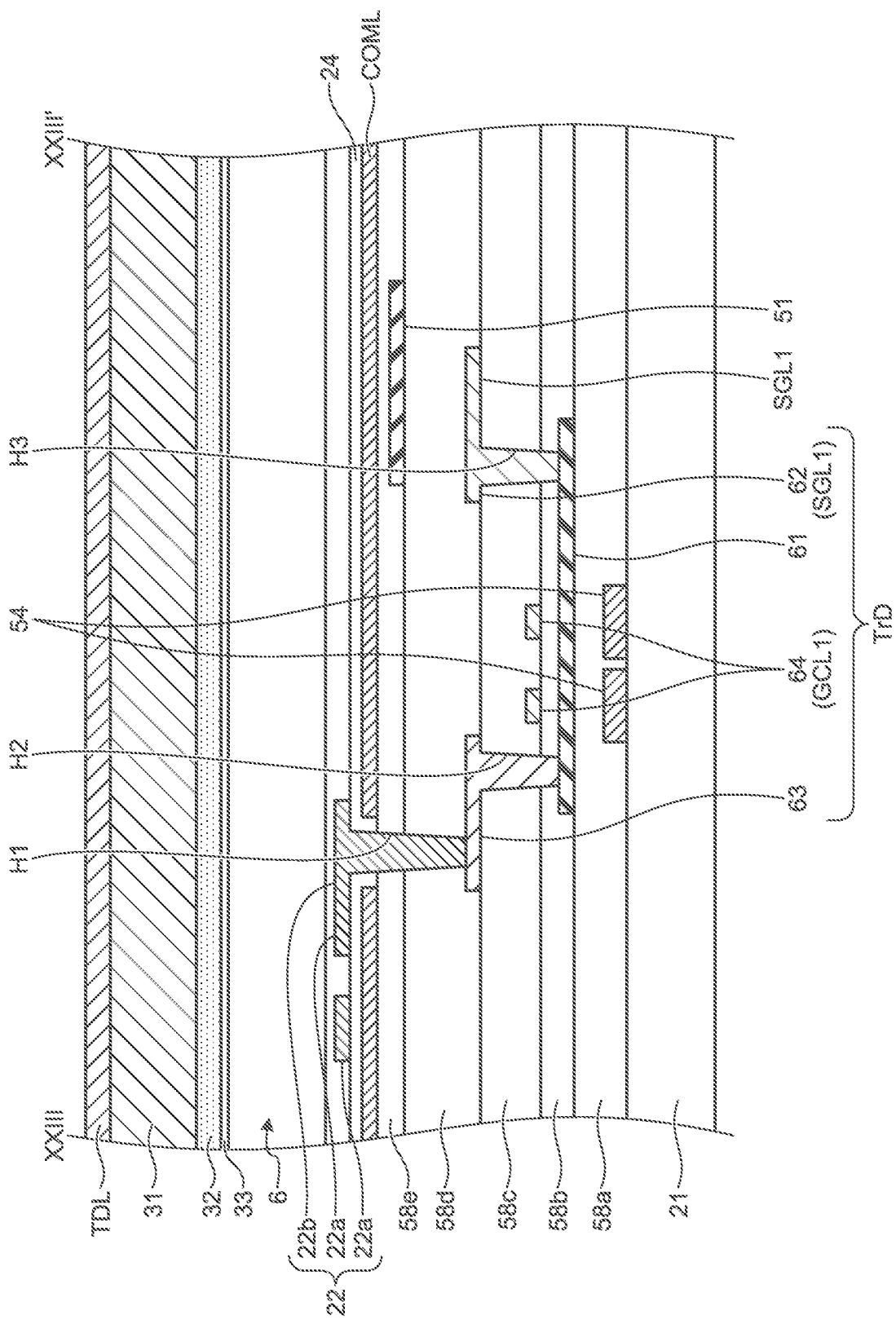
FIG. 23 is a cross-sectional view along the line XXIII-XXIII' in FIG. 22.
Figure 24:
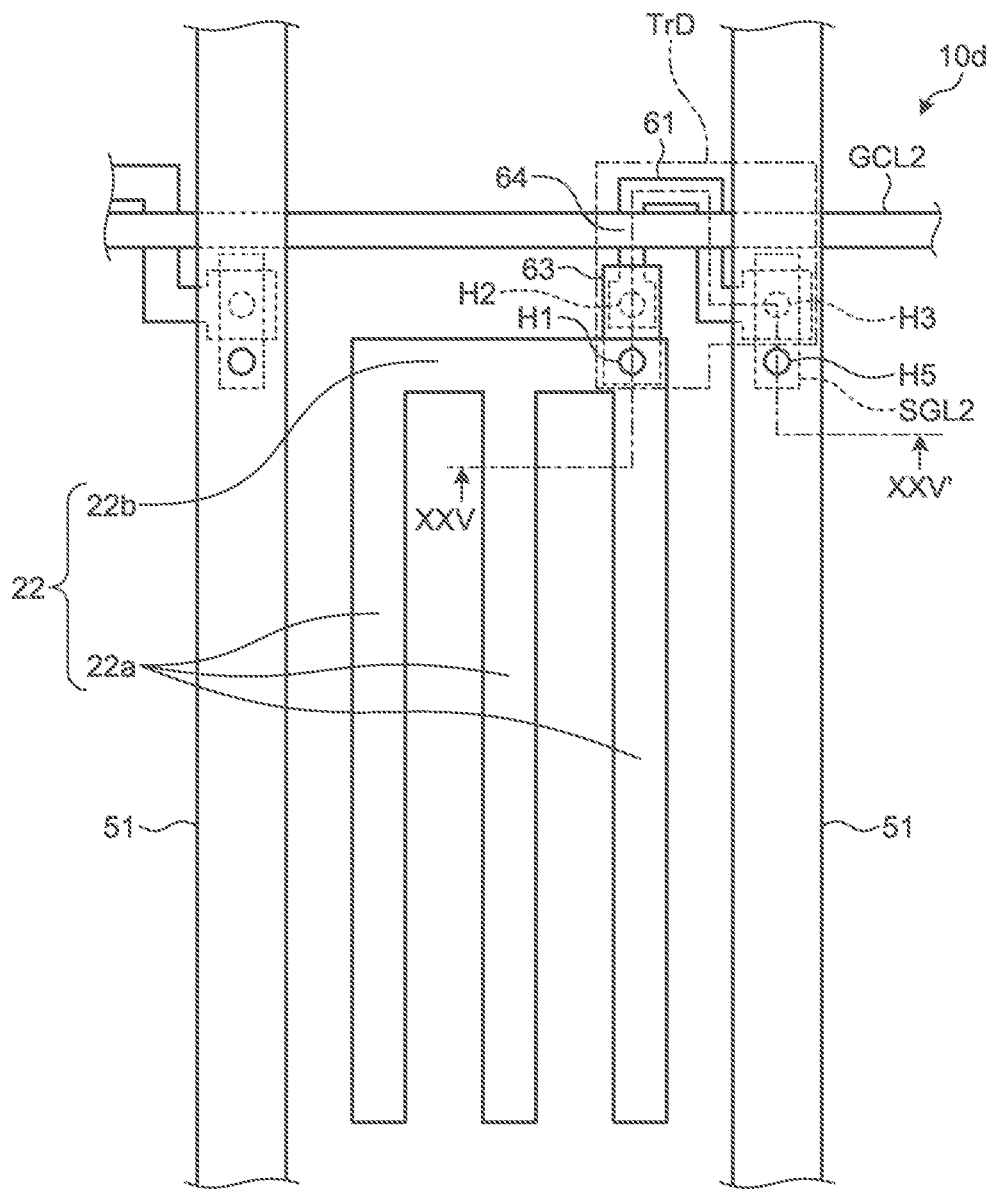
FIG. 24 is a plan view of the TFT substrate for explaining a configuration of the sub-pixel in a second display region according to the second embodiment.
Figure 25:
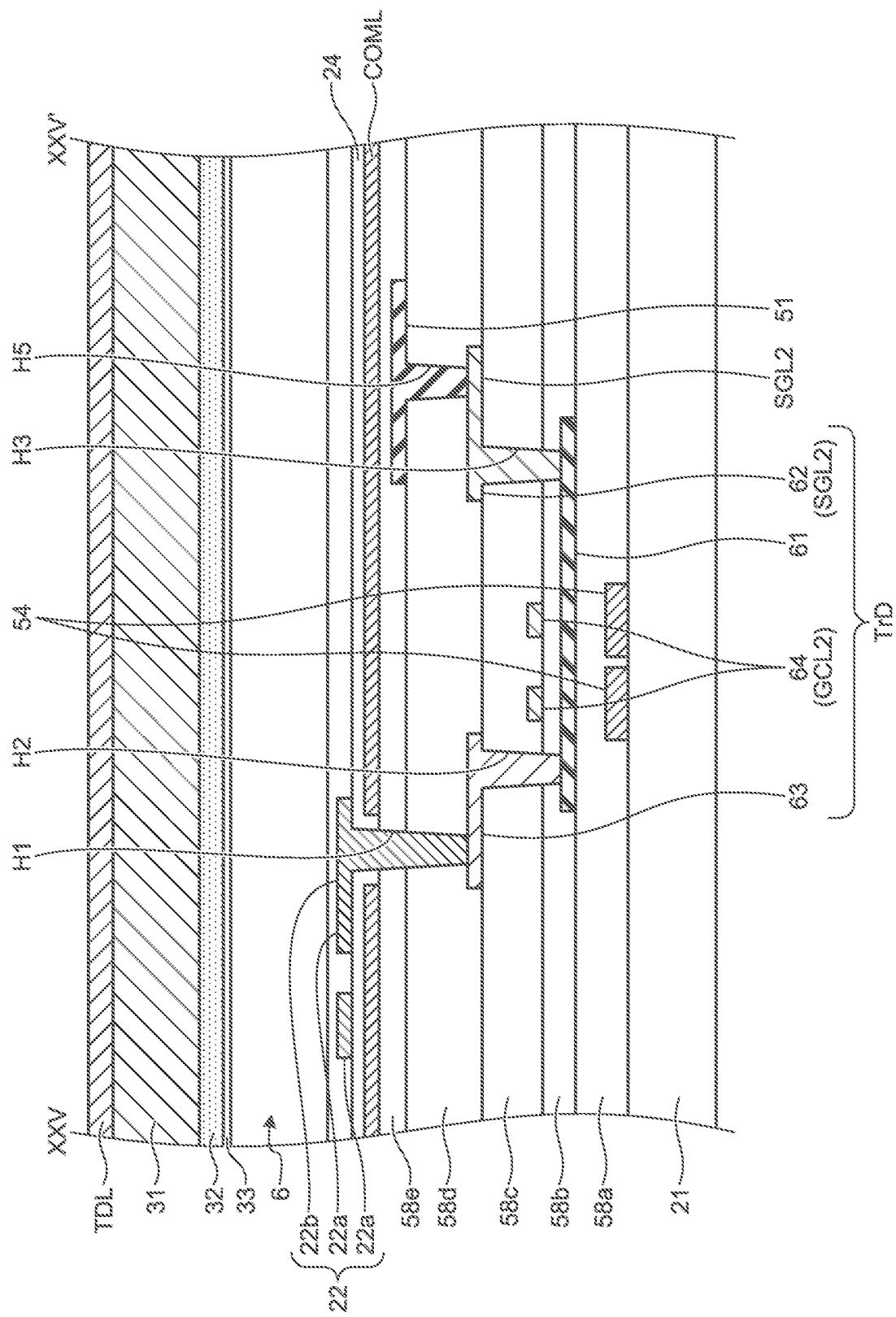
FIG. 25 is a cross-sectional view along the line XXV-XXV' in FIG. 24.

FIG. 21 is a plan view for explaining a configuration of the pixel electrode and the switching element for display according to the second embodiment. FIG. 22 is a plan view of the TFT substrate for explaining a configuration of the sub-pixel in the first display region according to the second embodiment. FIG. 23 is a cross-sectional view along the line XXIII-XXIII' in FIG. 22. FIG. 24 is a plan view of the TFT substrate for explaining a configuration of the sub-pixel in the second display region according to the second embodiment. FIG. 25 is a cross-sectional view along the line XXV-XXV' in FIG. 24.

As illustrated in FIG. 21, the first gate driver 12A is coupled to the switching element TrD for display via a first gate line GCL1 for display. The second gate driver 12B is coupled to the switching element TrD for display via a second gate line GCL2 for display. In the first display region 10c, a first data line SGL1 for display extends in a direction intersecting with an extending direction of the first gate line GCL1 for display, and the switching element TrD for display is coupled to the first data line SGL1 for display. The conductive wire 51 is arranged at a position overlapping with the first data line SGL1 for display. The conductive wire 51 extends over the first display region 10c and the second display region 10d. The switching element TrD for display in the second display region 10d is coupled to the conductive wire 51 via a second data line SGL2 for display.

As illustrated in FIGS. 22 and 23, the configuration of the switching element TrD for display and the pixel electrode 22 according to the present embodiment is similar to that in the first embodiment. The switching element TrD for display in the first display region 10c is arranged so that the semiconductor layer 61 intersects with the first gate line GCL1 for display in a plan view. As illustrated in FIG. 23, the semiconductor layer 61 is coupled to the first data line SGL1 for display via the contact hole H3. The conductive wire 51 is arranged to be overlapped with the first data line SGL1 for display, and is not coupled to the first gate line GCL1 for display and the first data line SGL1 for display. That is, the conductive wire 51 is not coupled to the switching element TrD for display in the first display region 10c.

As illustrated in FIGS. 24 and 25, the switching element TrD for display in the second display region 10d is arranged so that the semiconductor layer 61 intersects with the second gate line GCL2 for display in a plan view. The semiconductor layer 61 is coupled to the second data line SGL2 for display via the contact hole H3. The second data line SGL2 for display is electrically coupled to the conductive wire 51 via a contact hole H5. In this way, the conductive wire 51 is coupled to the switching element TrD for display in the second display region 10d. The second data line SGL2 for display is arranged apart from the first data line SGL1 for display in the same layer as that of the first data line SGL1 for display illustrated in FIG. 23. As illustrated in FIG. 21, the second data line SGL2 for display is arranged in each of the switching elements TrD for display in the second display region 10d, and the switching elements TrD for display arranged in the column direction are coupled to one conductive wire 51 via the second data line SGL2 for display.

Figure 26:
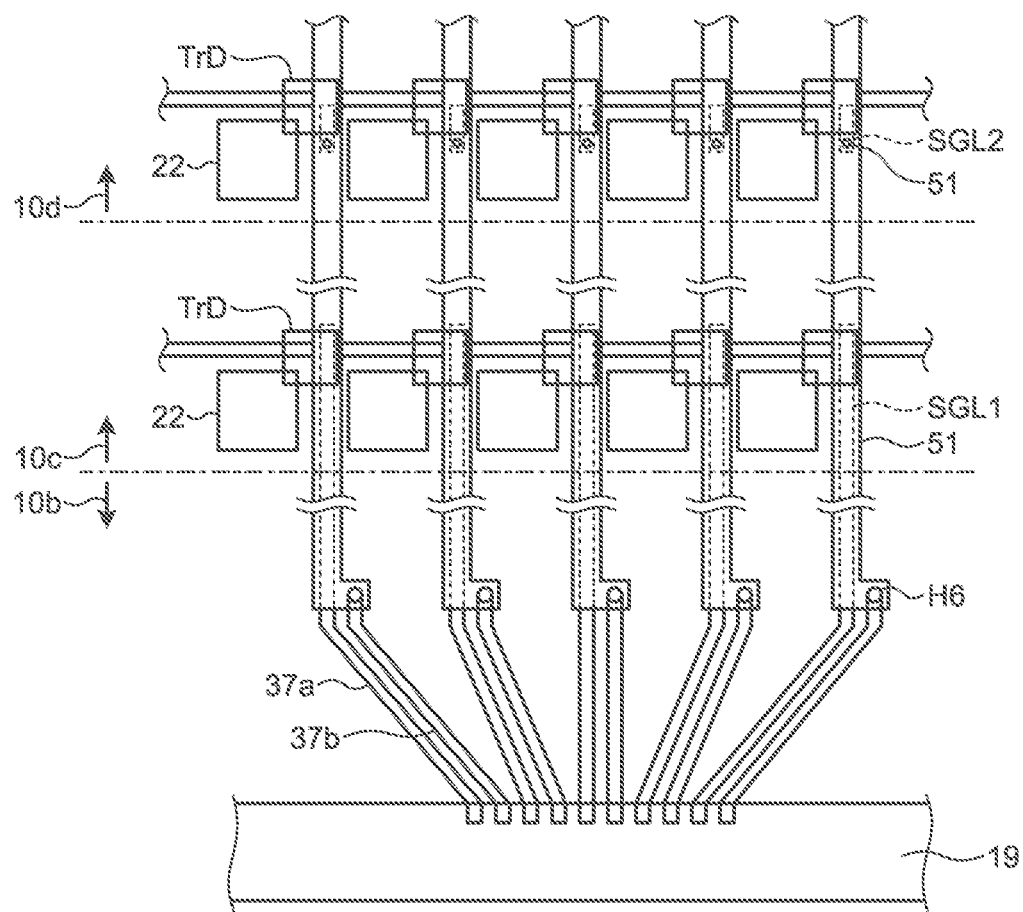
FIG. 26 is a plan view for explaining a coupling structure between a display control IC and wires.

FIG. 26 is a plan view for explaining a coupling structure between the display control IC and wires. As illustrated in FIG. 26, the first data line SGL1 for display is coupled to the switching element TrD for display in the first display region 10c, and drawn out to the frame region 10b in which the display control IC 19 is arranged. The first data line SGL1 for display is coupled to the display control IC 19 via a coupling wire 37a. The conductive wire 51 is coupled to the switching element TrD for display in the second display region 10d, extends to be overlapped with the first data line SGL1 for display in the first display region 10c, and is drawn out to the frame region 10b in which the display control IC 19 is arranged. The conductive wire 51 is coupled to coupling wire 37b via a contact hole H6 in the frame region 10b. The conductive wire 51 is coupled to the display control IC 19 via the coupling wire 37b. In this way, the switching element TrD for display in the first display region 10c and the switching element TrD for display in the second display region 10d are coupled to the one display control IC 19.

As described above, the conductive wire 51 according to the present embodiment is used as a data line for display for supplying the pixel signal Vpix to the switching element TrD for display in the second display region 10d. Thus, when the display control IC 19 scans the first data line SGL1 for display and the conductive wire 51 at the same time while supplying the pixel signal Vpix to each of the selected first data line SGL1 for display and a selected conductive wire 51, a display operation in the first display region 10c and the second display region 10d can be performed at the same time. When the conductive wire 51 is used as the data line for display, a degree of freedom of wiring within the display region 10a is improved, so that display driving suitable for increasing the screen size of the display region 10a and improving definition of the sub-pixels SPix can be implemented.

The conductive wire 51 is overlapped with the first data line SGL1 for display and the second data line SGL2 for display, and is longer than the first data line SGL1 for display and the second data line SGL2 for display. Due to this, the first data line SGL1 for display and the second data line SGL2 for display can be made invisible.

In the present embodiment, the display region 10a is divided into the first display region 10c and the second display region 10d, and the conductive wire 51 is coupled to the switching element TrD for display on the second display region 10d side. However, the embodiment is not limited thereto. For example, the data line SGL for display may be coupled to the switching element TrD for display in an odd number column, and the conductive wire 51 may be coupled to the switching element TrD for display in an even number column. In this case, the data line SGL for display and the conductive wire 51 may be coupled to different scanning driving units, and a display operation may be performed for every two lines including one data line SGL for display and one conductive wire 51 at the same time.

Third Embodiment

Figure 27:
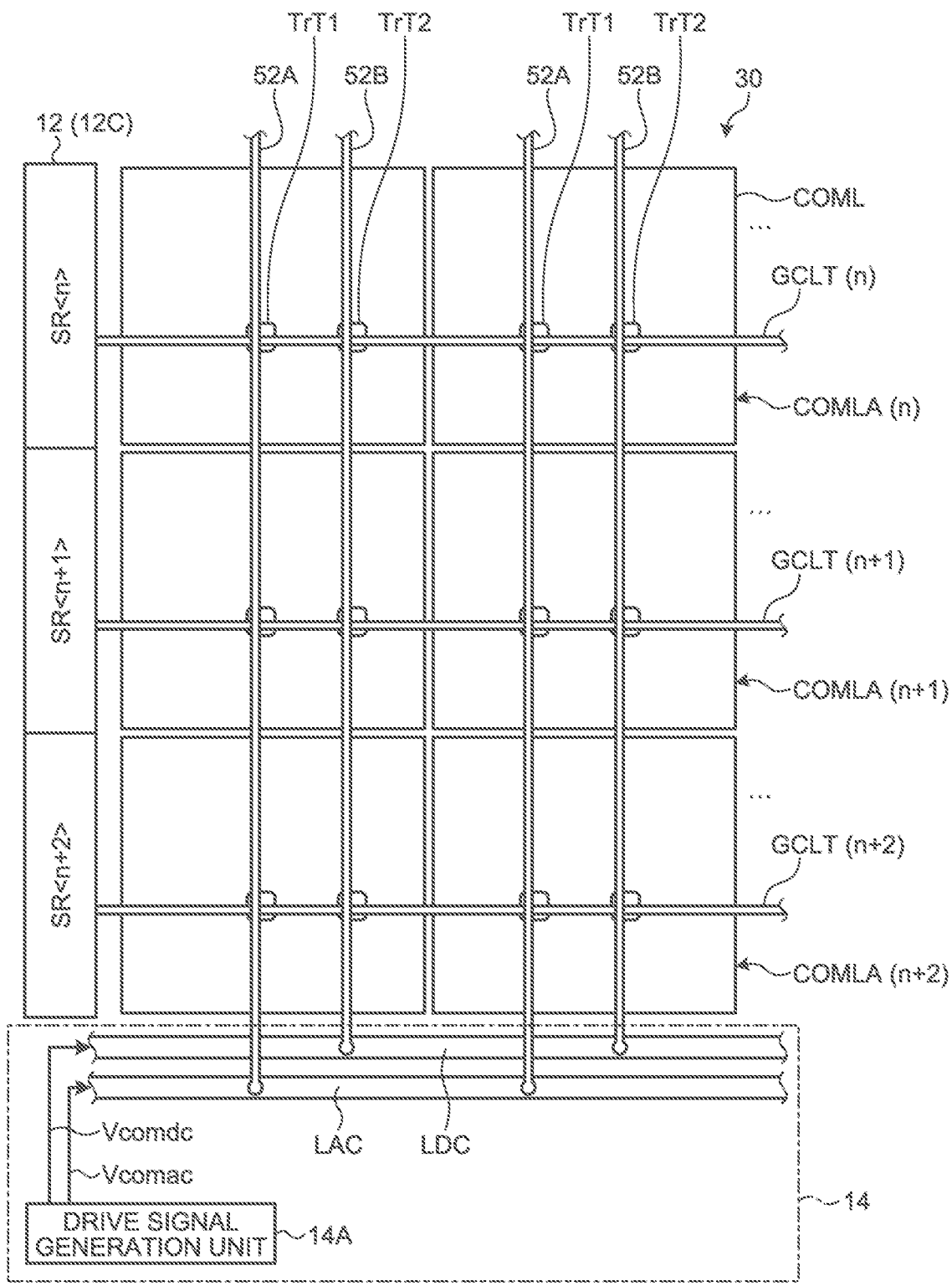
FIG. 27 is a plan view for explaining a coupling structure between the drive electrode and a switching element for touch according to a third embodiment.

FIG. 27 is a plan view for explaining a coupling structure between the drive electrode and a switching element for touch according to a third embodiment. As illustrated in FIG. 27, in the touch panel 30 according to the present embodiment, a gate line GCLT for touch is arranged to be overlapped with the drive electrode block COMLA including the drive electrodes COML arranged in the row direction. The gate line GCLT for touch is arranged corresponding to each of a plurality of drive electrode blocks COMLA arranged in the column direction. An end of the gate line GCLT for touch is coupled to the gate driver 12 (a gate driver 12C for touch).

Two conductive wires 52A and 52B are arranged corresponding to one drive electrode COML. The conductive wires 52A and 52B extend in parallel with each other in a direction intersecting with the gate line GCLT for touch, that is, the column direction while being overlapped with the drive electrodes COML arranged in the column direction. Ends of the conductive wires 52A and 52B are coupled to the drive electrode driver 14.

A first switching element TrT1 for touch is arranged at a portion where the gate line GCLT for touch intersects with the conductive wire 52A, and a second switching element TrT2 for touch is arranged at a portion where the gate line GCLT for touch intersects with the conductive wire 52B. Two TFT elements (the first switching element TrT1 for touch and the second switching element TrT2 for touch) are arranged corresponding to one drive electrode COML, and one gate line GCLT for touch is coupled to the first switching element TrT1 for touch and the second switching element TrT2 for touch corresponding to one drive electrode COML.

The first switching element TrT1 for touch and the second switching element TrT2 for touch perform switching operations reverse to each other. When the same scanning signal is supplied to the first switching element TrT1 for touch and the second switching element TrT2 for touch, and the scanning signal is at a high level, for example, the first switching element TrT1 for touch is turned ON (opened), and the second switching element TrT2 for touch is turned OFF (closed). When the scanning signal is at a low level, the first switching element TrT1 for touch is turned OFF (closed), and the second switching element TrT2 for touch is turned ON (opened). For example, the first switching element TrT1 for touch is an n-type TFT element, and the second switching element TrT2 for touch is a p-type TFT element.

As illustrated in FIG. 27, the drive electrode driver 14 includes a drive signal generation unit 14A that generates the drive signal, and wires LAC and LDC. The drive signal generation unit 14A generates the touch drive signal Vcomac for touch detection, and the display drive signal Vcomdc having a common potential for the display operation. The drive signal generation unit 14A outputs the touch drive signal Vcomac to the wire LAC, and outputs the display drive signal Vcomdc to the wire LDC.

The wire LAC is coupled to the conductive wire 52A. The touch drive signal Vcomac is supplied to the first switching element TrT1 for touch via the conductive wire 52A. The wire LDC is coupled to the conductive wire 52B. The display drive signal Vcomdc is supplied to the second switching element TrT2 for touch via the conductive wire 52B.

The gate driver 12 includes shift registers SR, and the gate lines GCLT (n), GCLT(n+1), and GCLT(n+2) for touch are coupled to the shift registers SR<n>, SR<n+1>, and SR<n+2>, respectively. The gate driver 12 scans the gate line GCLT for touch, and a scanning drive signal is supplied to a selected gate line GCLT for touch. The first switching element TrT1 for touch coupled to the selected gate line GCLT for touch is turned ON, and the second switching element TrT2 for touch coupled thereto is turned OFF. Accordingly, the touch drive signal Vcomac is supplied to the drive electrode COML (drive electrode block COMLA) overlapped with the selected gate line GCLT for touch via the conductive wire 52A.

The first switching element TrT1 for touch coupled to a non-selected gate line GCLT for touch is turned OFF, and the second switching element TrT2 for touch coupled thereto is turned ON. Accordingly, the touch drive signal Vcomac is not supplied to the drive electrode COML (drive electrode block COMLA) overlapped with the non-selected gate line GCLT for touch, and the display drive signal Vcomdc is supplied thereto via the conductive wire 52B.

When the gate driver 12 sequentially selects the gate line GCLT for touch, and the drive electrode driver 14 supplies the touch drive signal Vcomac to the drive electrode COML (drive electrode block COMLA) coupled to the selected gate line GCLT for touch, contact or proximity of an external conductor can be detected based on the principle of mutual capacitance touch detection described above.

Figure 28:
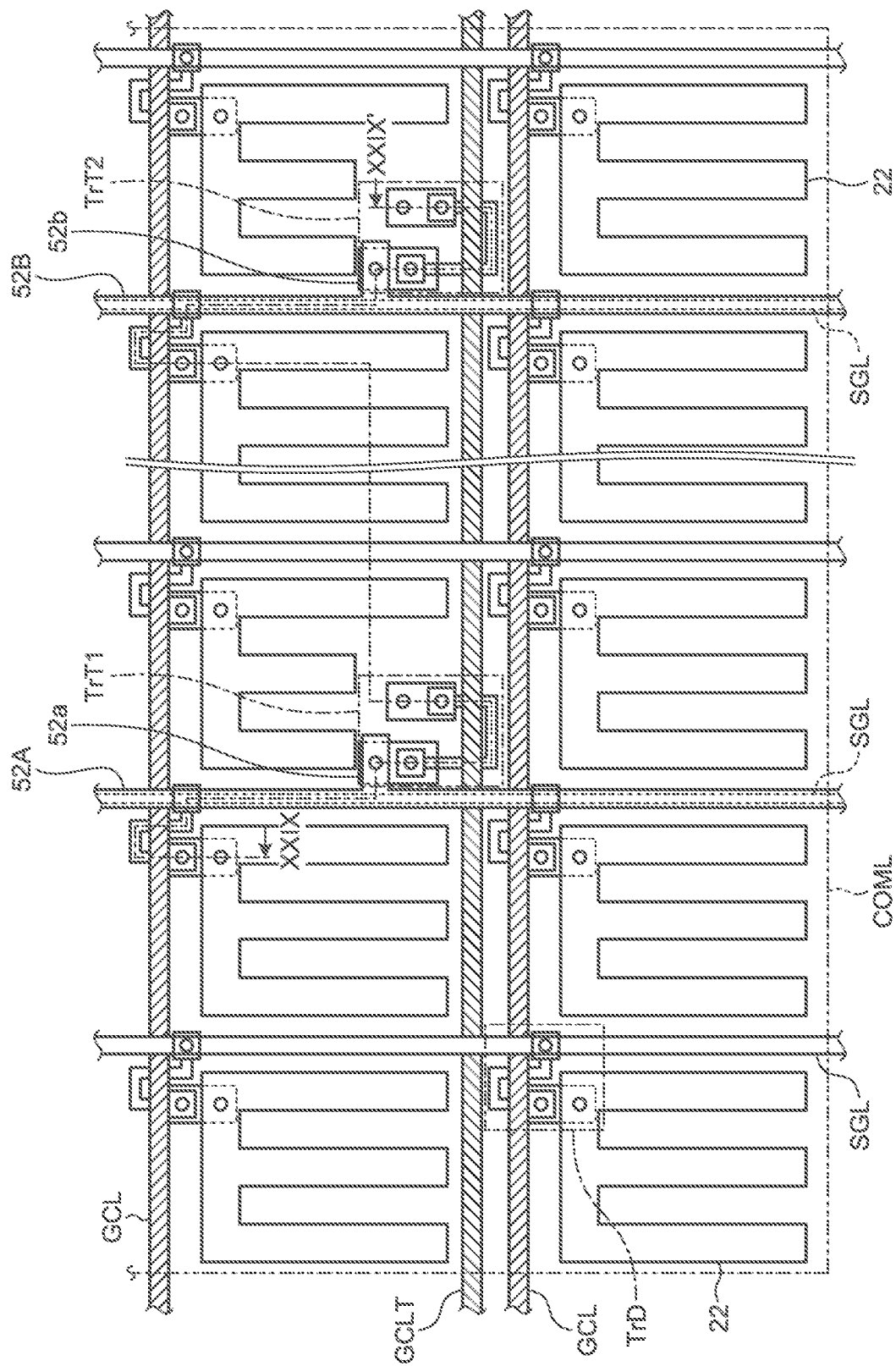
FIG. 28 is a plan view for explaining a configuration of the drive electrode and the pixel electrode according to the third embodiment.
Figure 29:
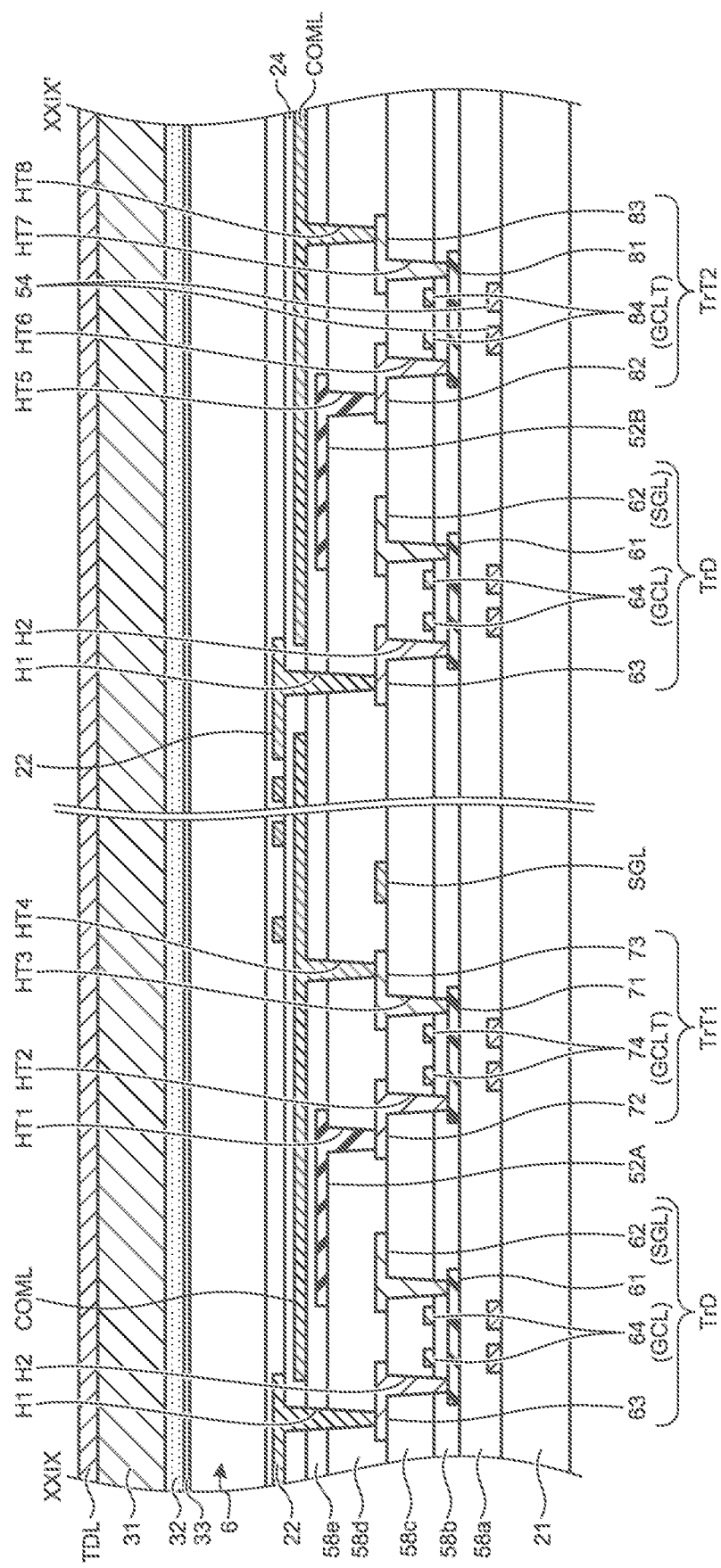
FIG. 29 is a cross-sectional view along the line XXIX-XXIX' in FIG. 28.

Next, the following describes a coupling structure between the drive electrode COML and the conductive wires 52A and 52B. FIG. 28 is a plan view for explaining a configuration of the drive electrode and the pixel electrode according to the third embodiment. FIG. 29 is a cross-sectional view along the line XXIX-XXIX' in FIG. 28.

As illustrated in FIG. 28, a plurality of pixel electrodes 22 are arranged to be overlapped with one drive electrode COML. The pixel electrodes 22 are coupled to the gate line GCL for display and the data line SGL for display via the switching element TrD for display. In FIG. 28, five columns of pixel electrodes 22 are arranged for one drive electrode COML, but the embodiment is not limited thereto. Six or more columns of pixel electrodes 22 may be arranged, or four or less columns of pixel electrodes 22 may be arranged. The configuration of the switching element TrD for display according to the present embodiment is similar to that of the first embodiment and the second embodiment, except that the conductive wires 52A and 52B are not coupled to the gate line GCL for display, and the conductive wires 52A and 52B are not coupled to the data line SGL for display.

As illustrated in FIG. 28, the gate line GCLT for touch is arranged along one gate line GCL for display. The gate line GCLT for touch extends in the row direction, and is arranged at a position not overlapped with the pixel electrode 22 between the pixel electrodes 22 adjacent to each other in the column direction. The conductive wire 52A is arranged to be overlapped with one data line SGL for display. The conductive wiring 52A extends in the column direction while intersecting with the gate line GCLT for touch. The conductive wire 52B is arranged to be overlapped with the data line SGL for display at a position different from that of the conductive wire 52A. The conductive wire 52B extends in the column direction while intersecting with the gate line GCLT for touch. The conductive wire 52A and the conductive wire 52B are formed at a position that is overlapped with the drive electrode COML and not overlapped with the pixel electrode 22.

The conductive wire 52A includes a tab part 52a projecting toward a position not overlapped with the data line SGL for display. The conductive wire 52A is coupled to the first switching element TrT1 for touch via the tab part 52a. Similarly, the conductive wire 52B includes a tab part 52b projecting toward a position not overlapped with the data line SGL for display. The conductive wire 52B is coupled to the second switching element TrT2 for touch via the tab part 52b.

As illustrated in FIG. 29, the first switching element TrT1 for touch includes a semiconductor layer 71, a source electrode 72, a drain electrode 73, and a gate electrode 74. The second switching element TrT2 for touch includes a semiconductor layer 81, a source electrode 82, a drain electrode 83, and a gate electrode 84.

An end of the semiconductor layer 71 in the first switching element TrT1 for touch is coupled to the source electrode 72 via a contact hole HT2. The source electrode 72 is coupled to the conductive wire 52A via a contact hole HT1. The other end of the semiconductor layer 71 is coupled to the drain electrode 73 via a contact hole HT3. The drain electrode 73 is coupled to the drive electrode COML via a contact hole HT4. The gate line GCLT for touch at a portion overlapped with the semiconductor layer 71 functions as the gate electrode 74. In this way, the conductive wire 52A is coupled to the drive electrode COML via the first switching element TrT1 for touch.

An end of the semiconductor layer 81 in the second switching element TrT2 for touch is coupled to the source electrode 82 via a contact hole HT6. The source electrode 82 is coupled to the conductive wire 52B via a contact hole HT5. The other end of the semiconductor layer 81 is coupled to the drain electrode 83 via a contact hole HT7. The drain electrode 83 is coupled to the drive electrode COML via a contact hole HT8. The gate line GCLT for touch at a portion overlapped with the semiconductor layer 81 functions as the gate electrode 84. In this way, the conductive wire 52B is coupled to the drive electrode COML via the second switching element TrT2 for touch.

The semiconductor layer 71 and the semiconductor layer 81 are arranged in the same layer as the semiconductor layer 61 of the switching element TrD for display, and on the insulating layer 58a. The insulating layer 58b is arranged on the semiconductor layer 61, the semiconductor layer 71, and the semiconductor layer 81. The gate electrode 74 and the gate electrode 84 (gate lines GCLT for touch) are arranged in the same layer as the gate electrode 64 (gate line GCL for display) of the switching element TrD for display, and on the insulating layer 58b. The insulating layer 58c is arranged on the gate electrode 64, the gate electrode 74, and the gate electrode 84. The source electrode 72, the drain electrode 73, the source electrode 82, and the drain electrode 83 are arranged in the same layer as the source electrode 62 and the drain electrode 63 of the switching element TrD for display, and on the insulating layer 58c. The insulating layer 58d is arranged on the source electrode 62, the drain electrode 63, the source electrode 72, the drain electrode 73, the source electrode 82, and the drain electrode 83.

The conductive wire 52A and the conductive wire 52B are arranged on the insulating layer 58d, and the insulating layer 58e is arranged on the conductive wire 52A and the conductive wire 52B. The drive electrode COML is arranged on the insulating layer 58e. That is, the conductive wire 52A and the conductive wire 52B are arranged in a layer different from that of the drive electrode COML via the insulating layer 58e. The conductive wire 52A and the conductive wire 52B are arranged in the same layer, but the embodiment is not limited thereto. The conductive wire 52A and the conductive wire 52B may be arranged in different layers. The first switching element TrT1 for touch and the second switching element TrT2 for touch are arranged in the same layer as the switching element TrD for display, but the embodiment is not limited thereto. The first switching element TrT1 for touch and the second switching element TrT2 for touch may be arranged in a layer different from that of the switching element TrD for display. In view of visibility, the first switching element TrT1 for touch and the second switching element TrT2 for touch are preferably arranged in the sub-pixel SPix corresponding to the color region 32B of blue described above.

Figure 30:
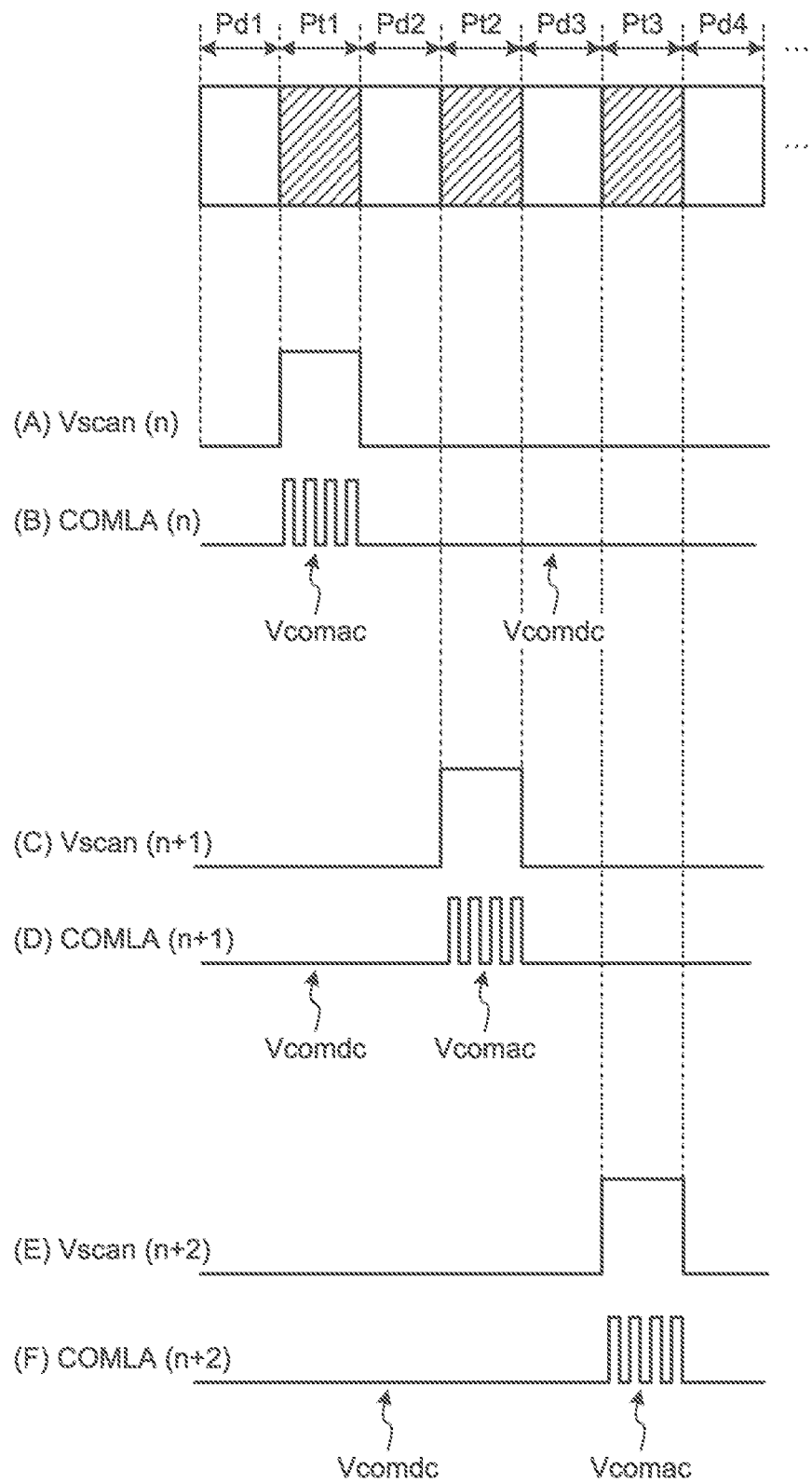
FIG. 30 is a timing waveform chart illustrating an operation example of a display device with a touch detection function according to the third embodiment.

Next, the following describes an example of a driving method according to the present embodiment. FIG. 30 is a timing waveform chart illustrating an operation example of the display device with a touch detection function according to the third embodiment. As illustrated in FIG. 30, the display periods Pd1, Pd2, Pd3 . . . and the touch periods Pt1, Pt2, Pt3 . . . are alternately arranged in a time division manner. In the display periods Pd1, Pd2, Pd3 . . . , the scanning signal Vscan is OFF (at a low level), the first switching element TrT1 for touch in each drive electrode COML illustrated in FIG. 27 is turned OFF (closed), and the second switching element TrT2 for touch therein is turned ON (opened). Due to this, the display drive signal Vcomdc is supplied to each drive electrode COML via the conductive wire 52B.

In the touch period Pt1, the gate line GCLT(n) for touch in the n-th row is selected, and the scanning signal Vscan(n) is turned ON (high level). The first switching element TrT1 for touch of a drive electrode block COMLA(n) in the n-th row is turned ON (opened), and the second switching element TrT2 for touch thereof is turned OFF (closed). Due to this, the touch drive signal Vcomac is supplied to each drive electrode COML in the drive electrode block COMLA(n) via the conductive wire 52A. Based on the principle of mutual capacitance touch detection, the touch detection signal Vdet1 is output from the touch detection electrode TDL (refer to FIG. 13) to the touch detection unit 40 (refer to FIG. 1). In the touch period Pt1, the scanning signal Vscan is OFF (low level) in the gate lines GCLT for touch other than the gate line GCLT(n) for touch, and the display drive signal Vcomdc is supplied to each drive electrode COML via the conductive wire 52B.

In the touch period Pt2, a gate line GCLT(n+1) for touch in the (n+1)-th row is selected, and a scanning signal Vscan(n+1) is turned ON (high level). The first switching element TrT1 for touch of a drive electrode block COMLA(n+1) in the (n+1)-th row is turned ON (opened), and the second switching element TrT2 for touch thereof is turned OFF (closed). Due to this, the touch drive signal Vcomac is supplied to each drive electrode COML in the drive electrode block COMLA(n+1) via the conductive wire 52A.

In the touch period Pt3, a gate line GCLT(n+2) for touch in the (n+2)-th row is selected, and a scanning signal Vscan(n+2) is turned ON (high level). The first switching element TrT1 for touch of a drive electrode block COMLA(n+2) in the (n+2)-th row is turned ON (opened), and the second switching element TrT2 for touch thereof is turned OFF (closed). Due to this, the touch drive signal Vcomac is supplied to each drive electrode COML in the drive electrode block COMLA(n+2) via the conductive wire 52A. These processes are sequentially repeated to perform a touch detection operation of the entire touch detection surface.

As described above, in the present embodiment, the touch drive signal Vcomac as a drive signal for touch detection is supplied to the drive electrode COML via the conductive wire 52A. The display drive signal Vcomdc having a common potential for the pixel electrode 22 is supplied to the drive electrode COML via the conductive wire 52B. Accordingly, by sequentially scanning the drive electrodes COML arranged in a matrix, contact or proximity of an external conductor can be detected based on the basic principle of mutual capacitance touch detection.

Each of the conductive wire 52A and the conductive wire 52B is arranged to be overlapped with the data line SGL for display, so that an opening area of the sub-pixel SPix can be prevented from being reduced as compared with a case in which each of the conductive wire 52A and the conductive wire 52B is arranged in the same layer as the data line SGL for display, or a case in which each of the conductive wire 52A and the conductive wire 52B is arranged at a position different from that of the data line SGL for display. In FIGS. 27 and 28, employed is a configuration in which two wires including the conductive wire 52A and the conductive wire 52B are arranged for the drive electrode COML in each column. Alternatively, a configuration in which three or more conductive wires are arranged along the pixel electrode 22 in each column may be employed. In this case, conductive wires other than the conductive wire 52A and the conductive wire 52B are arranged as dummy wires that are overlapped with the data line SGL for display and are not electrically coupled to the drive electrode COML. When the conductive wires are arranged along the pixel electrode 22 in each column, variation in arrangement pitch of the conductive wires can be suppressed, so that visibility can be improved.

The first switching element TrT1 for touch and the second switching element TrT2 for touch are switched to be coupled to or disconnected from the drive electrode COML in opposite phases for the same scanning signal. Due to this, the touch drive signal Vcomac and the display drive signal Vcomdc can be securely supplied. A switch unit for switching between supply of the touch drive signal Vcomac and supply of the display drive signal Vcomdc is not required to be arranged in the frame region 10b, so that the frame can be narrowed.

Figure 31:
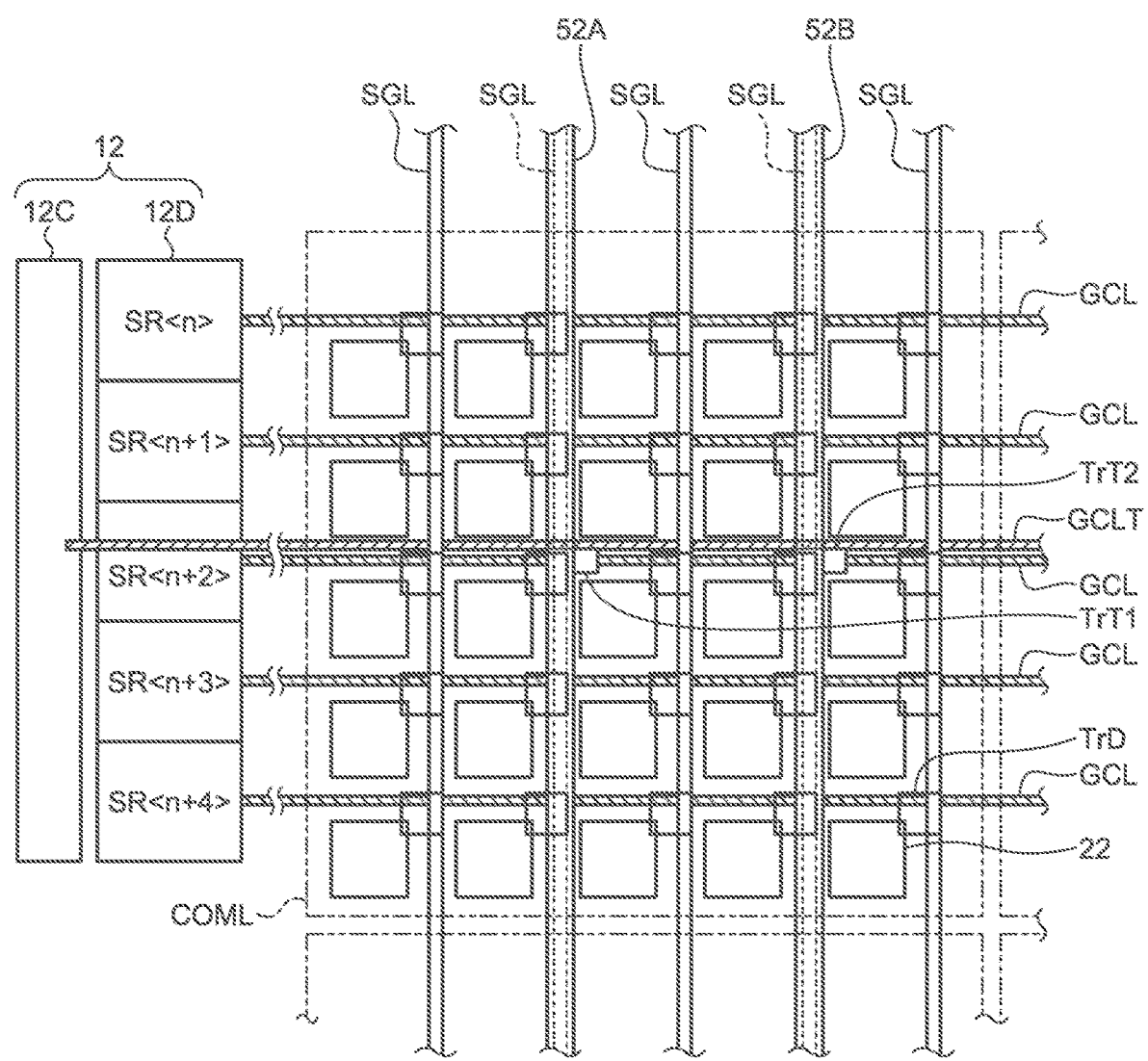
FIG. 31 is a plan view illustrating a configuration example of a gate driver according to the third embodiment.

FIG. 31 is a plan view illustrating a configuration example of the gate driver according to the third embodiment. As illustrated in FIG. 31, the gate driver 12 includes the gate driver 12C for touch and a gate driver 12D for display. The gate driver 12C for touch scans the gate line GCLT for touch and supplies the scanning signal to a selected gate line GCLT for touch. The gate driver 12D for display scans the gate line GCL for display and supplies the scanning signal to a selected gate line GCL for display. In this way, a configuration in which the gate driver 12C for touch and the gate driver 12D for display are arranged can also be employed.

Figure 32:
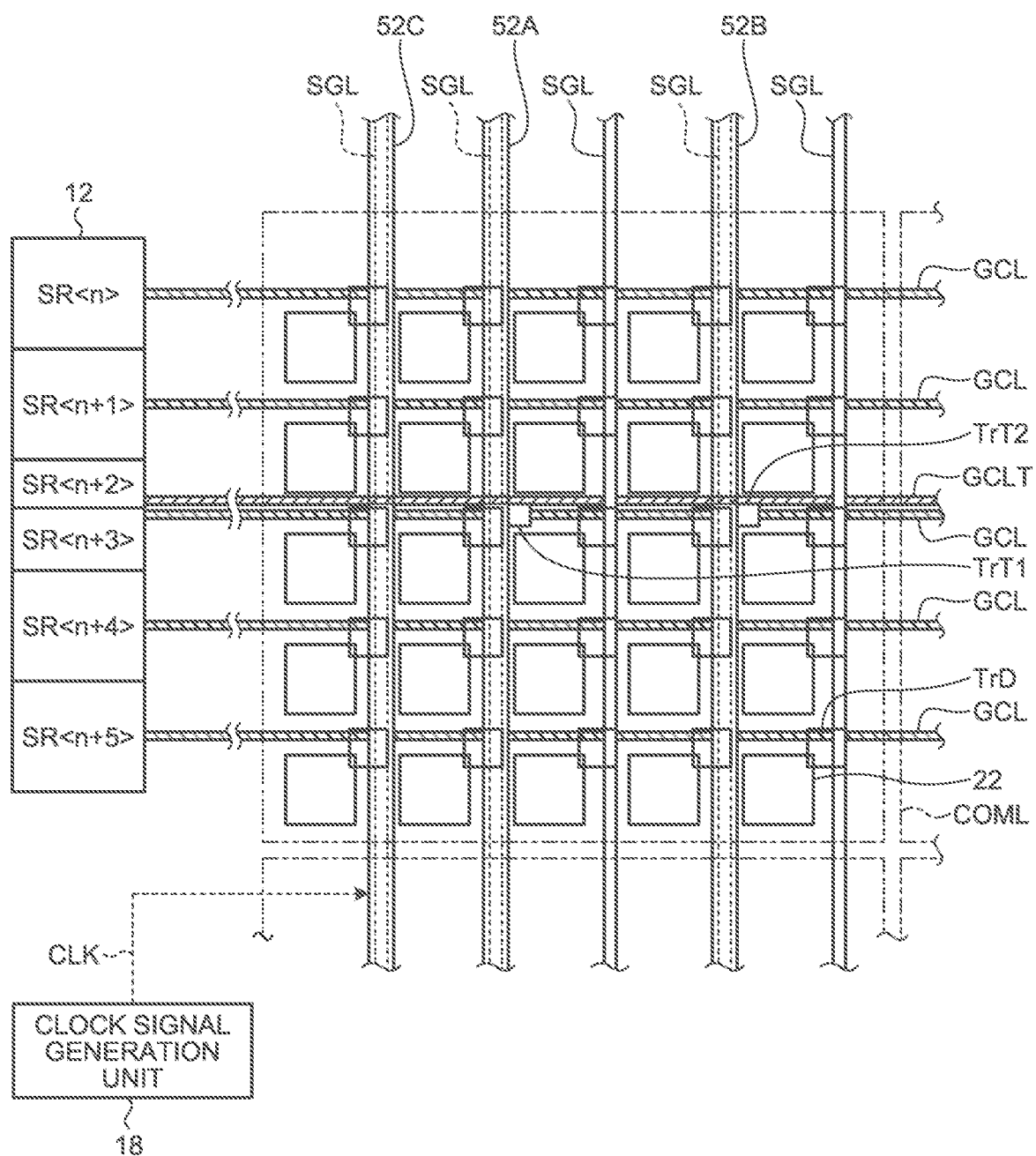
FIG. 32 is a plan view illustrating another configuration example of the gate driver according to the third embodiment.

FIG. 32 is a plan view illustrating another configuration example of the gate driver according to the third embodiment. As illustrated in FIG. 32, the gate line GCLT for touch and the gate line GCL for display are coupled to one gate driver 12. The gate lines GCL for display are coupled to the shift registers SR<n>, SR<n+1>, SR<n+3>, SR<n+4>, and SR<n+5> of the gate driver 12, and the gate line GCLT for touch is coupled to the shift register SR<n+2>. In addition to the conductive wire 52A and the conductive wire 52B, a conductive wire 52C is arranged to be overlapped with the data line SGL for display. A clock signal CLK generated in a clock signal generation unit 18 is supplied to the gate driver 12 via the conductive wire 52C.

The gate driver 12 sequentially scans the gate line GCLT for touch and the gate line GCL for display based on the clock signal CLK. The gate driver 12 supplies the scanning signal Vscan to the gate line GCLT for touch or the gate line GCL for display that is selected based on the clock signal CLK. The clock signal generation unit 18 is included in the control unit 11 (refer to FIG. 1), and mounted on the display control IC 19.

In this way, the conductive wire 52C is arranged in the display region 10a and used as a wire for supplying the clock signal CLK, so that the number of wires arranged in the frame region 10b can be reduced and the frame can be narrowed.

Figure 33:
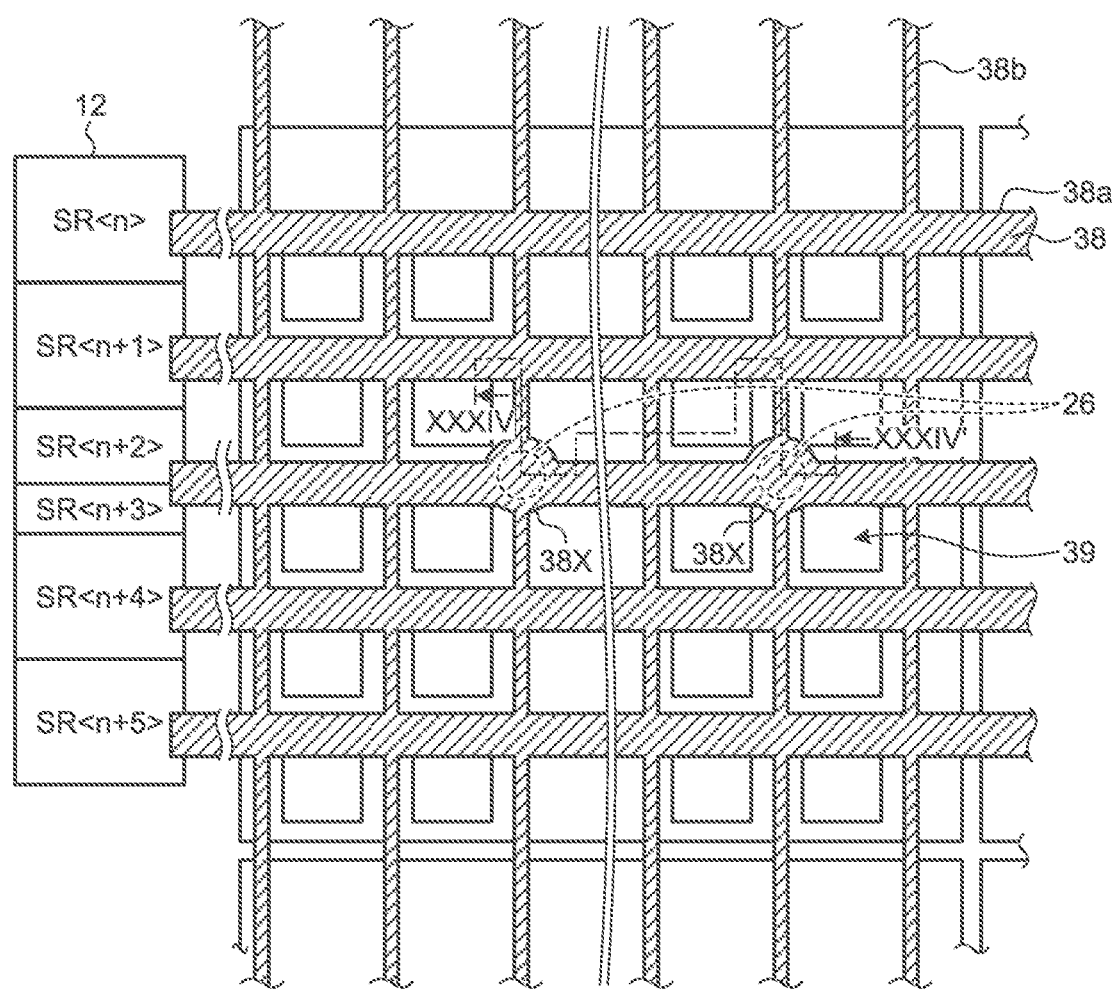
FIG. 33 is a plan view illustrating a light shielding part of a display device with a touch detection function according to a modification of the third embodiment.
Figure 34:
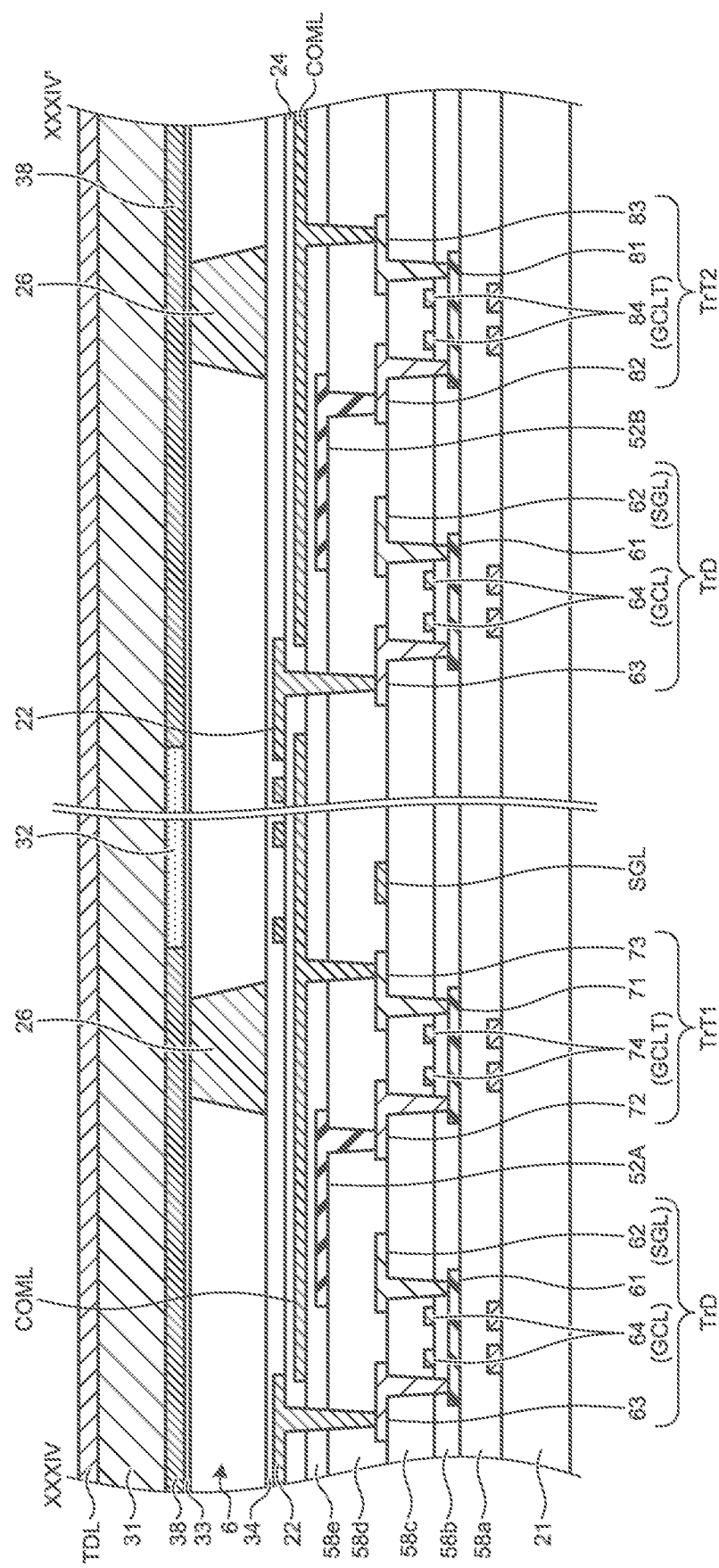
FIG. 34 is a cross-sectional view along the line XXXIV-XXXIV' in FIG. 33.

FIG. 33 is a plan view illustrating a light shielding part of the display device with a touch detection function according to a modification of the third embodiment. FIG. 34 is a cross-sectional view along the line XXXIV-XXXIV' in FIG. 33.

In the present modification, a light shielding part 38 is arranged above the gate line GCL for display and the data line SGL for display (refer to FIG. 31). As illustrated in FIG. 33, the light shielding part 38 includes a first light shielding part 38a extending in the row direction and a second light shielding part 38b extending in a direction intersecting with an extending direction of the first light shielding part 38a, and the first light shielding part 38a and the second light shielding part 38b are arranged in a gridlike fashion. The first light shielding part 38a overlaps with the gate line GCL for display, and the second light shielding part 38b overlaps with the data line SGL for display. A region surrounded by the first light shielding part 38a and the second light shielding part 38b is an opening region 39.

As illustrated in FIG. 34, the light shielding part 38 is arranged on a surface of the TFT substrate 21 side of the glass substrate 31. The light shielding part 38 is arranged in the same layer as the color filter 32. The color filter 32 is arranged at a position corresponding to the opening region 39 illustrated in FIG. 33 while being overlapped with the pixel electrode 22. With the light shielding part 38, the gate line GCL for display, the data line SGL for display, the switching element TrD for display, the first switching element TrT1 for touch, and the second switching element TrT2 for touch can be prevented from being visually recognized.

As illustrated in FIG. 34, an orientation film 33 is arranged between the liquid crystal layer 6, and the light shielding part 38 and the color filter 32. An orientation film 34 is arranged between the pixel electrode 22 on the TFT substrate 21 side and the liquid crystal layer 6. A spacer 26 is arranged between the TFT substrate 21 and the glass substrate 31 to keep a gap between the TFT substrate 21 and the glass substrate 31. As illustrated in FIG. 33, the spacer 26 is arranged in the vicinity of an intersecting part 38X of the first light shielding part 38a and the second light shielding part 38b in a plan view.

In the present modification, the intersecting part 38X overlapped with the spacer 26 has, for example, a circular shape in a plan view, and has a larger area than that of an intersecting part not overlapped with the spacer 26 between the first light shielding part 38a and the second light shielding part 38b. The first switching element TrT1 for touch and the second switching element TrT2 for touch are arranged to be overlapped with the spacers 26 and 26, respectively, in a plan view. Thus, the first switching element TrT1 for touch and the second switching element TrT2 for touch are arranged to be overlapped with the intersecting part 38X, so that the first switching element TrT1 for touch and the second switching element TrT2 for touch can be prevented from being visually recognized from the outside. The first switching element TrT1 for touch and the second switching element TrT2 for touch are arranged by utilizing a region in which the spacers 26 and 26 are arranged, so that an area of the opening region 39 can be prevented from being reduced.

Fourth Embodiment

Figure 35:
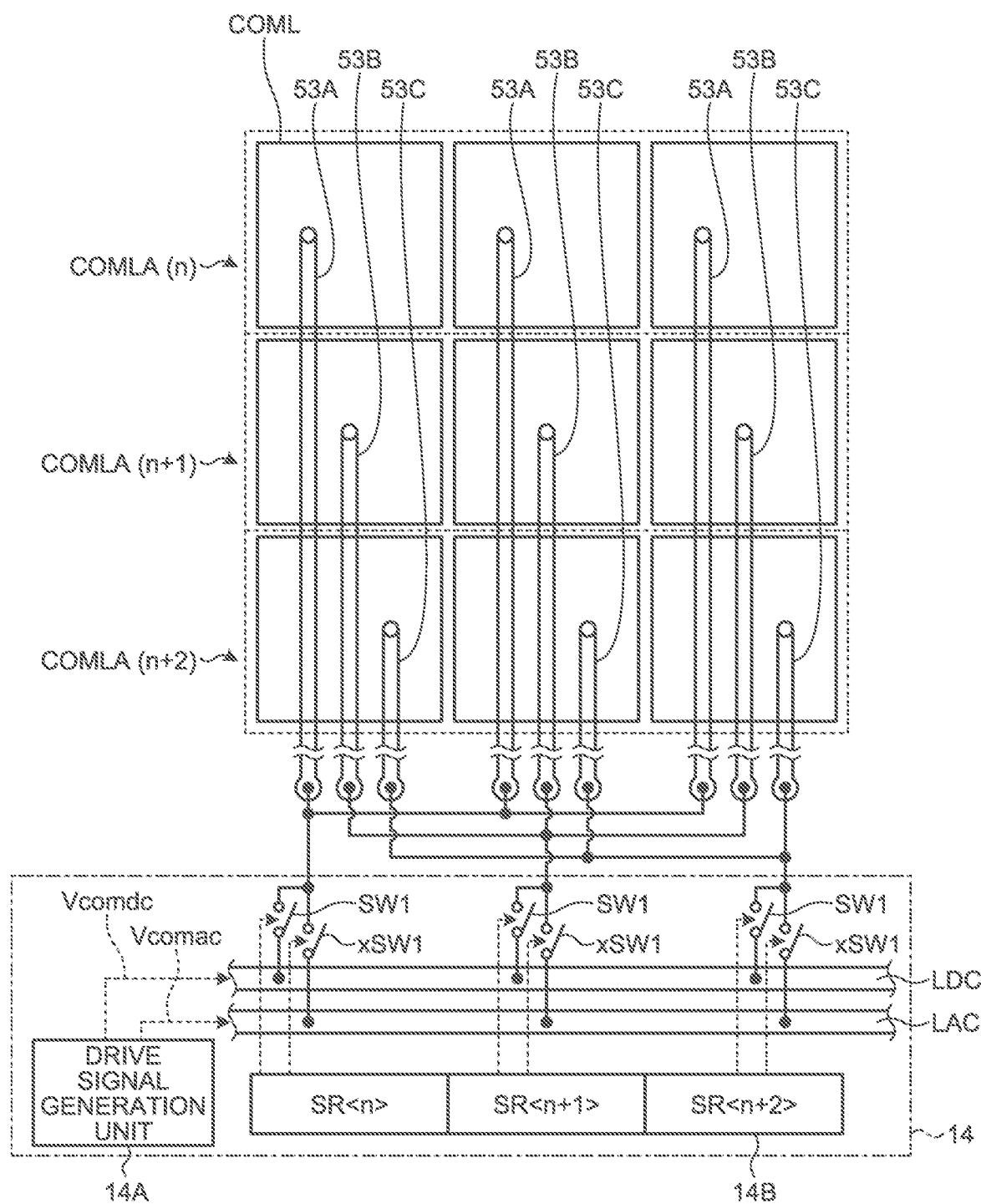
FIG. 35 is a plan view illustrating a configuration example of a drive electrode and a drive electrode driver according to a fourth embodiment.
Figure 36:
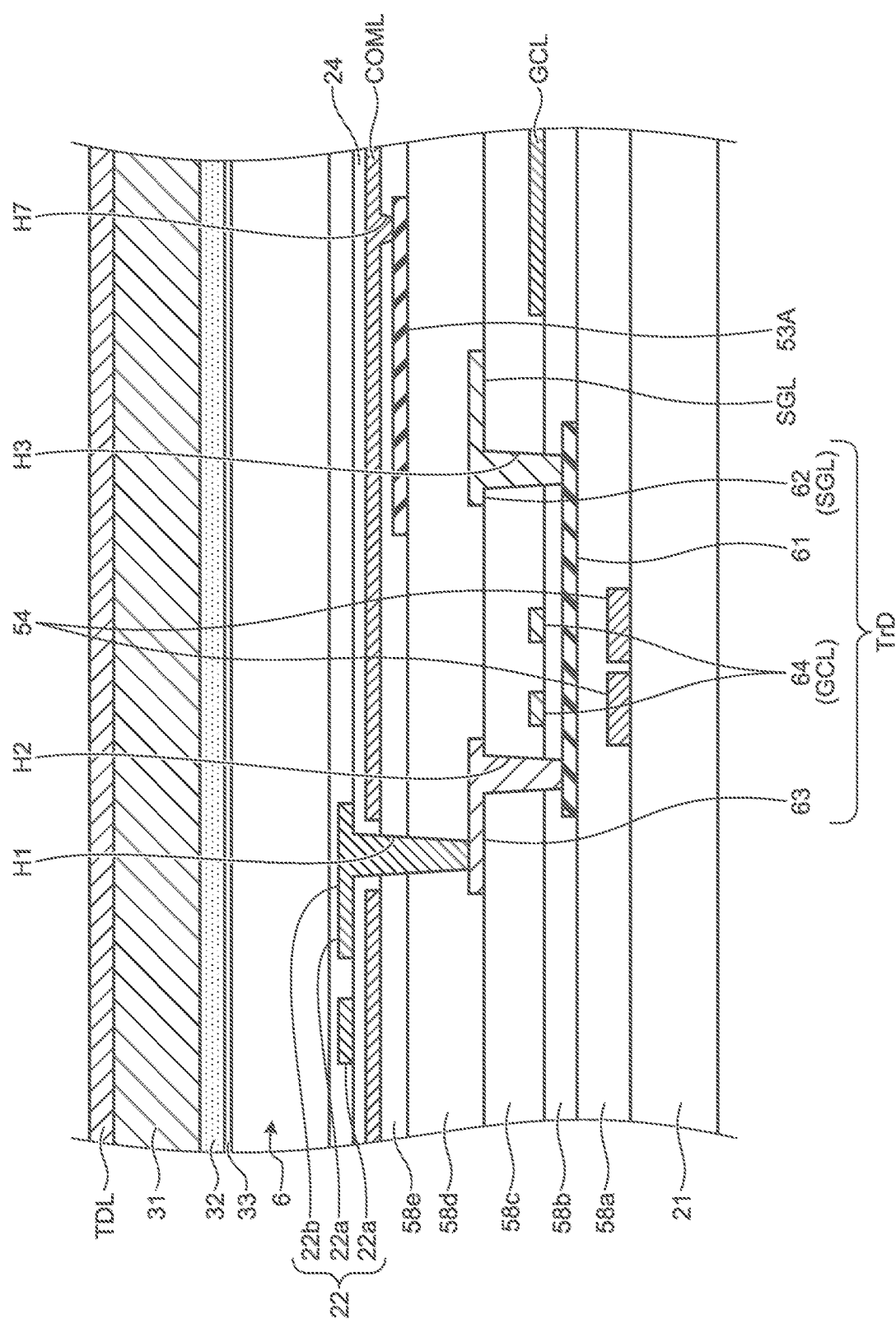
FIG. 36 is a cross-sectional view illustrating a coupling point between the drive electrode and a conductive wire.

FIG. 35 is a plan view illustrating a configuration example of the drive electrode and the drive electrode driver according to a fourth embodiment. FIG. 36 is a cross-sectional view illustrating a coupling point between the drive electrode and the conductive wire.

The present embodiment is different from the third embodiment in that the first switching element TrT1 for touch and the second switching element TrT2 for touch are not arranged in the drive electrode COML. As illustrated in FIG. 35, a conductive wire 53A is coupled to each drive electrode COML in the drive electrode block COMLA(n) in the n-th row. A conductive wire 53B is coupled to each drive electrode COML in the drive electrode block COMLA(n+1) in the (n+1)-th row. A conductive wire 53C is coupled to each drive electrode COML in the drive electrode block COMLA(n+2) in the (n+2)-th row.

As illustrated in FIG. 36, the insulating layer 58e is arranged between the conductive wire 53A and the drive electrode COML. The conductive wire 53A is electrically coupled to the drive electrode COML via a contact hole H7 arranged in the insulating layer 58e. The conductive wires 53B and 53C (not illustrated in FIG. 36) are also electrically coupled to the drive electrode COML. The switching element TrD for display has the same configuration as that described above, but is not electrically coupled to the conductive wires 53A, 53B, and 53C.

Each of the conductive wires 53A, 53B, and 53C extends while overlapping with the data line SGL for display (refer to FIG. 31), and is coupled to the drive electrode driver 14. The drive electrode driver 14 includes the drive signal generation unit 14A, a drive electrode scanning unit 14B, the wires LAC and LDC, and switches SW1 and xSW1. A plurality of conductive wires 53A are coupled to one set of the switches SW1 and xSW1, and a plurality of conductive wires 53B and a plurality of conductive wires 53C are also coupled to the different switches SW1 and xSW1.

As illustrated in FIG. 35, the switch SW1 and the switch xSW1 are switched to be ON and OFF in opposite phases. The switches SW1 and xSW1 are sequentially selected by the drive electrode scanning unit 14B, and the scanning signal is supplied to the selected set of switches SW1 and xSW1. When the scanning signal is supplied to the switches SW1 and xSW1 from the drive electrode scanning unit 14B, the switch SW1 is turned OFF and the switch xSW1 is turned ON. When the scanning signal is not supplied, the switch SW1 is turned ON, and the switch xSW1 is turned OFF.

Each of the switches SW1 is coupled to the wire LDC, and receives the display drive signal Vcomdc supplied from the drive signal generation unit 14A. Each of the switches xSW1 is coupled to the wire LAC, and receives the touch drive signal Vcomac supplied from the drive signal generation unit 14A. When the scanning signal is supplied to one set of switches SW1 and xSW1 coupled to the conductive wire 53A, the switch xSW1 is turned ON, and the touch drive signal Vcomac is supplied to the drive electrode COML in the drive electrode block COMLA(n) via the conductive wire 53A. When the drive electrode scanning unit 14B sequentially scans the switches SW1 and xSW1, the touch drive signal Vcomac is sequentially supplied to the drive electrode blocks COMLA(n+1) and COMLA(n+2) via the conductive wires 53B and 53C. Thus, touch detection is performed based on the principle of mutual capacitance touch detection described above.

When the switches SW1 and xSW1 are not selected by the drive electrode scanning unit 14B, the switch SW1 is turned ON, and the display drive signal Vcomdc is supplied to each drive electrode COML via the conductive wires 53A, 53B, and 53C.

With such a configuration, by sequentially scanning the drive electrodes COML arranged in a matrix, contact or proximity of an external conductor can be detected based on the basic principle of mutual capacitance touch detection. In the present embodiment, each of the conductive wires 53A, 53B, and 53C is coupled to each drive electrode COML, so that the number of wires within the display region 10a can be reduced as compared with the third embodiment.

Fifth Embodiment

Figure 37:
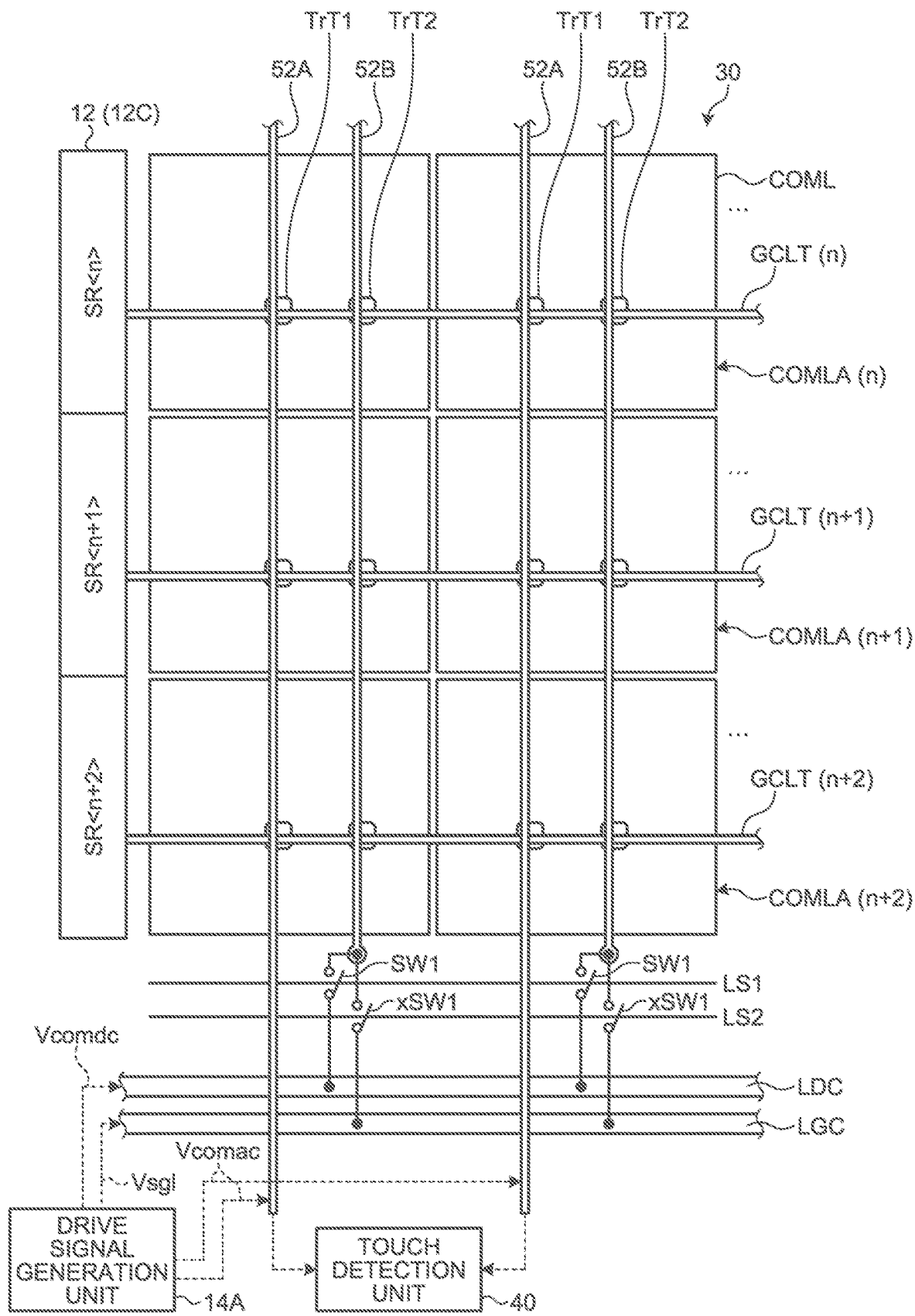
FIG. 37 is a plan view of a drive electrode and a drive circuit according to a fifth embodiment.

FIG. 37 is a plan view of the drive electrode and a drive circuit according to a fifth embodiment. The configuration of the drive electrode COML, the gate line GCLT for touch, the conductive wires 52A and 52B, the first switching element TrT1 for touch, the second switching element TrT2 for touch, and the gate driver 12 according to the present embodiment is similar to the configuration illustrated in FIG. 27. The display device with a touch detection function according to the present embodiment detects contact or proximity of an external conductor based on self capacitance of the drive electrode COML.

As illustrated in FIG. 37, the drive signal generation unit 14A supplies the touch drive signal Vcomac to the conductive wire 52A. The touch drive signal Vcomac is supplied to the drive electrode COML via the conductive wire 52A and the first switching element TrT1 for touch. Accordingly, based on the principle of self capacitance touch detection described above, a detection signal corresponding to the self capacitance of the drive electrode COML is output to the touch detection unit 40 via the conductive wire 52A, and the touch detection signal Vdet2 is output.

The drive signal generation unit 14A supplies the display drive signal Vcomdc to the wire LDC, and supplies a signal Vsgl to wire LGC. The conductive wire 52B is coupled to the wire LDC via the switch SW1, and coupled to the wire LGC via the switch xSW1. The switch SW1 is coupled to a wire LS1, and the switch xSW1 is coupled to a wire LS2. The switch SW1 and the switch xSW1 are switched between ON and OFF based on switch signals supplied from the wire LS1 and the wire LS2, respectively. The switch signals supplied from the wire LS1 and the wire LS2 are in opposite phases, controlling the switch SW1 and the switch xSW1 to be ON and OFF in an opposite manner.

When the second switching element TrT2 for touch is in an ON state and the switch SW1 is turned ON, the display drive signal Vcomdc is supplied to the drive electrode COML via the conductive wire 52B. When the second switching element TrT2 for touch is in the ON state and the switch xSW1 is turned ON, the signal Vsgl is supplied to the drive electrode COML via the conductive wire 52B. The signal Vsgl preferably has the same waveform synchronized with the touch drive signal Vcomac.

With such a configuration, the display drive signal Vcomdc is supplied to the drive electrode COML in a display operation. When touch detection is performed, the touch drive signal Vcomac is supplied to the drive electrode COML selected as a detection target, and the signal Vsgl is supplied to the drive electrode COML that is not selected. When the signal Vsgl is supplied, parasitic capacitance between the drive electrode COML selected as a detection target and the non-selected drive electrode COML is reduced, so that a detection error and deterioration in detection sensitivity can be prevented.

Figure 38:
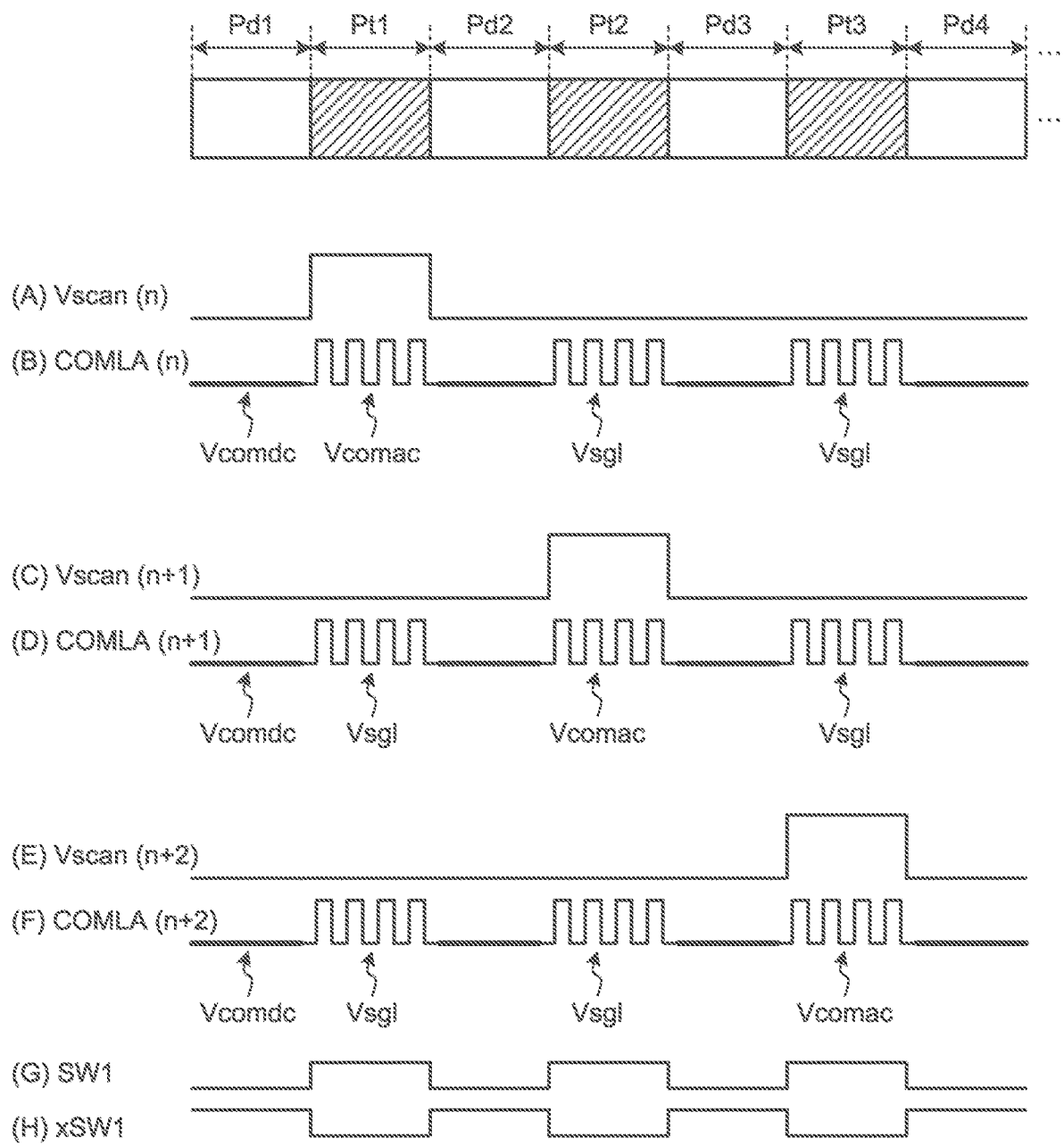
FIG. 38 is a timing waveform chart illustrating an operation example of a display device with a touch detection function according to the fifth embodiment.

FIG. 38 is a timing waveform chart illustrating an operation example of the display device with a touch detection function according to the fifth embodiment. As described above, in the display periods Pt1, Pt2 . . . , the scanning signal Vscan is not supplied to the gate line GCLT for touch illustrated in FIG. 37, the first switching element TrT1 for touch is turned OFF, and the second switching element TrT2 for touch is turned ON. Then the switch SW1 is turned ON, and the switch xSW1 is turned OFF. Accordingly, in each of the display periods Pt1, Pt2 . . . , the display drive signal Vcomdc is supplied to the drive electrode COML.

In the touch period Pt1, the gate line GCLT(n) for touch in the n-th row is selected by the gate driver 12, and the scanning signal Vscan(n) is supplied thereto. The first switching element TrT1 for touch coupled to the gate line GCLT(n) for touch is turned ON, and the second switching element TrT2 for touch is turned OFF. The touch drive signal Vcomac is supplied to each of the drive electrodes COML in the drive electrode block COMLA(n) in the n-th row via the conductive wire 52A. Each drive electrode COML in the drive electrode block COMLA(n) outputs a detection signal corresponding to self capacitance thereof to the touch detection unit 40 via the conductive wire 52A.

In the touch period Pt1, the first switching element TrT1 for touch coupled to the non-selected gate lines GCLT(n+1) and GCLT(n+2) for touch is turned OFF, and the second switching element TrT2 for touch coupled thereto is turned ON. Operations of the switches SW1 and xSW1 are reversed from the state in the display period Pt1, that is, the switch SW1 is turned OFF and the switch xSW1 is turned ON. Accordingly, the signal Vsgl is supplied to the drive electrode blocks COMLA(n+1) and COMLA(n+2) that are not selected as a detection target.

In the touch period Pt2, the gate line GCLT(n+1) for touch in the (n+1)-th row is selected by the gate driver 12, and the touch drive signal Vcomac is supplied to each of the drive electrodes COML in the drive electrode block COMLA(n+1) in the (n+1)-th row via the conductive wire 52A. The signal Vsgl is supplied to the drive electrode blocks COMLA(n) and COMLA(n+2) that are not selected as a detection target.

In the touch period Pt3, the gate line GCLT(n+2) for touch in the (n+2)-th row is selected by the gate driver 12, and the touch drive signal Vcomac is supplied to each of the drive electrodes COML in the drive electrode block COMLA(n+2) in the (n+2)-th row via the conductive wire 52A. The signal Vsgl is supplied to the drive electrode blocks COMLA(n) and COMLA(n+1) that are not selected as a detection target.

In this way, by sequentially selecting the drive electrode block COMLA to be a detection target in the touch periods Pt1 and Pt2 . . . , a self capacitance touch detection operation is performed on the entire touch detection surface.

According to the present embodiment, by arranging the conductive wires 52A and 52B coupled to the switching element for touch, the touch drive signal Vcomac, the display drive signal Vcomdc, and the signal Vsgl can be supplied to the drive electrode COML. The number of wires can be reduced as compared with a case in which each of wire is coupled to each of the drive electrodes COML.

In the touch periods Pt1 and Pt2 . . . using a self capacitance system, the signal Vsgl may be supplied to the gate line GCL for display and the data line SGL for display (not illustrated in FIG. 37). The gate line GCL for display and the data line SGL for display may be in a floating state in which a fixed electric potential is not supplied. Accordingly, parasitic capacitance between the drive electrode COML and the gate line GCL for display, and parasitic capacitance between the drive electrode COML and the data line SGL for display can be reduced.

Figure 39:
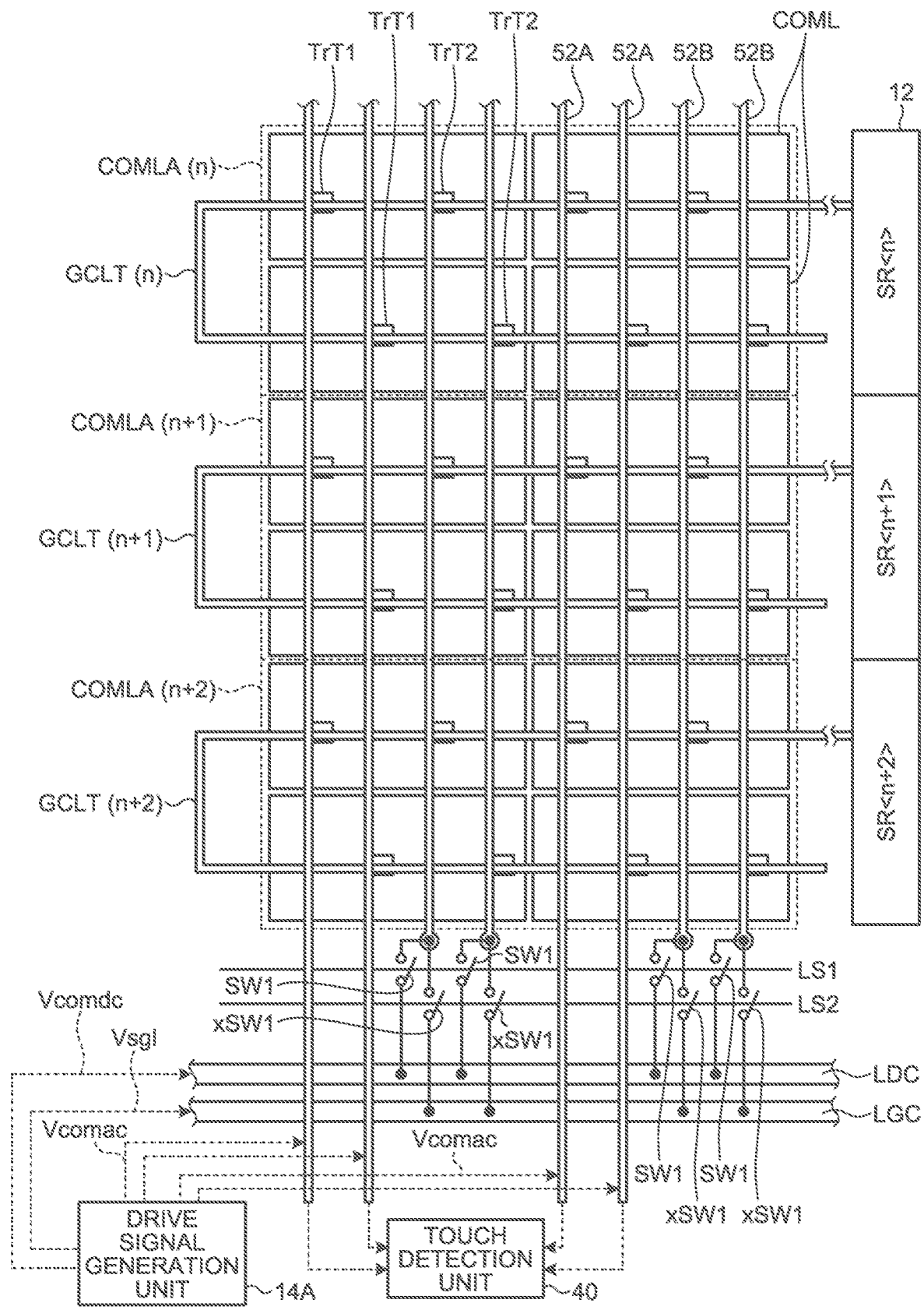
FIG. 39 is a plan view illustrating a configuration example of a drive electrode and a conductive wire according to a modification of the fifth embodiment.

FIG. 39 is a plan view illustrating a configuration example of the drive electrode and the conductive wire according to a modification of the fifth embodiment. The drive electrode block COMLA in FIG. 37 includes a row of drive electrodes COML arranged in the row direction, but the embodiment is not limited thereto. As illustrated in FIG. 39, the gate line GCLT for touch coupled to the gate driver 12 extends while being overlapped with a row of drive electrodes COML. The gate line GCLT for touch is bent on an opposite side of the gate driver 12 with the drive electrode COML interposed therebetween, and extends while being overlapped with the next row of drive electrodes COML. In this way, two rows of drive electrodes COML may be coupled to one gate line GCLT for touch, and the drive electrode block COMLA may include two rows of drive electrodes COML.

Two conductive wires 52A and 52A and two conductive wires 52B and 52B are coupled to a plurality of drive electrodes COML arranged in the column direction. The conductive wire 52A is coupled to one drive electrode COML for one drive electrode block COMLA. The conductive wire 52B is coupled to one drive electrode COML for one drive electrode block COMLA. That is, the drive electrodes COML and COML adjacent to each other in the column direction within the drive electrode block COMLA are coupled to different conductive wires 52A and 52A and conductive wires 52B and 52B.

The touch drive signal Vcomac is supplied to each drive electrode COML from the drive signal generation unit 14A via the conductive wire 52A. The drive electrode COML then supplies the output signal to the touch detection unit 40 via the conductive wire 52A. The wire LDC is coupled to each conductive wire 52B via the switch SW1, and the wire LGC is coupled thereto via the switch xSW1. Accordingly, the display drive signal Vcomdc and the signal Vsgl are supplied to the conductive wire 52B. Thus, similarly to the operation example illustrated in FIG. 38, in the touch periods Pt1 and Pt2 . . . , self capacitance touch detection can be performed by sequentially scanning the drive electrode blocks COMLA(n), COMLA(n+1), and COMLA(n+2).

In the present embodiment, touch detection can be performed for the detection electrode block COMLA including two rows of drive electrodes COML in one touch period, so that detection time for the entire touch detection surface can be reduced. In the present embodiment, the drive electrode COML has a rectangular shape obtained by dividing the drive electrode COML having a square shape illustrated in FIG. 37, for example, into two parts including an upper part and a lower part. Alternatively, the drive electrode COML having a square shape illustrated in FIG. 37, for example, can naturally be employed.

Sixth Embodiment

Figure 40:
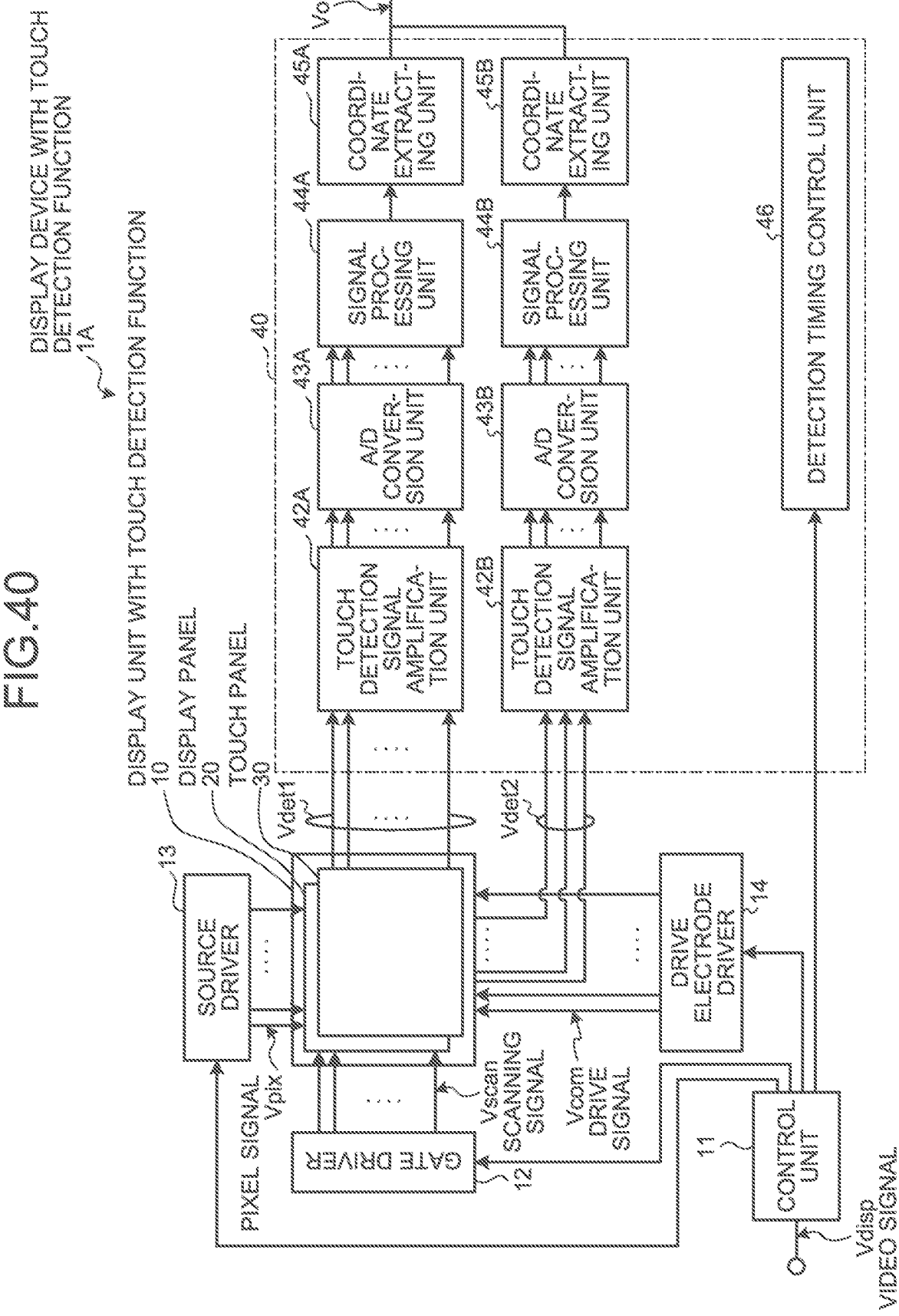
FIG. 40 is a block diagram illustrating a configuration example of a display device with a touch detection function according to a sixth embodiment.

FIG. 40 is a block diagram illustrating a configuration example of the display device with a touch detection function according to a sixth embodiment. A display device 1A with a touch detection function according to the present embodiment can switch between mutual capacitance touch detection and self capacitance touch detection to be performed. As illustrated in FIG. 40, the touch detection unit 40 includes a touch detection signal amplification unit 42A to which the touch detection signal Vdet1 using a mutual capacitance system is supplied, an A/D conversion unit 43A, a signal processing unit 44A, and a coordinate extracting unit 45A. The touch detection unit 40 further includes a touch detection signal amplification unit 42B to which the touch detection signal Vdet2 using a self capacitance system is supplied, an A/D conversion unit 43B, a signal processing unit 44B, and a coordinate extracting unit 45B. The mutual capacitance touch detection and the self capacitance touch detection can be switched based on the control signal of the control unit 11.

Figure 41:
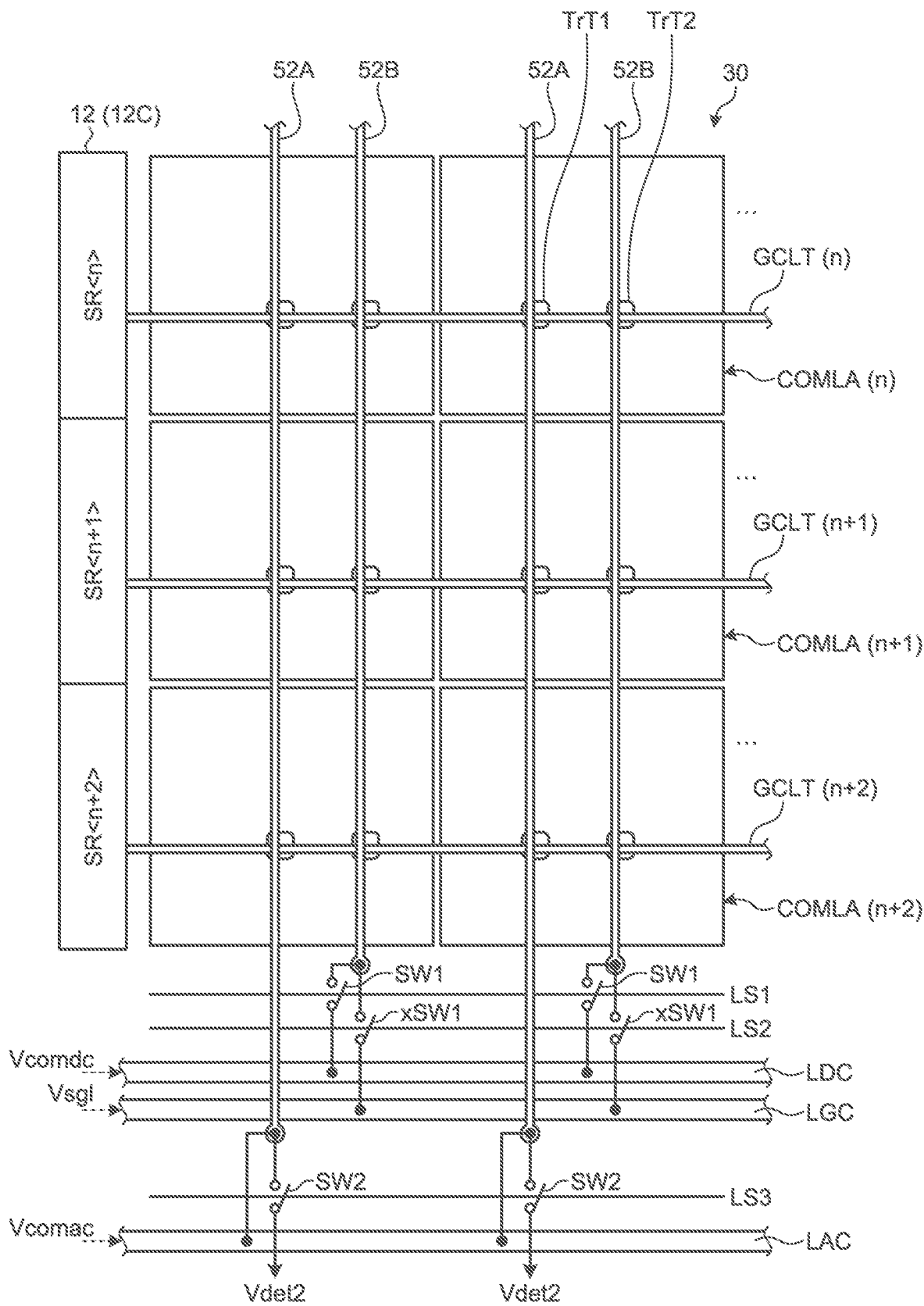
FIG. 41 is a plan view of a drive electrode and a drive circuit according to the sixth embodiment.
Figure 42:
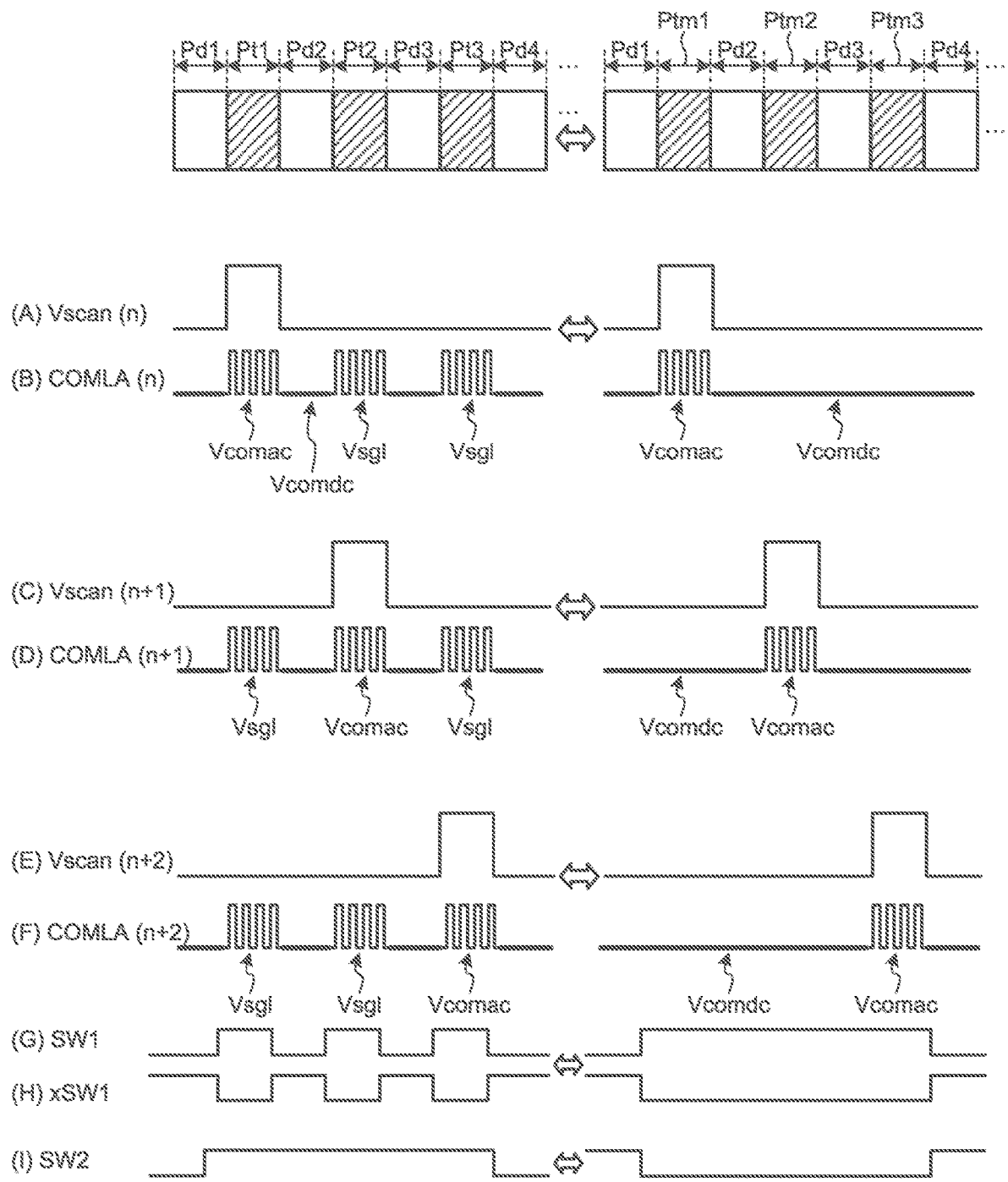
FIG. 42 is a timing waveform chart illustrating an operation example of the display device with a touch detection function according to the sixth embodiment.

FIG. 41 is a plan view of the drive electrode and the drive circuit according to the sixth embodiment. FIG. 42 is a timing waveform chart illustrating an operation example of the display device with a touch detection function according to the sixth embodiment. The configuration of the drive electrode COML, the gate line GCLT for touch, the conductive wires 52A and 52B, the first switching element TrT1 for touch, the second switching element TrT2 for touch, and the gate driver 12 according to the present embodiment is similar to that illustrated in FIG. 27.

As illustrated in FIG. 41, the touch drive signal Vcomac is supplied to the conductive wire 52A via the wire LAC. The switch SW2 is coupled to the conductive wire 52A, and the switch SW2 is switched between ON and OFF based on a switch signal supplied from wire LS3. In a state in which the switch SW2 is ON, self capacitance touch detection is performed, and the touch detection signal Vdet2 is output to the touch detection unit 40 via the conductive wire 52A and the switch SW2. The wire LDC is coupled to the conductive wire 52B via the switch SW1, and the wire LGC is coupled thereto via the switch xSW1. In a state in which the switch SW1 is ON and the switch xSW1 is OFF, the display drive signal Vcomdc is supplied to the conductive wire 52B. In a state in which the switch SW1 is OFF and the switch xSW1 is ON, the signal Vsgl is supplied to the conductive wire 52B.

The left figure of FIG. 42 is a timing waveform chart of self capacitance touch detection, and the right figure of FIG. 42 is a timing waveform chart of mutual capacitance touch detection. As illustrated in the left figure of FIG. 42, a self capacitance touch detection operation is performed similarly to FIG. 38. The touch drive signal Vcomac is sequentially supplied to the selected drive electrode block COMLA. In the touch periods Pt1 and Pt2 . . . and display periods Pd1 and Pd2 . . . using a self capacitance system, the switch SW2 is in the ON state, and the touch detection signal Vdet2 is output to the touch detection unit 40 via the conductive wire 52A.

The switches SW1 and xSW1 are switched to be ON and OFF between the touch periods Pt1 and Pt2 . . . and the display periods Pd1 and Pd2 . . . using a self capacitance system. In the display periods Pd1 and Pd2 . . . , the switch SW1 is turned ON, the switch xSW1 is turned OFF, and the display drive signal Vcomdc is supplied to the drive electrode blocks COMLA(n), COMLA(n+1), and COMLA(n+2). In the touch periods Pt1 and Pt2 . . . , the switch SW1 is turned OFF, the switch xSW1 is turned ON, and the signal Vsgl is supplied to the drive electrode block COMLA that is not selected by the gate driver 12.

Next, when the control unit 11 (refer to FIG. 40) switches self capacitance touch detection to mutual capacitance touch detection, an operation illustrated in the right figure of FIG. 42 is performed. As illustrated in the right figure of FIG. 42, a mutual capacitance touch detection operation according to the present embodiment is performed similarly to FIG. 30. That is, in touch periods Ptm1, Ptm2 . . . using a mutual capacitance system, the touch drive signal Vcomac is sequentially supplied to the selected drive electrode block COMLA. In the mutual capacitance touch detection operation, the switch SW2 is turned OFF, the touch detection signal Vdet2 is not output from the conductive wire 52A, and the touch detection signal Vdet1 is output from the touch detection electrode TDL.

In the touch periods Ptm1, Ptm2 . . . and the display periods Pd1 and Pd2 . . . using a mutual capacitance system, the switch SW1 is turned ON, and the switch xSW1 is turned OFF. Due to this, the signal Vsgl is not supplied to the conductive wire 52B, and the display drive signal Vcomdc is supplied to the non-selected drive electrode block COMLA.

As described above, the display device 1A with a touch detection function according to the present embodiment can switch between self capacitance touch detection and mutual capacitance touch detection with a configuration in which the conductive wires 52A and 52B are coupled to the drive electrode COML. Due to this, a detection system can be appropriately switched to improve detection accuracy in accordance with different input operation methods and the external environment.

In the present embodiment, the same touch drive signal Vcomac is supplied to the conductive wire 52A in both of self capacitance touch detection and mutual capacitance touch detection. Alternatively, a touch drive signal having different amplitude and a different frequency may be supplied. In the touch periods Ptm1, Ptm2 . . . using a mutual capacitance system, the display drive signal Vcomdc is supplied to the non-selected drive electrode block COMLA. Alternatively, a floating state may be caused in which the voltage signal is not supplied to the non-selected drive electrode block COMLA and electric potential is not fixed. In this case, a configuration may be employed in which the display drive signal Vcomdc is not supplied to the wire LDC in the touch periods Ptm1, Ptm2 . . . , or a configuration may be employed in which a switch is added between the wire LDC and the conductive wire 52B to disconnect the wire LDC from the conductive wire 52B in the touch periods Ptm1, Ptm2 . . . .

The preferred embodiments of the present invention have been described above. However, the present invention is not limited thereto. Content disclosed in the embodiments is merely an example, and various modifications can be made without departing from the gist of the invention. The present invention naturally encompasses an appropriate modification maintaining the gist of the invention.

For example, the shapes of the drive electrode COML, the touch detection electrode TDL, and the pixel electrode 22 are merely an example, and may be variously modified. The number of conductive wires, the arrangement thereof, the shape thereof, and the like may be appropriately modified. The embodiments may be appropriately combined. For example, the conductive wire may be coupled to the gate line GCLT for touch illustrated in FIG. 27 similarly to the first embodiment to supply the scanning signal via the conductive wire.

What is claimed is:

1. A display device comprising:
   a substrate;
   a plurality of first electrodes on the substrate;
   a plurality of second electrodes opposed to the first electrodes;
   a plurality of switching elements that are coupled to the first electrodes or the second electrodes;
   a data line that is coupled to the switching elements; and
   a conductive wire that overlaps with the data line;
   wherein the conductive wire is coupled to the switching elements via the data line and has a width wider than a width of the data line at a position where the conductive wire overlaps the data line.

2. The display device according to claim 1, wherein
the switching elements are coupled to the first electrodes, and
the conductive wire supplies pixel signals to the first electrodes via the data line and the switching elements.

3. The display device according to claim 1, wherein
the switching elements are coupled to the second electrodes, and
the conductive wire supplies a common potential to the second electrodes via the data line and the switching elements.

4. The display device according to claim 1, wherein
the switching elements are coupled to the second electrodes, and
the conductive wire supplies a drive signal for touch detection to the second electrodes via the data line and the switching elements.

5. The display device according to claim 1, wherein
the switching elements are coupled to the second electrodes, and
the conductive wire supplies:
  a common potential to the second electrodes via the data line and the switching elements in a display operation period; and
  a drive signal for touch detection to the second electrodes via the data line and the switching elements in a detection operation period.

6. The display device according to claim 5, wherein the second electrodes are
used as common electrodes in the display operation period, and used as drive electrodes for touch detection in the detection operation period.

7. The display device according to claim 1, wherein the conductive wire is opposed to the second electrode via an insulating layer and is located between the substrate and the second electrode in a direction perpendicular to a main surface of the substrate.

8. The display device according to claim 1, wherein the conductive wire and the data line extend in a same direction.

9. The display device according to claim 1, wherein the conductive wire overlaps none of the first electrodes.

10. A display device comprising:
a substrate;
a plurality of pixel electrodes on the substrate;
a plurality of common electrodes opposed to the pixel electrodes;
a plurality of switching elements that are coupled to the common electrodes;
a data line that is coupled to the switching elements; and
a conductive wire that overlaps with the data line,
wherein
the conductive wire is coupled to the switching elements via the data line,
the conductive wire supplies:
  a common potential to the common electrodes via the data line and the switching elements in a display operation period; and
  a drive signal for touch detection to the second electrodes via the data line and the switching elements in a detection operation period, and
the conductive wire has a width wider than a width of the data line at a position where the conductive wire overlaps the data line.

11. The display device according to claim 10, wherein the conductive wire and the data line extend in a same direction.

12. The display device according to claim 10, wherein the conductive wire overlaps none of the pixel electrodes.

13. The display device according to claim 10, wherein the common electrodes are used as drive electrodes for touch detection in the detection operation period.

* * * * *